United States Patent
Nakamura et al.

(10) Patent No.: US 9,872,037 B2
(45) Date of Patent: *Jan. 16, 2018

(54) MOVING PICTURE DECODING DEVICE, MOVING PICTURE DECODING METHOD, AND MOVING PICTURE DECODING PROGRAM

(71) Applicant: JVC KENWOOD Corporation, Yokohama-shi (JP)

(72) Inventors: Hiroya Nakamura, Yokosuka (JP); Shigeru Fukushima, Yokosuka (JP); Hideki Takehara, Yokosuka (JP)

(73) Assignee: JVC KENWOOD Corporation, Yokohama-shi (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/490,337

(22) Filed: Apr. 18, 2017

(65) Prior Publication Data
US 2017/0223374 A1   Aug. 3, 2017

Related U.S. Application Data

(63) Continuation of application No. 14/479,139, filed on Sep. 5, 2014, now Pat. No. 9,681,134, which is a
(Continued)

(30) Foreign Application Priority Data

Apr. 12, 2012 (JP) .................................. 2012-091385
Apr. 12, 2012 (JP) .................................. 2012-091386
(Continued)

(51) Int. Cl.
*H04N 7/12* (2006.01)
*H04N 19/513* (2014.01)
(Continued)

(52) U.S. Cl.
CPC ......... *H04N 19/513* (2014.11); *H04N 19/105* (2014.11); *H04N 19/139* (2014.11);
(Continued)

(58) Field of Classification Search
None
See application file for complete search history.

(56) References Cited

U.S. PATENT DOCUMENTS

2009/0177952 A1   7/2009  Yokosato et al.
2012/0320984 A1*  12/2012 Zhou ...................... H04N 19/50
375/240.16

FOREIGN PATENT DOCUMENTS

EP    2 806 637 A1    11/2014
JP    2004-129191 A    4/2004
(Continued)

OTHER PUBLICATIONS

International Search Report in PCT International Application No. PCT/JP2013/002513, dated Jul. 9, 2013.
(Continued)

*Primary Examiner* — Dakshesh Parikh
(74) *Attorney, Agent, or Firm* — Venable LLP; Michael A. Sartori; Miguel A. Lopez

(57) ABSTRACT

A prediction information deriving unit derives the inter-prediction information candidates from inter-prediction information of a prediction block neighboring to a coding target prediction block or a prediction block present at the same position as or near the coding target prediction block in a coded picture at a temporally different position from the coding target prediction block. A candidate supplementing unit supplements inter-prediction information candidates having the same prediction mode, reference index, and motion vector until the number of inter-prediction information candidates reaches the designated number of candidates
(Continued)

when the number of inter-prediction information candidates is smaller than the designated number of candidates.

3 Claims, 38 Drawing Sheets

Related U.S. Application Data continuation of application No. PCT/JP2013/002513, filed on Apr. 12, 2013.

(30) Foreign Application Priority Data

Apr. 12, 2013 (JP) .................................. 2013-083577
Apr. 12, 2013 (JP) .................................. 2013-083578

(51) Int. Cl.

| | |
|---|---|
| H04N 19/105 | (2014.01) |
| H04N 19/52 | (2014.01) |
| H04N 19/176 | (2014.01) |
| H04N 19/174 | (2014.01) |
| H04N 19/159 | (2014.01) |
| H04N 19/70 | (2014.01) |
| H04N 19/196 | (2014.01) |
| H04N 19/463 | (2014.01) |
| H04N 19/139 | (2014.01) |
| H04N 19/573 | (2014.01) |
| H04N 19/172 | (2014.01) |
| H04N 19/184 | (2014.01) |

(52) U.S. Cl.
CPC ......... *H04N 19/159* (2014.11); *H04N 19/174* (2014.11); *H04N 19/176* (2014.11); *H04N 19/197* (2014.11); *H04N 19/463* (2014.11); *H04N 19/52* (2014.11); *H04N 19/573* (2014.11); *H04N 19/70* (2014.11); *H04N 19/172* (2014.11); *H04N 19/184* (2014.11)

(56) References Cited

FOREIGN PATENT DOCUMENTS

| JP | 2010-161542 A | 7/2010 |
|---|---|---|
| JP | 5488666 B2 | 3/2014 |
| WO | 2012/164880 A1 | 12/2012 |
| WO | 2012/164886 A1 | 12/2012 |
| WO | 2012/164908 A1 | 12/2012 |
| WO | 2013/057877 A1 | 4/2013 |
| WO | 2013/108613 A1 | 7/2013 |

OTHER PUBLICATIONS

International Preliminary Report on Patentability and Written Opinion in PCT International Application No. PCT/JP2013/002513, dated Oct. 14, 2014.

Notification of Reasons for Refusal in Japanese Patent Application No. 2013-083578, dated Jun. 24, 2014.

Bross et al., "WD5: Working Draft 5 of High-Efficiency Video Coding," Joint Collaborative Team on Video Coding (JCT-VC) of ITU-T SG16 WP3 and ISO/IEC JTC1/SC29/WG11, 7th Meeting: Geneva, CH, Nov. 21-30, 2011, 23 total pages, Document: JCTVC-G1103_d9.

Extended European Search Report in European Patent Application No. 13775584.9, dated Oct. 23, 2015.

Sugio et al., "Parsing Robustness for Merge/AMVP", Joint Collaborative Team on Video Coding (JCT-VC) of ITU-T SG16 WP3 and ISO/IEC JTC1/SC29/WG11 6th Meeting: Torino, IT, Jul. 14-22, 2011.

Lim et al., "Non-CE9: Simplification on AMVP list construction," Joint Collaborative Team on Video Coding (JCT-VC) of ITU-T SG16 WP3 and ISO/IEC JTC1/SC29/WG11, 8th Meeting: San Jose, CA, Feb. 1-10, 2012, Document: JCTVC-H0239.

Nakamura et al., "Default value for skip/merge and AMVP," AMJoint Collaborative Team on Video Coding (JCT-VC) of ITU-T SG 16 WP 3 and ISO/IEC JTC 1/SC 29/WG 11, 9th Meeting: Geneva, CH, Apr. 27-May 7, 2012, Document: JCTVC-I0314.

Sugio et al., "On MVP candidate list for AMVP/Merge," Joint Collaborative Team on Video Coding (JCT-VC) of ITU-T SG 16 WP 3 and ISO/IEC JTC 1/SC 29/WG 11, 9th Meeting: Geneva, CH, Apr. 27-May 7, 2012, Document: JCTVC-I0134.

Chen et al., "MVP index parsing with fixed number of candidates," Joint Collaborative Team on Video Coding (JCT-VC) of ITU-T SG16 WP3 and ISO/IEC JTC1/SC29/WG11, 6th Meeting: Torino, IT, Jul. 14-22, 2011, Document: JCTVC-F402.

McCann et al., "HM5: High Efficiency Video Coding (HEVC) Test Model 5 Encoder Description," Joint Collaborative Team on Video Coding (JCT-VC) of ITU-T SG16 WP3 and ISO/IEC JTC1/SC29/WG11, 7th Meeting: Geneva, CH, Nov. 21-30, 2011, Document: JCTVC-G1102.

* cited by examiner

2Nx2N

2NxN

2NxnU

2NxnD

Nx2N nLx2N nRx2N

NxN

CODING/DECODING TARGET PREDICTION BLOCK

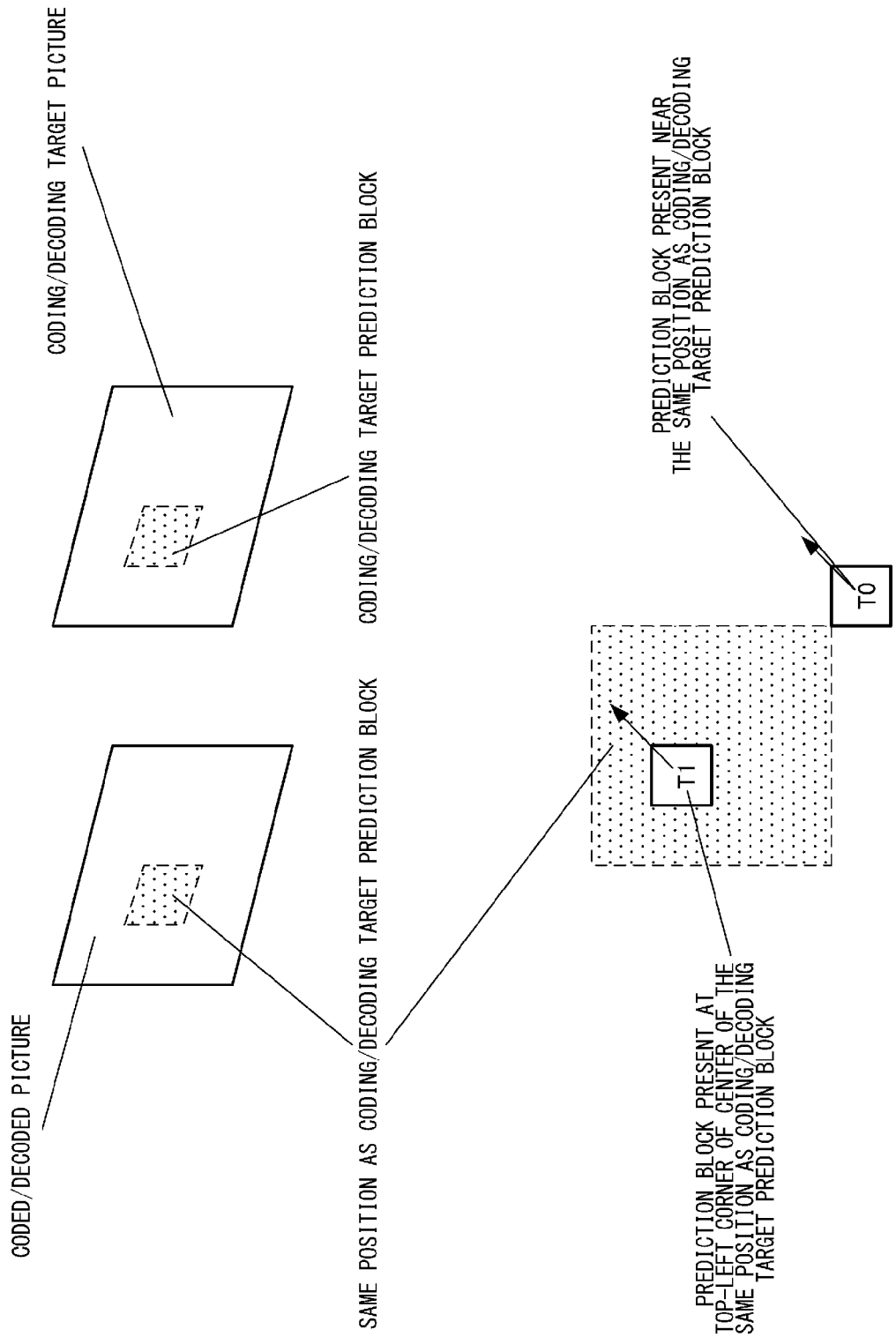

FIG.10

PREDICTION BLOCK

```
if (skip_flag [ x0 ][ y0 ])
    if( maxNumMergeIdx > 1) {
        merge_idx [ x0 ][ y0 ]
} else if (PredMode == MODE_INTER) {
    merge_flag [ x0 ][ y0 ]
    if( merge_flag[ x0 ][ y0 ] || maxNumMergeIdx > 1) {
        merge_idx [ x0 ][ y0 ]
    } else {
        if( slice_type = = B )
            inter_pred_flag[ x0 ][ y0 ]
        if( inter_pred_flag[ x0 ][ y0 ] = = Pred_L0 || inter_pred_flag[ x0 ][ y0 ] = = Pred_BI ) {
            if( num_ref_idx_l0_active_minus1 > 0 )
                ref_idx_l0[ x0 ][ y0 ]
            mvd_l0[ x0 ][ y0 ][ 0 ]
            mvd_l0[ x0 ][ y0 ][ 1 ]
            mvp_idx_l0[ x0 ][ y0 ]
        }
        if( inter_pred_flag[ x0 ][ y0 ] = = Pred_L1 || inter_pred_flag[ x0 ][ y0 ] = = Pred_BI ) {
            if( num_ref_idx_l1_active_minus1 > 0 )
                ref_idx_l1[ x0 ][ y0 ]
            mvd_l1[ x0 ][ y0 ][ 0 ]
            mvd_l1[ x0 ][ y0 ][ 1 ]
            mvp_idx_l1[ x0 ][ y0 ]
    }            ⋮

| MERGE INDEX mergeIdx | NUMBER OF MERGE CANDIDATES maxNumMergeCand | | | |
|---|---|---|---|---|
| | 2 | 3 | 4 | 5 |
| 0 | 0 | 0 | 0 | 0 |
| 1 | 1 | 10 | 10 | 10 |
| 2 | – | 11 | 110 | 110 |
| 3 | – | – | 111 | 1110 |
| 4 | – | – | – | 1111 |

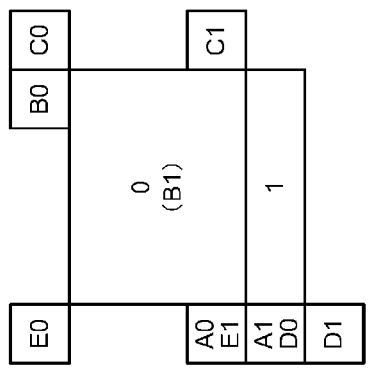 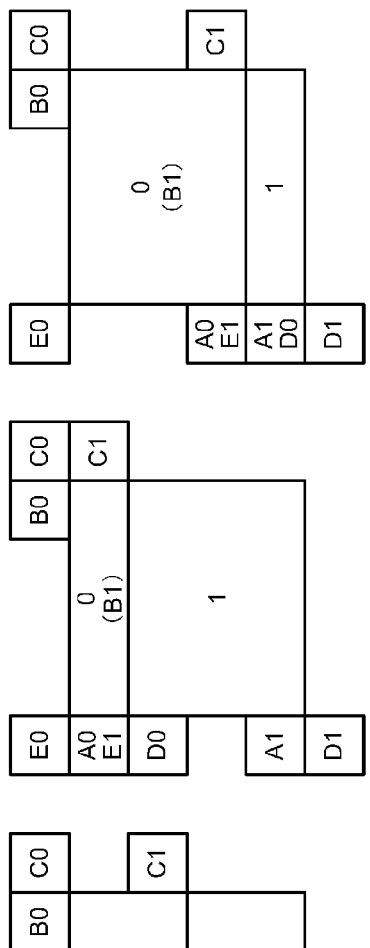 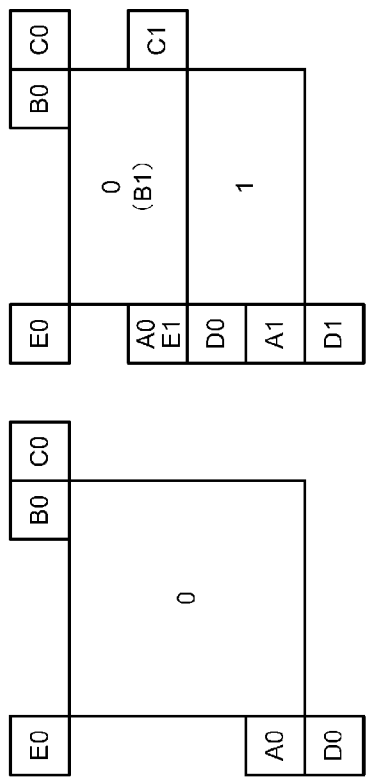 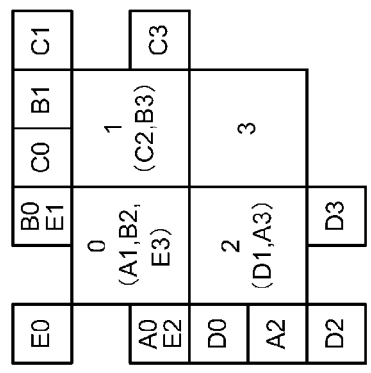 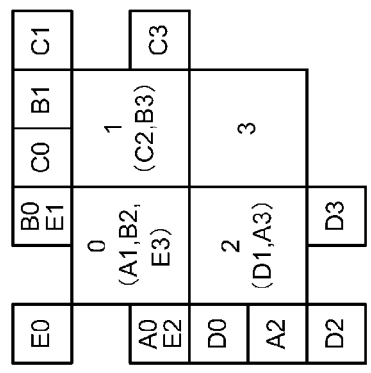 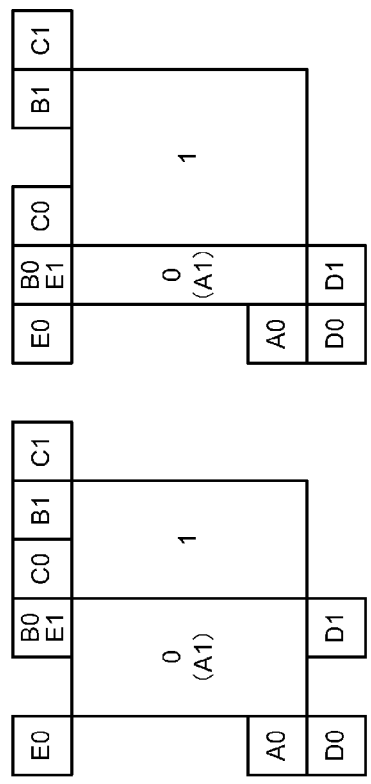

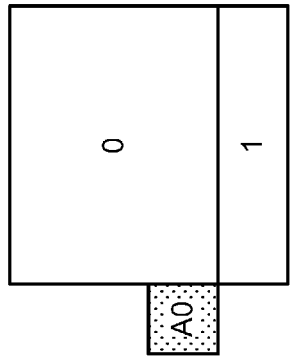
FIG. 17A 2Nx2N
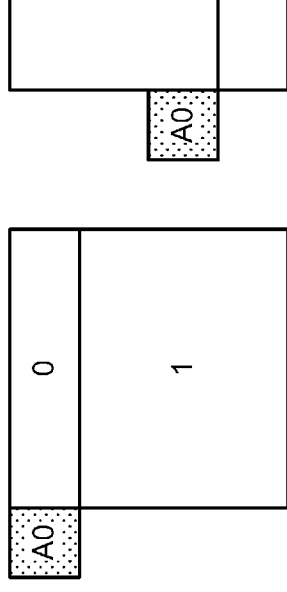
FIG. 17B 2NxN
FIG. 17C 2NxnU
FIG. 17D 2NxnD
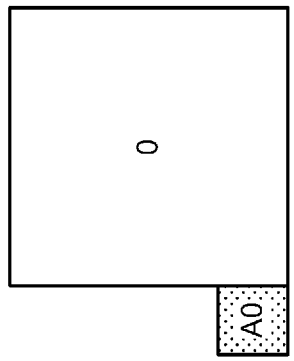
FIG. 17E Nx2N
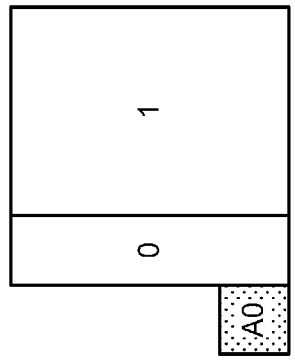
FIG. 17F nLx2N
FIG. 17G nRx2N
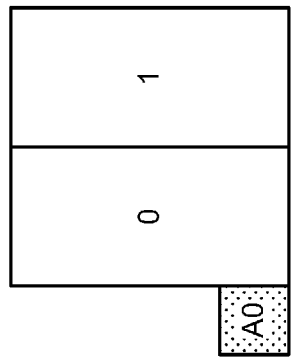
FIG. 17H NxN
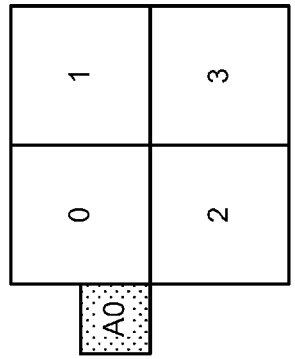

MOVING PICTURE DECODING DEVICE, MOVING PICTURE DECODING METHOD, AND MOVING PICTURE DECODING PROGRAM

CROSS-REFERENCE TO RELATED APPLICATIONS

This application is a Continuation of U.S. patent application Ser. No. 14/479,139, filed Sep. 5, 2014, which is a Continuation of International Application No. PCT/JP2013/002513, filed Apr. 12, 2013, which claims the benefit of Japanese Patent Application Nos. 2012-091385 and 2012-091386, filed Apr. 12, 2012, and 2013-083577 and 2013-083578, filed Apr. 12, 2013.

BACKGROUND

1. Field of the Invention

The present invention relates to a technique of coding and decoding moving pictures, and more particularly, to a technique of coding and decoding moving pictures using motion-compensated prediction.

2. Description of the Related Art

The MPEG-4 AVC/H.264 standard is a representative moving picture compression coding scheme. The MPEG-4 AVC/H.264 standard uses motion compensation in which a picture is partitioned into a plurality of rectangular blocks, pictures which have been coded or decoded are used as reference pictures, and a motion is predicted from the reference pictures. A method of predicting a motion based on this motion compensation is referred to as inter-prediction or motion-compensated prediction. In the inter-prediction of the MPEG-4 AVC/H.264 standard, motion compensation is performed in such a manner that a plurality of pictures can be used as reference pictures, and a most probable reference picture is selected in respective blocks from the plurality of reference pictures. Thus, a reference index is allocated to respective reference pictures and the reference pictures are specified by the reference index. In B pictures, two reference pictures at most can be selected from coded or decoded reference pictures and be used for inter-prediction. Prediction from these two reference pictures is classified into L0 prediction (list-0 prediction) which is mainly used as forward prediction and L1 prediction (list-1 prediction) which is mainly used as backward prediction.

Further, bi-prediction which uses two inter-prediction modes of L0 prediction and L1 prediction simultaneously is also defined. In the case of bi-prediction, bidirectional prediction is performed to obtain inter-prediction signals in L0 and L1 prediction modes, which are multiplied by a weighting factor and are superimposed by adding an offset value to thereby construct a final inter-prediction picture signal. As the weighting factor and offset values used for weighted prediction, a representative value for each reference picture of lists is set and coded in respective pictures. Coding information related to inter-prediction includes a prediction mode for classifying L0 prediction, L1 prediction, and bi-prediction for each block, a reference index for specifying a reference picture for each reference list of each block, and a motion vector representing a moving direction and a movement amount of a block. These items of coding information are coded or decoded.

Further, in the MPEG-4 AVC/H.264 scheme, a direct mode of constructing inter-prediction information of coding/decoding target block from inter-prediction information of a coded/decoded block is defined. Since the direct mode does not require coding of inter-prediction information, coding efficiency is improved.

A temporal direct mode which uses correlation of inter-prediction information in the temporal direction will be described with reference to FIG. 36. A picture of which the L1 reference index is registered to "0" is referred to as a reference picture colPic. A block at the same position as a coding/decoding target block in the reference picture colPic is referred to as a reference block.

If a reference block is coded using L0 prediction, a L0 motion vector of the reference block is referred to as a reference motion vector mvCol. If the reference block is not coded using L0 prediction but is coded using L1 prediction, a L1 motion vector of the reference block is referred to as a reference motion vector mvCol. A picture that the reference motion vector mvCol refers to is referred to as a L0 reference picture of the temporal direct mode, and the reference picture colPic is referred to as a L1 reference picture of the temporal direct mode.

A L0 motion vector mvL0 and a L1 motion vector mvL1 of the temporal direct mode are derived from the reference motion vector mvCol by performing a scaling process.

A POC of a L0 reference picture of the temporal direct mode is subtracted from a POC of the reference picture colPic to derive a picture-to-picture distance td. A POC is a variable associated with a picture to be coded and a value that is incremented by 1 in the picture outputting/displaying order is set as the POC. A difference between the POCs of two pictures represents a picture-to-picture distance in a time axis direction.

$td=(POC$ of reference picture colPic$)-(POC$ of $L0$ reference picture of temporal direct mode$)$ The POC of a L0 reference picture of the temporal direct mode is subtracted from the POC of a coding/decoding target picture to derive a picture-to-picture distance tb.

$tb=(POC$ of coding/decoding target picture$)-(POC$ of $L0$ reference picture of temporal direct mode$)$ A L0 motion vector mvL0 of the temporal direct mode is derived from the reference motion vector mvCol by performing a scaling process.

$mvL0=tb/td*mvCol$

A reference motion vector mvCol is subtracted from the L0 motion vector mvL0 of the temporal direct mode to derive a L1 motion vector mvL1.

$mvL1=mvL0-mvCol$

When a moving picture coding device and a moving picture decoding device have low processing capability, the process of the temporal direct mode may be omitted.

Patent Literature 1: JP 2004-129191 A

Under such a situation, the present inventors have recognized the need to further compress coding information and reduce an entire coding amount in a moving picture coding scheme which uses motion-compensated prediction.

SUMMARY OF THE INVENTION

The present invention has been made in view of such a situation, and an object thereof is to provide a moving picture coding and decoding technique of reducing a coding amount of coding information to improve coding efficiency by deriving candidates for prediction information used in motion-compensated prediction according to a situation.

In order to achieve the object, a moving picture coding device according to one aspect of the present invention is one codes moving pictures using motion-compensated prediction in units of blocks obtained by partitioning each picture of the moving pictures, and the moving picture coding device includes: a prediction information coding unit (110) that codes information indicating a designated number of inter-prediction information candidates; a prediction information deriving unit (104) that derives the inter-prediction information candidates from inter-prediction information of a prediction block neighboring to a coding target prediction block or a prediction block present at the same position as or near the coding target prediction block in a coded picture at a temporally different position from the coding target prediction block; a candidate list constructing unit (130) that constructs an inter-prediction information candidate list from the derived inter-prediction information candidates; a candidate supplementing unit that derives inter-prediction information candidates of which the prediction mode, the reference index, and the motion vector have predetermined values until the number of inter-prediction information candidates included in the inter-prediction information candidate list reaches the designated number of inter-prediction information candidates when the number of inter-prediction information candidates included in the constructed inter-prediction information candidate list is smaller than the designated number of inter-prediction information candidates and adds the derived inter-prediction information candidates to the constructed inter-prediction information candidate list; and a motion-compensated prediction unit (105) that selects one inter-prediction information candidate from the inter-prediction information candidates included in the inter-prediction information candidate list and performs inter-prediction on the coding target prediction block using the selected inter-prediction information candidate.

Another aspect of the present invention provides a moving picture coding device. The device is a moving picture coding device that codes moving pictures using motion-compensated prediction in units of blocks obtained by partitioning each picture of the moving pictures, including: a prediction information coding unit (110) that codes information indicating a designated number of inter-prediction information candidates; a prediction information deriving unit (104) that derives the inter-prediction information candidates from inter-prediction information of a prediction block neighboring to a coding target prediction block or a prediction block present at the same position as or near the coding target prediction block in a coded picture at a temporally different position from the coding target prediction block; a candidate list constructing unit (130) that constructs an inter-prediction information candidate list from the derived inter-prediction information candidates; a candidate adding unit (134) that derives inter-prediction information candidates of which the prediction mode, the reference index, and the motion vector have predetermined values when the number of inter-prediction information candidates included in the constructed inter-prediction information candidate list is smaller than the designated number of inter-prediction information candidates and adds the derived inter-prediction information candidates to the constructed inter-prediction information candidate list and that derives one or a plurality of inter-prediction information candidates of which at least one of the prediction mode, the reference index, and the motion vector is changed from that of the inter-prediction information candidates having the predetermined value when the number of inter-prediction information candidates included in the added inter-prediction information candidate list is smaller than the designated number of inter-prediction information candidates and additionally adds the derived inter-prediction information candidates to the added inter-prediction information candidate list; a candidate supplementing unit that derives inter-prediction information candidates of which the prediction mode, the reference index, and the motion vector have predetermined values until the number of inter-prediction information candidates included in the additionally added inter-prediction information candidate list reaches the designated number of inter-prediction information candidates when the number of inter-prediction information candidates included in the additionally added inter-prediction information candidate list is smaller than the designated number of inter-prediction information candidates and additionally adds the derived inter-prediction information candidates to the additionally added inter-prediction information candidate list; and a motion-compensated prediction unit (105) that selects one inter-prediction information candidate from the inter-prediction information candidates included in the inter-prediction information candidate list and performs inter-prediction on the coding target prediction block using the selected inter-prediction information candidate.

Still another aspect of the present invention provides a moving picture coding device. The device is a moving picture coding device that codes a bitstream obtained by coding moving pictures using motion-compensated prediction in units of blocks obtained by partitioning each picture of the moving pictures, including: a prediction information coding unit (110) that codes information indicating a designated number of inter-prediction information candidates; a prediction information deriving unit (104) that derives the inter-prediction information candidates from inter-prediction information of a prediction block neighboring to a coding target prediction block or a prediction block present at the same position as or near the coding target prediction block in a coded picture at a temporally different position from the coding target prediction block; a candidate list constructing unit (130) that constructs an inter-prediction information candidate list from the derived inter-prediction information candidates; a candidate supplementing unit that derives inter-prediction information candidates of which the prediction mode, the reference index, and the motion vector have predetermined values when the number of inter-prediction information candidates included in the constructed inter-prediction information candidate list is smaller than the designated number of inter-prediction information candidates and adds the derived inter-prediction information candidates to the constructed inter-prediction information candidate list, that derives one or a plurality of inter-prediction information candidates of which the prediction mode and the motion vector have the same value as and the reference index is changed from that of the inter-prediction information candidates having the predetermined value when the number of inter-prediction information candidates included in the added inter-prediction information candidate list is smaller than the designated number of inter-prediction information candidates and additionally adds the derived inter-prediction information candidates to the added inter-prediction information candidate list, and that derives inter-prediction information candidates of which the prediction mode, the reference index, and the motion vector have predetermined values until the number of inter-prediction information candidates included in the additionally added inter-prediction information candidate list reaches the designated number of inter-prediction information candidates when the number of inter-prediction information candidates included in the additionally added inter-prediction information candidate list is smaller than the designated number of inter-prediction information candidates and additionally adds the derived inter-prediction information candidates to the additionally added inter-prediction information candidate list; and a motion-compensated prediction unit (105) that selects one inter-prediction information candidate from the inter-prediction information candidates included in the inter-prediction information candidate list and performs inter-prediction on the coding target prediction block using the selected inter-prediction information candidate.

Still another aspect of the present invention provides a moving picture coding device. The device is a moving picture coding device that codes moving pictures using motion-compensated prediction in units of blocks obtained by partitioning each picture of the moving pictures, including: a prediction information deriving unit (104) that stores and initializes a designated number of inter-prediction information candidates having predetermined prediction mode, reference index, and motion vector in advance in an inter-prediction information candidate list in which the designated number of inter-prediction information candidates are stored, and then, derives inter-prediction information candidates from inter-prediction information of a prediction block neighboring to a coding target prediction block or a prediction block present at the same position as or near the coding target prediction block in a coded picture at a temporally different position from the coding target prediction block; and a motion-compensated prediction unit (105) that selects one inter-prediction information candidate from the inter-prediction information candidates included in the inter-prediction information candidate list and performs inter-prediction on the coding target prediction block using the selected inter-prediction information candidate.

Still another aspect of the present invention provides a moving picture coding device. The device is a moving picture coding device that codes moving pictures using motion-compensated prediction in units of blocks obtained by partitioning each picture of the moving pictures, including: a prediction information coding unit (110) that codes information indicating a designated number of inter-prediction information candidates; a prediction information deriving unit (104) that derives inter-prediction information candidates based on the number of candidates designated as the number of inter-prediction information candidates from inter-prediction information of a prediction block neighboring to a coding target prediction block or a prediction block present at the same position as or near the coding target prediction block in a coded picture at a temporally different position from the coding target prediction block; a candidate list constructing unit (130) that constructs an inter-prediction information candidate list from the derived inter-prediction information candidates; and a motion-compensated prediction unit (105) that selects one inter-prediction information candidate from inter-prediction information candidates included in the inter-prediction information candidate list when the designated number of candidates is larger than or equal to 1 and performs inter-prediction on the coding target prediction block using the selected inter-prediction information candidate and that performs inter-prediction of the coding target prediction block using inter-prediction information having a predetermined value when the designated number of candidates is 0.

Still another aspect of the present invention provides a moving picture coding device. The device is a moving picture coding device that codes moving pictures using motion-compensated prediction in units of blocks obtained by partitioning each picture of the moving pictures, including: a prediction information deriving unit (104) that derives inter-prediction information candidates from inter-prediction information of a prediction block neighboring to a coding target prediction block or a prediction block present at the same position as or near the coding target prediction block in a coded picture at a temporally different position from the coding target prediction block; a candidate supplementing unit that supplements inter-prediction information candidates having the same prediction mode, reference index, and motion vector until the number of inter-prediction information candidates reaches the designated number of candidates when the number of inter-prediction information candidates is smaller than the designated number of candidates; and a motion-compensated prediction unit (105) that selects one inter-prediction information candidate from the inter-prediction information candidates and performs inter-prediction of the coding target prediction block using the selected inter-prediction information candidate.

Still another aspect of the present invention is a moving picture coding method. The method is a moving picture coding method of coding moving pictures using motion-compensated prediction in units of blocks obtained by partitioning each picture of the moving pictures, including: a prediction information coding step of coding information indicating a designated number of inter-prediction information candidates; a prediction information deriving step of deriving the inter-prediction information candidates from inter-prediction information of a prediction block neighboring to a coding target prediction block or a prediction block present at the same position as or near the coding target prediction block in a coded picture at a temporally different position from the coding target prediction block; a candidate list constructing step of constructing an inter-prediction information candidate list from the derived inter-prediction information candidates; a candidate supplementing step of deriving inter-prediction information candidates of which the prediction mode, the reference index, and the motion vector have predetermined values until the number of inter-prediction information candidates included in the inter-prediction information candidate list reaches the designated number of inter-prediction information candidates when the number of inter-prediction information candidates included in the constructed inter-prediction information candidate list is smaller than the designated number of inter-prediction information candidates and adding the derived inter-prediction information candidates to the constructed inter-prediction information candidate list; and a motion-compensated prediction step of selecting one inter-prediction information candidate from the inter-prediction information candidates included in the inter-prediction information candidate list and performing inter-prediction on the coding target prediction block using the selected inter-prediction information candidate.

Still another aspect of the present invention provides a moving picture coding method. The method is a moving picture coding method of coding moving pictures using motion-compensated prediction in units of blocks obtained by partitioning each picture of the moving pictures, including: a prediction information number coding step of coding information indicating a designated number of inter-prediction information candidates; a prediction information deriving step of deriving the inter-prediction information candidates from inter-prediction information of a prediction block neighboring to a coding target prediction block or a prediction block present at the same position as or near the coding target prediction block in a coded picture at a temporally different position from the coding target prediction block; a candidate list constructing step of constructing an inter-prediction information candidate list from the derived inter-prediction information candidates; a candidate adding step of deriving inter-prediction information candidates of which the prediction mode, the reference index, and the motion vector have predetermined values when the number of inter-prediction information candidates included in the constructed inter-prediction information candidate list is smaller than the designated number of inter-prediction information candidates and adding the derived inter-prediction information candidates to the constructed inter-prediction information candidate list, and deriving one or a plurality of inter-prediction information candidates of which at least one of the prediction mode, the reference index, and the motion vector is changed from that of the inter-prediction information candidates having the predetermined value when the number of inter-prediction information candidates included in the added inter-prediction information candidate list is smaller than the designated number of inter-prediction information candidates and additionally adding the derived inter-prediction information candidates to the added inter-prediction information candidate list; a candidate supplementing step of deriving inter-prediction information candidates of which the prediction mode, the reference index, and the motion vector have predetermined values until the number of inter-prediction information candidates included in the additionally added inter-prediction information candidate list reaches the designated number of inter-prediction information candidates when the number of inter-prediction information candidates included in the additionally added inter-prediction information candidate list is smaller than the designated number of inter-prediction information candidates and additionally adding the derived inter-prediction information candidates to the additionally added inter-prediction information candidate list; and a motion-compensated prediction step of selecting one inter-prediction information candidate from the inter-prediction information candidates included in the inter-prediction information candidate list and performing inter-prediction on the coding target prediction block using the selected inter-prediction information candidate.

Still another aspect of the present invention provides a moving picture coding method. The method is a moving picture coding method of coding a bitstream obtained by coding moving pictures using motion-compensated prediction in units of blocks obtained by partitioning each picture of the moving pictures, including: a prediction information number coding step of coding information indicating a designated number of inter-prediction information candidates; a prediction information deriving step of deriving the inter-prediction information candidates from inter-prediction information of a prediction block neighboring to a coding target prediction block or a prediction block present at the same position as or near the coding target prediction block in a coded picture at a temporally different position from the coding target prediction block; a candidate list constructing step of constructing an inter-prediction information candidate list from the derived inter-prediction information candidates; a candidate supplementing step of deriving inter-prediction information candidates of which the prediction mode, the reference index, and the motion vector have predetermined values when the number of inter-prediction information candidates included in the constructed inter-prediction information candidate list is smaller than the designated number of inter-prediction information candidates and adding the derived inter-prediction information candidates to the constructed inter-prediction information candidate list, deriving one or a plurality of inter-prediction information candidates of which the prediction mode and the motion vector have the same value as and the reference index is changed from that of the inter-prediction information candidates having the predetermined value when the number of inter-prediction information candidates included in the added inter-prediction information candidate list is smaller than the designated number of inter-prediction information candidates and additionally adds the derived inter-prediction information candidates to the added inter-prediction information candidate list, and deriving inter-prediction information candidates of which the prediction mode, the reference index, and the motion vector have predetermined values until the number of inter-prediction information candidates included in the additionally added inter-prediction information candidate list reaches the designated number of inter-prediction information candidates when the number of inter-prediction information candidates included in the additionally added inter-prediction information candidate list is smaller than the designated number of inter-prediction information candidates and additionally adding the derived inter-prediction information candidates to the additionally added inter-prediction information candidate list; and a motion-compensated prediction step of selecting one inter-prediction information candidate from the inter-prediction information candidates included in the inter-prediction information candidate list and performing inter-prediction on the coding target prediction block using the selected inter-prediction information candidate.

Still another aspect of the present invention provides a moving picture coding method. The method is a moving picture coding method of coding moving pictures using motion-compensated prediction in units of blocks obtained by partitioning each picture of the moving pictures, including: a prediction information deriving step of storing and initializing a designated number of inter-prediction information candidates having predetermined prediction mode, reference index, and motion vector in advance in an inter-prediction information candidate list in which the designated number of inter-prediction information candidates are stored, and then, deriving inter-prediction information candidates from inter-prediction information of a prediction block neighboring to a coding target prediction block or a prediction block present at the same position as or near the coding target prediction block in a coded picture at a temporally different position from the coding target prediction block; and a motion-compensated prediction step of selecting one inter-prediction information candidate from the inter-prediction information candidates included in the inter-prediction information candidate list and performing inter-prediction on the coding target prediction block using the selected inter-prediction information candidate.

Still another aspect of the present invention provides a moving picture coding method. The method is a moving picture coding method of coding moving pictures using motion-compensated prediction in units of blocks obtained by partitioning each picture of the moving pictures, including: a prediction information number coding step of coding information indicating a designated number of inter-prediction information candidates; a prediction information deriving step of deriving inter-prediction information candidates based on the number of candidates designated as the number of inter-prediction information candidates from inter-prediction information of a prediction block neighboring to a coding target prediction block or a prediction block present at the same position as or near the coding target prediction block in a coded picture at a temporally different position from the coding target prediction block; a candidate list constructing step of constructing an inter-prediction information candidate list from the derived inter-prediction information candidates; and a motion-compensated prediction step of selecting one inter-prediction information candidate from inter-prediction information candidates included in the inter-prediction information candidate list when the designated number of candidates is larger than or equal to 1 and performing inter-prediction on the coding target prediction block using the selected inter-prediction information candidate and performing inter-prediction of the coding target prediction block using inter-prediction information having a predetermined value when the designated number of candidates is 0.

Still another aspect of the present invention provides a transmitter. The transmitter includes: a packet processor that packetizes a bitstream coded according to a moving picture coding method of coding moving pictures using motion-compensated prediction in units of blocks obtained by partitioning each picture of the moving pictures to obtain the packetized bitstream; and a transmitting unit that transmits the packetized bitstream. The moving picture coding method includes: a prediction information number coding step of coding information indicating a designated number of inter-prediction information candidates; a prediction information deriving step of deriving the inter-prediction information candidates from inter-prediction information of a prediction block neighboring to a coding target prediction block or a prediction block present at the same position as or near the coding target prediction block in a coded picture at a temporally different position from the coding target prediction block; a candidate list constructing step of constructing an inter-prediction information candidate list from the derived inter-prediction information candidates; a candidate adding step of deriving inter-prediction information candidates of which the prediction mode, the reference index, and the motion vector have predetermined values when the number of inter-prediction information candidates included in the constructed inter-prediction information candidate list is smaller than the designated number of inter-prediction information candidates and adding the derived inter-prediction information candidates to the constructed inter-prediction information candidate list, and deriving one or a plurality of inter-prediction information candidates of which at least one of the prediction mode, the reference index, and the motion vector is changed from that of the inter-prediction information candidates having the predetermined value when the number of inter-prediction information candidates included in the added inter-prediction information candidate list is smaller than the designated number of inter-prediction information candidates and additionally adding the derived inter-prediction information candidates to the added inter-prediction information candidate list; a candidate supplementing step of deriving inter-prediction information candidates of which the prediction mode, the reference index, and the motion vector have predetermined values until the number of inter-prediction information candidates included in the additionally added inter-prediction information candidate list reaches the designated number of inter-prediction information candidates when the number of inter-prediction information candidates included in the additionally added inter-prediction information candidate list is smaller than the designated number of inter-prediction information candidates and additionally adding the derived inter-prediction information candidates to the additionally added inter-prediction information candidate list; and a motion-compensated prediction step of selecting one inter-prediction information candidate from the inter-prediction information candidates included in the inter-prediction information candidate list and performing inter-prediction on the coding target prediction block using the selected inter-prediction information candidate.

Still another aspect of the present invention provides a transmission method. The method includes: a packet processing step of packetizing a bitstream coded according to a moving picture coding method of coding moving pictures using motion-compensated prediction in units of blocks obtained by partitioning each picture of the moving pictures to obtain the packetized bitstream; and a transmitting step of transmitting the packetized bit stream. The moving picture coding method includes: a prediction information number coding step of coding information indicating a designated number of inter-prediction information candidates; a prediction information deriving step of deriving the inter-prediction information candidates from inter-prediction information of a prediction block neighboring to a coding target prediction block or a prediction block present at the same position as or near the coding target prediction block in a coded picture at a temporally different position from the coding target prediction block; a candidate list constructing step of constructing an inter-prediction information candidate list from the derived inter-prediction information candidates; a candidate adding step of deriving inter-prediction information candidates of which the prediction mode, the reference index, and the motion vector have predetermined values when the number of inter-prediction information candidates included in the constructed inter-prediction information candidate list is smaller than the designated number of inter-prediction information candidates and adding the derived inter-prediction information candidates to the constructed inter-prediction information candidate list, and deriving one or a plurality of inter-prediction information candidates of which at least one of the prediction mode, the reference index, and the motion vector is changed from that of the inter-prediction information candidates having the predetermined value when the number of inter-prediction information candidates included in the added inter-prediction information candidate list is smaller than the designated number of inter-prediction information candidates and additionally adding the derived inter-prediction information candidates to the added inter-prediction information candidate list; a candidate supplementing step of deriving inter-prediction information candidates of which the prediction mode, the reference index, and the motion vector have predetermined values until the number of inter-prediction information candidates included in the additionally added inter-prediction information candidate list reaches the designated number of inter-prediction information candidates when the number of inter-prediction information candidates included in the additionally added inter-prediction information candidate list is smaller than the designated number of inter-prediction information candidates and additionally adding the derived inter-prediction information candidates to the additionally added inter-prediction information candidate list; and a motion-compensated prediction step of selecting one inter-prediction information candidate from the inter-prediction information candidates included in the inter-prediction information candidate list and performing inter-prediction on the coding target prediction block using the selected inter-prediction information candidate.

A moving picture decoding device according to an aspect of the present invention is a moving picture decoding device that decodes a bitstream obtained by coding moving pictures using motion-compensated prediction in units of blocks obtained by partitioning each picture of the moving pictures, including: a prediction information decoding unit that decodes information indicating a previously designated number of inter-prediction information candidates; a prediction information deriving unit (205) that derives the inter-prediction information candidates from inter-prediction information of a prediction block neighboring to a decoding target prediction block or a prediction block present at the same position as or near the decoding target prediction block in a decoded picture at a temporally different position from the decoding target prediction block; a candidate list constructing unit (230) that constructs an inter-prediction information candidate list from the derived inter-prediction information candidates; a candidate supplementing unit that derives inter-prediction information candidates of which the prediction mode, the reference index, and the motion vector have predetermined values until the number of inter-prediction information candidates included in the inter-prediction information candidate list reaches the previously designated number of inter-prediction information candidates when the number of inter-prediction information candidates included in the constructed inter-prediction information candidate list is smaller than the previously designated number of inter-prediction information candidates and adds the derived inter-prediction information candidates to the constructed inter-prediction information candidate list; and a motion-compensated prediction unit (206) that selects one inter-prediction information candidate from the inter-prediction information candidates and performs inter-prediction on the decoding target prediction block using the selected inter-prediction information candidate.

Another aspect of the present invention provides a moving picture decoding device. The device is a moving picture decoding device that decodes a bitstream obtained by coding moving pictures using motion-compensated prediction in units of blocks obtained by partitioning each picture of the moving pictures, including: a prediction information decoding unit that decodes information indicating a previously designated number of inter-prediction information candidates; a prediction information deriving unit (205) that derives the inter-prediction information candidates from inter-prediction information of a prediction block neighboring to a decoding target prediction block or a prediction block present at the same position as or near the decoding target prediction block in a decoded picture at a temporally different position from the decoding target prediction block; a candidate list constructing unit (230) that constructs an inter-prediction information candidate list from the derived inter-prediction information candidates; a candidate adding unit (234) that derives inter-prediction information candidates of which the prediction mode, the reference index, and the motion vector have predetermined values when the number of inter-prediction information candidates included in the constructed inter-prediction information candidate list is smaller than the designated number of inter-prediction information candidates and adds the derived inter-prediction information candidates to the constructed inter-prediction information candidate list and that derives one or a plurality of inter-prediction information candidates of which at least one of the prediction mode, the reference index, and the motion vector is changed from that of the inter-prediction information candidates having the predetermined value when the number of inter-prediction information candidates included in the added inter-prediction information candidate list is smaller than the designated number of inter-prediction information candidates and additionally adds the derived inter-prediction information candidates to the added inter-prediction information candidate list; a candidate supplementing unit that derives inter-prediction information candidates of which the prediction mode, the reference index, and the motion vector have predetermined values until the number of inter-prediction information candidates included in the additionally added inter-prediction information candidate list reaches the previously designated number of inter-prediction information candidates when the number of inter-prediction information candidates included in the additionally added inter-prediction information candidate list is smaller than the previously designated number of inter-prediction information candidates and additionally adds the derived inter-prediction information candidates to the additionally added inter-prediction information candidate list; and a motion-compensated prediction unit (206) that selects one inter-prediction information candidate from the inter-prediction information candidates and performs inter-prediction on the decoding target prediction block using the selected inter-prediction information candidate.

Still another aspect of the present invention provides a moving picture decoding device. The device is a moving picture decoding device that decodes a bitstream obtained by coding moving pictures using motion-compensated prediction in units of blocks obtained by partitioning each picture of the moving pictures, including: a prediction information decoding unit that decodes information indicating a previously designated number of inter-prediction information candidates; a prediction information deriving unit (205) that derives the inter-prediction information candidates from inter-prediction information of a prediction block neighboring to a decoding target prediction block or a prediction block present at the same position as or near the decoding target prediction block in a decoded picture at a temporally different position from the decoding target prediction block; a candidate list constructing unit (230) that constructs an inter-prediction information candidate list from the derived inter-prediction information candidates; a candidate supplementing unit that derives inter-prediction information candidates of which the prediction mode, the reference index, and the motion vector have predetermined values when the number of inter-prediction information candidates included in the constructed inter-prediction information candidate list is smaller than the previously designated number of inter-prediction information candidates and adds the derived inter-prediction information candidates to the constructed inter-prediction information candidate list, that derives one or a plurality of inter-prediction information candidates of which the prediction mode and the motion vector have the same value as and the reference index is changed from that of the inter-prediction information candidates having the predetermined value when the number of inter-prediction information candidates included in the added inter-prediction information candidate list is smaller than the previously designated number of inter-prediction information candidates and additionally adds the derived inter-prediction information candidates to the added inter-prediction information candidate list, and that derives inter-prediction information candidates of which the prediction mode, the reference index, and the motion vector have predetermined values until the number of inter-prediction information candidates included in the additionally added inter-prediction information candidate list reaches the previously designated number of inter-prediction information candidates when the number of inter-prediction information candidates included in the additionally added inter-prediction information candidate list is smaller than the previously designated number of inter-prediction information candidates and additionally adds the derived inter-prediction information candidates to the additionally added inter-prediction information candidate list; and a motion-compensated prediction unit (206) that selects one inter-prediction information candidate from the inter-prediction information candidates and performs inter-prediction on the decoding target prediction block using the selected inter-prediction information candidate.

Still another aspect of the present invention provides a moving picture decoding device. The device is a moving picture decoding device that decodes a bitstream obtained by coding moving pictures using motion-compensated prediction in units of blocks obtained by partitioning each picture of the moving pictures, including: a prediction information decoding unit that decodes a designated number of inter-prediction information candidates; a prediction information deriving unit (205) that stores and initializes a designated number of inter-prediction information candidates having predetermined prediction mode, reference index, and motion vector in advance in an inter-prediction information candidate list in which the designated number of inter-prediction information candidates are stored, and then, derives inter-prediction information candidates from inter-prediction information of a prediction block neighboring to a decoding target prediction block or a prediction block present at the same position as or near the decoding target prediction block in a decoded picture at a temporally different position from the decoding target prediction block; and a motion-compensated prediction unit (206) that selects one inter-prediction information candidate from the inter-prediction information candidates included in the inter-prediction information candidate list and performs inter-prediction on the decoding target prediction block using the selected inter-prediction information candidate.

Still another aspect of the present invention provides a moving picture decoding device. The device is a moving picture coding device that codes moving pictures using motion-compensated prediction in units of blocks obtained by partitioning each picture of the moving pictures, including: a prediction information decoding unit that decodes information indicating a previously designated number of inter-prediction information candidates; a prediction information deriving unit (205) that derives inter-prediction information candidates based on the number of candidates designated as the number of inter-prediction information candidates from inter-prediction information of a prediction block neighboring to a decoding target prediction block or a prediction block present at the same position as or near the decoding target prediction block in a decoded picture at a temporally different position from the decoding target prediction block; a candidate list constructing unit (230) that constructs an inter-prediction information candidate list from the derived inter-prediction information candidates; and a motion-compensated prediction unit (206) that selects one inter-prediction information candidate from inter-prediction information candidates included in the inter-prediction information candidate list when the previously designated number of candidates is larger than or equal to 1 and performs inter-prediction on the decoding target prediction block using the selected inter-prediction information candidate and that performs inter-prediction on the decoding target prediction block using inter-prediction information having a predetermined value when the previously designated number of candidates is 0.

Still another aspect of the present invention provides a moving picture decoding device. The device is a moving picture decoding device that decodes a bitstream obtained by coding moving pictures using motion-compensated prediction in units of blocks obtained by partitioning each picture of the moving pictures, including: a prediction information deriving unit (205) that derives inter-prediction information candidates from inter-prediction information of a prediction block neighboring to a decoding target prediction block or a prediction block present at the same position as or near the decoding target prediction block in a decoded picture at a temporally different position from the decoding target prediction block; a candidate supplementing unit that supplements inter-prediction information candidates having the same prediction mode, reference index, and motion vector values until the number of inter-prediction information candidates reaches the designated number of candidates when the number of inter-prediction information candidates is smaller than the designated number of candidates; and a motion-compensated prediction unit (206) that selects one inter-prediction information candidate from the inter-prediction information candidates and performs inter-prediction on the decoding target prediction block using the selected inter-prediction information candidate.

Still another aspect of the present invention provides a moving picture decoding method. The method is a moving picture decoding method of decoding a bit stream obtained by coding moving pictures using motion-compensated prediction in units of blocks obtained by partitioning each picture of the moving pictures, including: a prediction information decoding step of decoding information indicating a previously designated number of inter-prediction information candidates; a prediction information deriving step of deriving the inter-prediction information candidates from inter-prediction information of a prediction block neighboring to a decoding target prediction block or a prediction block present at the same position as or near the decoding target prediction block in a decoded picture at a temporally different position from the decoding target prediction block; a candidate list constructing step of constructing an inter-prediction information candidate list from the derived inter-prediction information candidates; a candidate supplementing step of deriving inter-prediction information candidates of which the prediction mode, the reference index, and the motion vector have predetermined values until the number of inter-prediction information candidates included in the inter-prediction information candidate list reaches the previously designated number of inter-prediction information candidates when the number of inter-prediction information candidates included in the constructed inter-prediction information candidate list is smaller than the previously designated number of inter-prediction information candidates and adding the derived inter-prediction information candidates to the constructed inter-prediction information candidate list; and a motion-compensated prediction step of selecting one inter-prediction information candidate from the inter-prediction information candidates and performing inter-prediction on the decoding target prediction block using the selected inter-prediction information candidate.

Still another aspect of the present invention provides a moving picture decoding method. The method is a moving picture decoding method of decoding a bit stream obtained by coding moving pictures using motion-compensated prediction in units of blocks obtained by partitioning each picture of the moving pictures, including: a prediction information number decoding step of decoding information indicating a previously designated number of inter-prediction information candidates; a prediction information deriving step of deriving the inter-prediction information candidates from inter-prediction information of a prediction block neighboring to a decoding target prediction block or a prediction block present at the same position as or near the decoding target prediction block in a decoded picture at a temporally different position from the decoding target prediction block; a candidate list constructing step of constructing an inter-prediction information candidate list from the derived inter-prediction information candidates; a candidate adding step of deriving inter-prediction information candidates of which the prediction mode, the reference index, and the motion vector have predetermined values when the number of inter-prediction information candidates included in the constructed inter-prediction information candidate list is smaller than the previously designated number of inter-prediction information candidates and adding the derived inter-prediction information candidates to the constructed inter-prediction information candidate list, and deriving one or a plurality of inter-prediction information candidates of which at least one of the prediction mode, the reference index, and the motion vector is changed from that of the inter-prediction information candidates having the predetermined value when the number of inter-prediction information candidates included in the added inter-prediction information candidate list is smaller than the previously designated number of inter-prediction information candidates and additionally adding the derived inter-prediction information candidates to the added inter-prediction information candidate list; a candidate supplementing step of deriving inter-prediction information candidates of which the prediction mode, the reference index, and the motion vector have predetermined values until the number of inter-prediction information candidates included in the additionally added inter-prediction information candidate list reaches the previously designated number of inter-prediction information candidates when the number of inter-prediction information candidates included in the additionally added inter-prediction information candidate list is smaller than the previously designated number of inter-prediction information candidates and additionally adding the derived inter-prediction information candidates to the additionally added inter-prediction information candidate list; and a motion-compensated prediction step of selecting one inter-prediction information candidate from the inter-prediction information candidates and performing inter-prediction on the decoding target prediction block using the selected inter-prediction information candidate.

Still another aspect of the present invention provides a moving picture decoding method. The method is a moving picture decoding method of decoding a bit stream obtained by coding moving pictures using motion-compensated prediction in units of blocks obtained by partitioning each picture of the moving pictures, including: a prediction information number decoding step of decoding information indicating a previously designated number of inter-prediction information candidates; a prediction information deriving step of deriving the inter-prediction information candidates from inter-prediction information of a prediction block neighboring to a decoding target prediction block or a prediction block present at the same position as or near the decoding target prediction block in a decoded picture at a temporally different position from the decoding target prediction block; a candidate list constructing step of constructing an inter-prediction information candidate list from the derived inter-prediction information candidates; a candidate adding step of deriving inter-prediction information candidates of which the prediction mode, the reference index, and the motion vector have predetermined values when the number of inter-prediction information candidates included in the constructed inter-prediction information candidate list is smaller than the previously designated number of inter-prediction information candidates and adding the derived inter-prediction information candidates to the constructed inter-prediction information candidate list, deriving one or a plurality of inter-prediction information candidates of which the prediction mode and the motion vector have the same value as and the reference index is changed from that of the inter-prediction information candidates having the predetermined value when the number of inter-prediction information candidates included in the added inter-prediction information candidate list is smaller than the previously designated number of inter-prediction information candidates and additionally adds the derived inter-prediction information candidates to the added inter-prediction information candidate list, and deriving inter-prediction information candidates of which the prediction mode, the reference index, and the motion vector have predetermined values until the number of inter-prediction information candidates included in the additionally added inter-prediction information candidate list reaches the previously designated number of inter-prediction information candidates when the number of inter-prediction information candidates included in the additionally added inter-prediction information candidate list is smaller than the previously designated number of inter-prediction information candidates and additionally adding the derived inter-prediction information candidates to the additionally added inter-prediction information candidate list; and a motion-compensated prediction step of selecting one inter-prediction information candidate from the inter-prediction information candidates and performing inter-prediction on the decoding target prediction block using the selected inter-prediction information candidate.

Still another aspect of the present invention provides a moving picture decoding method. The method is a moving picture decoding method of decoding a bit stream obtained by coding moving pictures using motion-compensated prediction in units of blocks obtained by partitioning each picture of the moving pictures, including: a prediction information number decoding step of decoding a designated number of inter-prediction information candidates; a prediction information deriving step of storing and initializing a designated number of inter-prediction information candidates having predetermined prediction mode, reference index, and motion vector in advance in an inter-prediction information candidate list in which the designated number of inter-prediction information candidates are stored, and then, deriving inter-prediction information candidates from inter-prediction information of a prediction block neighboring to a decoding target prediction block or a prediction block present at the same position as or near the decoding target prediction block in a decoded picture at a temporally different position from the decoding target prediction block; and a motion-compensated prediction step of selecting one inter-prediction information candidate from the inter-prediction information candidates included in the inter-prediction information candidate list and performing inter-prediction on the decoding target prediction block using the selected inter-prediction information candidate.

Still another aspect of the present invention provides a moving picture decoding method. The method is a moving picture coding method of coding moving pictures using motion-compensated prediction in units of blocks obtained by partitioning each picture of the moving pictures, including: a prediction information decoding step of decoding information indicating a previously designated number of inter-prediction information candidates; a prediction information deriving step of deriving inter-prediction information candidates based on the number of candidates designated as the number of inter-prediction information candidates from inter-prediction information of a prediction block neighboring to a decoding target prediction block or a prediction block present at the same position as or near the decoding target prediction block in a decoded picture at a temporally different position from the decoding target prediction block; a candidate list constructing step of constructing an inter-prediction information candidate list from the derived inter-prediction information candidates; and a motion-compensated prediction step of selecting one inter-prediction information candidate from inter-prediction information candidates included in the inter-prediction information candidate list when the previously designated number of candidates is larger than or equal to 1 and performing inter-prediction on the decoding target prediction block using the selected inter-prediction information candidate and performing inter-prediction on the decoding target prediction block using inter-prediction information having a predetermined value when the previously designated number of candidates is 0.

Another aspect of the present invention provides a receiver. The receiver is a receiver that receives and decodes a bitstream obtained by coding moving pictures, including: a receiving unit that receives a bitstream obtained by packetizing a bitstream obtained by coding moving pictures using motion-compensated prediction in units of blocks obtained by partitioning each picture of the moving pictures; a reconstructing unit that packetizing the received bitstream to reconstruct an original bitstream; a prediction information decoding unit that decodes information indicating a previously designated number of inter-prediction information candidates from the reconstructed bitstream; a prediction information deriving unit (205) that derives the inter-prediction information candidates from inter-prediction information of a prediction block neighboring to a decoding target prediction block or a prediction block present at the same position as or near the decoding target prediction block in a decoded picture at a temporally different position from the decoding target prediction block; a candidate list constructing unit (230) that constructs an inter-prediction information candidate list from the derived inter-prediction information candidates; a candidate adding unit (234) that derives inter-prediction information candidates of which the prediction mode, the reference index, and the motion vector have predetermined values when the number of inter-prediction information candidates included in the constructed inter-prediction information candidate list is smaller than the previously designated number of inter-prediction information candidates and adds the derived inter-prediction information candidates to the constructed inter-prediction information candidate list and that derives one or a plurality of inter-prediction information candidates of which at least one of the prediction mode, the reference index, and the motion vector is changed from that of the inter-prediction information candidates having the predetermined value when the number of inter-prediction information candidates included in the added inter-prediction information candidate list is smaller than the previously designated number of inter-prediction information candidates and additionally adds the derived inter-prediction information candidates to the added inter-prediction information candidate list; a candidate supplementing unit that derives inter-prediction information candidates of which the prediction mode, the reference index, and the motion vector have predetermined values until the number of inter-prediction information candidates included in the additionally added inter-prediction information candidate list reaches the previously designated number of inter-prediction information candidates when the number of inter-prediction information candidates included in the additionally added inter-prediction information candidate list is smaller than the previously designated number of inter-prediction information candidates and additionally adds the derived inter-prediction information candidates to the additionally added inter-prediction information candidate list; and a motion-compensated prediction unit (206) that selects one inter-prediction information candidate from the inter-prediction information candidates and performs inter-prediction on the decoding target prediction block using the selected inter-prediction information candidate.

Another aspect of the present invention provides a reception method. The method is a reception method of receiving and decoding a bitstream obtained by coding moving pictures, including: a receiving step of receiving a bitstream obtained by packetizing a bitstream obtained by coding moving pictures using motion-compensated prediction in units of blocks obtained by partitioning each picture of the moving pictures; a reconstructing step of packetizing the received bitstream to reconstruct an original bitstream; a prediction information decoding step of decoding information indicating a previously designated number of inter-prediction information candidates from the reconstructed bit stream; a prediction information deriving step of deriving the inter-prediction information candidates from inter-prediction information of a prediction block neighboring to a decoding target prediction block or a prediction block present at the same position as or near the decoding target prediction block in a decoded picture at a temporally different position from the decoding target prediction block; a candidate list constructing step of constructing an inter-prediction information candidate list from the derived inter-prediction information candidates; a candidate adding step of deriving inter-prediction information candidates of which the prediction mode, the reference index, and the motion vector have predetermined values when the number of inter-prediction information candidates included in the constructed inter-prediction information candidate list is smaller than the previously designated number of inter-prediction information candidates and adding the derived inter-prediction information candidates to the constructed inter-prediction information candidate list, and deriving one or a plurality of inter-prediction information candidates of which at least one of the prediction mode, the reference index, and the motion vector is changed from that of the inter-prediction information candidates having the predetermined value when the number of inter-prediction information candidates included in the added inter-prediction information candidate list is smaller than the previously designated number of inter-prediction information candidates and additionally adding the derived inter-prediction information candidates to the added inter-prediction information candidate list; a candidate supplementing step of deriving inter-prediction information candidates of which the prediction mode, the reference index, and the motion vector have predetermined values until the number of inter-prediction information candidates included in the additionally added inter-prediction information candidate list reaches the previously designated number of inter-prediction information candidates when the number of inter-prediction information candidates included in the additionally added inter-prediction information candidate list is smaller than the previously designated number of inter-prediction information candidates and additionally adding the derived inter-prediction information candidates to the additionally added inter-prediction information candidate list; and a motion-compensated prediction step of selecting one inter-prediction information candidate from the inter-prediction information candidates and performing inter-prediction on the decoding target prediction block using the selected inter-prediction information candidate.

An optional combination of the constituent components described above and an embodiment obtained by exchanging expressions of the present invention among methods, devices, systems, recording media, computer programs, and the like are also effective as aspects of the present invention.

BRIEF DESCRIPTION OF THE DRAWINGS

FIG. 9 is a diagram for describing a prediction block of a temporal merge candidate in a merge mode;

FIG. 10 is a diagram for describing the syntax of a bitstream in respective prediction blocks in a merge mode;

FIG. 11 is a diagram for describing an example of an entropy symbol of a syntax element of a merge index;

FIGS. 14A to 14H are diagrams for describing a prediction block neighboring to a processing target prediction block in a merge mode;

FIGS. 17A to 17H are diagrams for describing a neighboring block referred to in a process of deriving a reference index of a temporal merge candidate;

DETAILED DESCRIPTION

The invention will now be described by reference to the preferred embodiments. This does not intend to limit the scope of the present invention, but to exemplify the invention.

The present embodiment relates to a moving picture coding technique, and particularly, to a moving picture coding technique of partitioning a picture into rectangular blocks having optional sizes and shapes and performing motion compensation between pictures in units of blocks. In this technique, a plurality of motion vector predictors is derived from a motion vector of a block neighboring to a coding target block or a block of a coded picture in order to improve coding efficiency, and a vector difference between a motion vector of the coding target block and a selected motion vector predictor is derived and coded to reduce the coding amount. Alternatively, coding information of the coding target block is derived using coding information of a block neighboring to the coding target block or a block of a coded picture to thereby reduce a coding amount. Moreover, in the case of decoding moving pictures, a plurality of motion vector predictors is derived from a motion vector of a block neighboring to a decoding target block or a block of a decoded picture, and a motion vector of the decoding target block is derived and decoded from a vector difference decoded from a bitstream and a selected motion vector predictor. Alternatively, coding information of the decoding target block is derived using coding information of a block neighboring to the decoding target block or a block of a decoded picture.

First, techniques and terms used in the present embodiment are defined.

(Tree Block and Coding Block)

Figure 3:
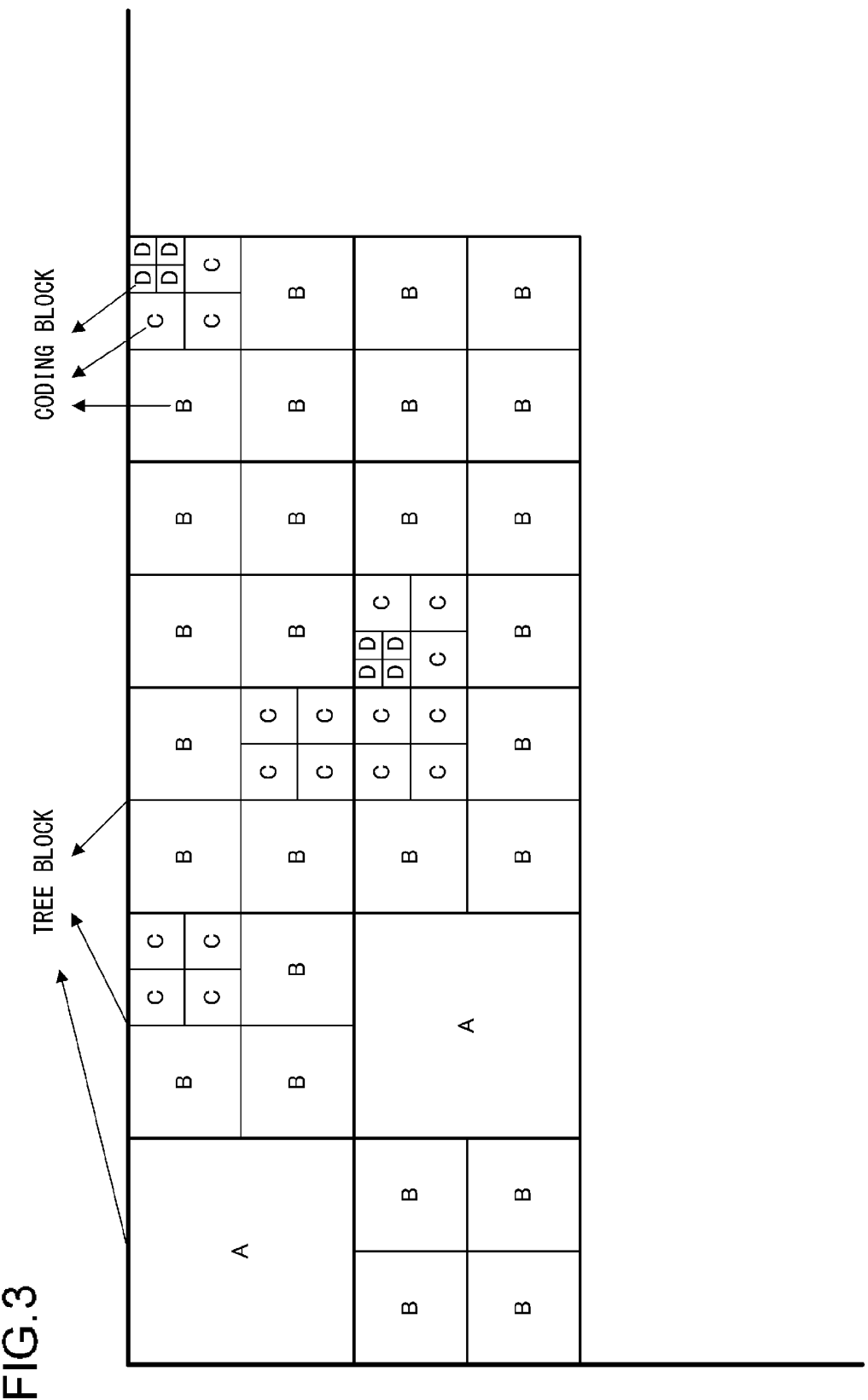
FIG. 3 is a diagram for describing a tree block and a coding block.

In embodiments, one or a plurality of slices obtained by partitioning a picture is a basic unit of coding, and a slice type which is information indicating the type of slice is set to each slice. As illustrated in FIG. 3, a slice is evenly partitioned in respective square units having the same optional size. This unit square is defined as a tree block and is used as a basic unit of address management for specifying a coding/decoding target block in a slice (a coding target block in coding processes and a decoding target block in decoding processes; the same is true for the following description unless otherwise set forth below). A tree block excluding monochrome components includes one luminance signal and two chroma signals. The size of a tree block can be freely set to the power of 2 according to a picture size or the texture in a picture. A tree block can be partitioned into blocks having a small block size by hierarchically partitioning the luminance signal and chroma signals in the tree block into four parts (two parts in vertical and horizontal directions) as necessary according to the texture in the picture so that a coding process can be optimized. This block is defined as a coding block and is a basic unit of coding and decoding processes. A coding block excluding monochrome components includes one luminance signal and two chroma signals. A largest size of a coding block is the same as the size of a tree block. A coding block having the smallest size of the coding block is referred to as a smallest coding block and can be freely set to the power of 2.

In FIG. 3, a coding block A is one coding block obtained without partitioning a tree block. A coding block B is a coding block obtained by partitioning a tree block into four parts. A coding block C is a coding block obtained by partitioning into four parts the block obtained by partitioning the tree block into four parts. A coding block D is a coding block obtained by partitioning twice into four parts the block obtained by partitioning the tree block into four parts and is a coding block having the smallest size.

(Prediction Mode)

Intra-prediction (MODE_INTRA) where prediction is performed from neighboring picture signals in a coded/decoded state (used in pictures, prediction blocks, picture signals, and the like obtained by decoding coded signals in the coding process and decoded pictures, prediction blocks, picture signals, and the like in the decoding process; the same is true for the following description unless otherwise set forth below) in a coding/decoding target picture and inter-prediction (MODE_INTER) where prediction is performed from picture signals of coded/decoded pictures are switched in respective coding blocks. A mode for identifying the intra-prediction (MODE_INTRA) and the inter-prediction (MODE_INTER) is defined as a prediction mode (PredMode). The prediction mode (PredMode) has a value of intra-prediction (MODE_INTRA) or inter-prediction (MODE_INTER) and can be selected and coded.

(Partition Mode, Prediction Block, and Prediction Unit)

When a picture is partitioned into blocks to perform intra-prediction (MODE_INTRA) and inter-prediction (MODE_INTER), a coding block is partitioned as necessary to perform prediction in order to further reduce the units of switching intra-prediction and inter-prediction. A mode for identifying a method of partitioning the luminance signal and chroma signals of a coding block is defined as a partition mode (PartMode). Further, the partitioned block is defined as a prediction block. As illustrated in FIGS. 4A to 4H, eight partition modes (PartMode) are defined depending on a method of partitioning the luminance signal of a coding block.

Figure 4A:
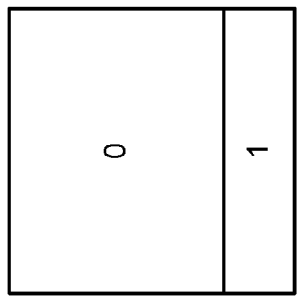
FIGS. 4A to 4H are diagrams for describing a partition mode of a prediction block.
Figure 4B:
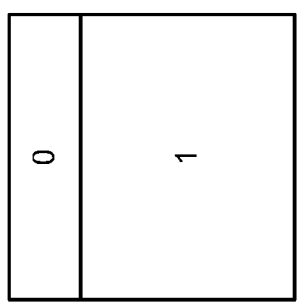
Figure 4C:
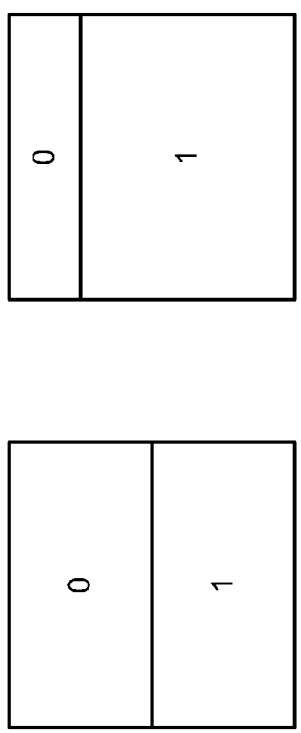
Figure 4D:
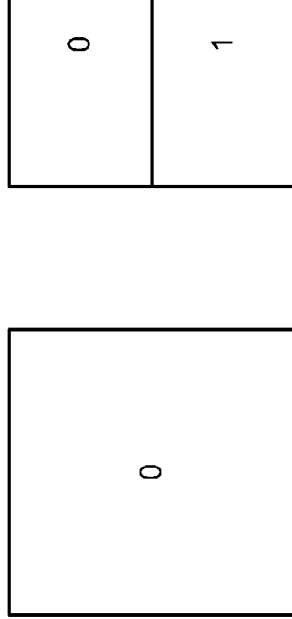
Figure 4E:
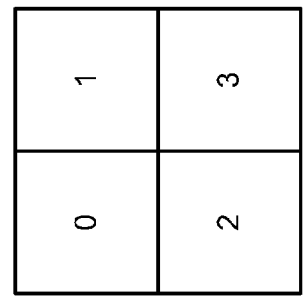
Figure 4F:
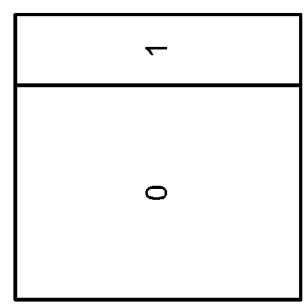
Figure 4G:
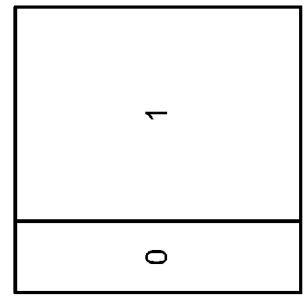
Figure 4H:
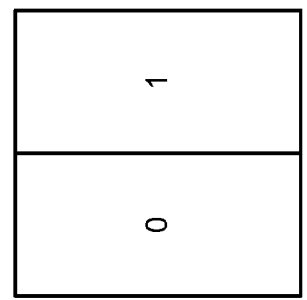

A partition mode (PartMode) in which the luminance signal of a coding block illustrated in FIG. 4A is not partitioned but is regarded as one prediction block is defined as 2N×2N partition (PART 2N×2N). Partition modes (PartMode) in which the luminance signals of coding blocks illustrated in FIGS. 4B, 4C, and 4D are partitioned into two prediction blocks arranged in the vertical direction are defined as 2N×N partition (PART 2N×N), 2N×nU partition (PART 2N×nU), and 2N×nD partition (PART 2N×nD), respectively. Here, 2N×N partition (PART 2N×N) is a partition mode in which the luminance signal is partitioned in the ratio of 1:1 in the vertical direction, 2N×nU partition (PART 2N×nU) is a partition mode in which the luminance signal is partitioned in the ratio of 1:3 in the vertical direction, and 2N×nD partition (PART 2N×nD) is a partition mode in which the luminance signal is partitioned in the ratio of 3:1 in the vertical direction. Partition modes (PartMode) in which the luminance signals of coding blocks illustrated in FIGS. 4E, 4F, and 4G are partitioned into two prediction blocks arranged in the horizontal direction are defined as N×2N partition (PART_N×2N), nL×2N partition (PART_nL×2N), and nR×2N partition (PART_nR×2N), respectively. Here, N×2N partition (PART_N×2N) is a partition mode in which the luminance signal is partitioned in the ratio of 1:1 in the horizontal direction, nL×2N partition (PART_nL×2N) is a partition mode in which the luminance signal is partitioned in the ratio of 1:3 in the horizontal direction, and nR×2N partition (PART_nR×2N) is a partition mode in which the luminance signal is partitioned in the ratio of 3:1 in the horizontal direction. A partition mode (PartMode) in which the luminance signal of a coding block illustrated in FIG. 4H is partitioned into four parts in the vertical and horizontal directions to obtain four prediction blocks is defined as N×N partition (PART_N×N).

The chroma signal is partitioned in the same vertical and horizontal partition ratios as the luminance signal in respective partition modes (PartMode).

In order to specify each prediction block in a coding block, a number starting from 0 is allocated to prediction blocks present in the coding block in the coding order. This number is defined as a partition index PartIdx. The number described in each prediction block of the coding block illustrated in FIGS. 4A to 4H indicates a partition index PartIdx of the prediction block. In the 2N×N partition (PART 2N×N), 2N×nU partition (PART 2N×nU), and 2N×nD partition (PART 2N×nD) illustrated in FIGS. 4B, 4C, and 4D, the partition indice PartIdx of the upper prediction blocks are set to 0 and the partition indice PartIdx of the lower prediction blocks are set to 1. In the N×2N partition (PART_N×2N), nL×2N partition (PART_nL×2N), and nR×2N partition (PART_nR×2N) illustrated in FIGS. 4E, 4F, and 4G, the partition indice PartIdx of the left prediction blocks are set to 0 and the partition indice PartIdx of the right prediction blocks are set to 1. In the N×N partition (PART_N×N) illustrated in FIG. 4H, the partition index PartIdx of the top-left prediction block is set to 0, the partition index PartIdx of the top-right prediction block is set to 1, the partition index PartIdx of the bottom-left prediction block is set to 2, and the partition index PartIdx of the bottom-right prediction block is set to 3.

When the prediction mode (PredMode) is inter-prediction (MODE_INTER), 2N×2N partition (PART_2N×2N), 2N×N partition (PART_2N×N), 2N×nU partition (PART_2N×nU), 2N×nD partition (PART_2N×nD), N×2N partition ((PART_N×2N), nL×2N partition (PART_nL×2N), and nR×2N partition (PART_nR×2N) are defined as the partition modes (PartMode). As for the coding block D only which is the smallest coding block, N×N partition (PART_N×N) may be defined as the partition mode (PartMode) in addition to 2N×2N partition (PART_2N×2N), 2N×N partition (PART_2N×N), 2N×nU partition (PART_2N×nU), 2N×nD partition (PART_2N×nD), N×2N partition ((PART_N×2N), nL×2N partition (PART_nL×2N), and nR×2N partition (PART_nR×2N). However, in the present embodiment, N×N partition (PART_N×N) is not defined as the partition mode (PartMode).

When the prediction mode (PredMode) is intra-prediction (MODE_INTRA), 2N×2N partition (PART_2N×2N) only is defined for coding blocks other than the coding block D which is the smallest coding block as the partition mode (PartMode), and N×N partition (PART_N×N) is defined for the coding block D only which is the smallest coding block as the partition mode (PartMode) in addition to 2N×2N partition (PART_2N×2N). The reason why N×N partition (PART_N×N) is not defined for coding blocks other than the smallest coding block is because it is possible to partition a coding block other than the smallest coding block into four parts to express smaller coding blocks.

(Positions of Tree Block, Coding Block, Prediction Block, Transform Block)

The positions of blocks including a tree block, a coding block, a prediction block, and a transform block of the present embodiment are represented such that the position of a pixel of a top-left luminance signal of a screen of the luminance signal is set as the origin (0, 0), and the position of a pixel of the top-left luminance signal included in the region of each block is represented by a two-dimensional coordinate (x, y). The direction of the coordinate axis is defined such that the rightward direction of the horizontal direction and the downward direction of the vertical direction are the positive directions, and the unit is one pixel of the luminance signal. When the chroma format is 4:2:0 or 4:2:2 where the picture size (the number of pixels) is different from luminance signal to chroma signal as well as when the chroma format is 4:4:4 where the picture size (the number of pixels) is the same for the luminance signal and the chroma signal, the position of each block of the chroma signal is represented by the coordinate of a pixel of a luminance signal included in the region of the block, and the unit is one pixel of the luminance signal. By doing so, it is possible to specify the position of each block of the chroma signal and to clearly understand the positional relation between the block of the luminance signal and the block of the chroma signal just by comparing the coordinate values.

(Inter-Prediction Mode and Reference List)

In the embodiment of the present invention, a plurality of decoded pictures can be used as reference pictures in inter-prediction in which prediction is performed from picture signals of coded/decoded pictures. In order to specify reference pictures selected from a plurality of reference pictures, a reference index is allocated to each prediction block. In B slices, it is possible to select optional two reference pictures for each prediction block and to perform inter-prediction, and examples of the inter-prediction mode include L0 prediction (Pred_L0), L1 prediction (Pred_L1), and bi-prediction (Pred_BI). Reference pictures are managed by L0 (Reference list 0) and L1 (Reference list 1) of a list structure, and a reference picture can be specified by designating the reference index of L0 or L1. L0 prediction (Pred_L0) is inter-prediction which refers to reference pictures managed by L0, L1 prediction (Pred_L1) is inter-prediction which refers to reference pictures managed by L1, and bi-prediction (Pred_BI) is inter-prediction in which both L0 prediction and L1 prediction are performed and which refers to reference pictures managed by L0 and L1, respectively. L0 prediction only can be used in inter-prediction of P slices, and L0 prediction, L1 prediction, and bi-prediction (Pred_BI) in which L0 prediction and L1 prediction are averaged or weight-added can be used in inter-prediction of B slices. In the following processes, it is assumed that integers and variables to which a character LX is appended to the output are processed for each of L0 and L1.

(Merge Mode and Merge Candidate)

A merge mode is a mode in which rather than inter-prediction information such as a prediction mode, a reference index, or a motion vector of a coding/decoding target prediction block is coded and decoded, inter-prediction is performed by deriving inter-prediction information of a coding/decoding target prediction block from inter-prediction information of prediction blocks neighboring to the coding/decoding target prediction block in the same picture as the coding/decoding target prediction block or a prediction block present at the same position as or near (at the position neighboring) a coding/decoding target prediction block of a coded/decoded picture at a different temporal position from the coding/decoding target prediction block. A prediction block neighboring to the coding/decoding target prediction block in the same picture as the coding/decoding target prediction block and inter-prediction information of the prediction block are referred to as spatial merge candidates, and a prediction block present at the same position as or near (the position neighboring) the coding/decoding target prediction block of a coded/decoded picture at a temporally different position from the coding/decoding target prediction block and inter-prediction information derived from the inter-prediction information of the prediction block are referred to as temporal merge candidates. The respective merge candidates are added to a merge candidate list and a merge candidate used for inter-prediction is specified by a merge index.

(Neighboring Prediction Block)

FIGS. 5, 6, 7, and 8 are diagrams for describing prediction blocks neighboring to a coding/decoding target prediction block in the same picture as the coding/decoding target prediction block that is referred to when deriving spatial merge candidates and reference indice of temporal merge candidates. FIG. 9 is a diagram for describing coded/decoded prediction blocks present at the same position as or near a coding/decoding target prediction block of a coded/ decoded picture at a temporally different position from the coding/decoding target prediction block that is referred to when deriving temporal merge candidates. Prediction blocks neighboring in a spatial direction of a coding/decoding target prediction block and prediction blocks at the same position of different time will be described using FIGS. 5, 6, 7, 8, and 9.

Figure 5:
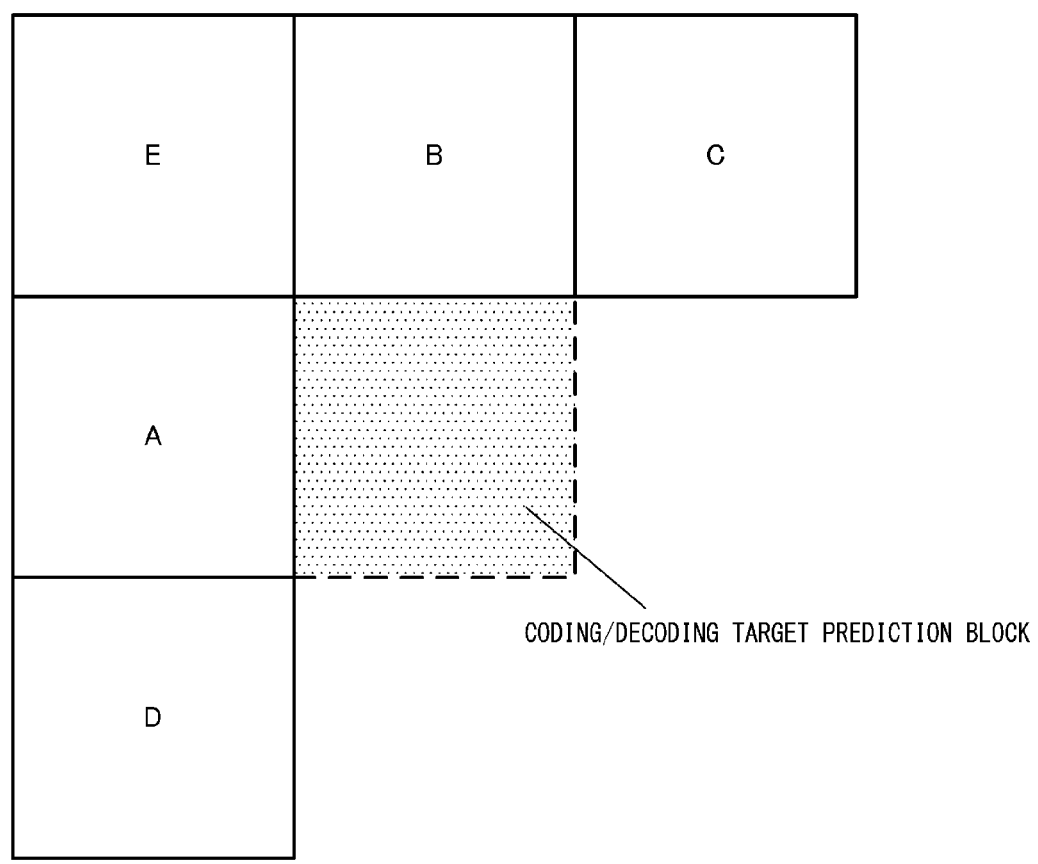
FIG. 5 is a diagram for describing a prediction block of a spatial merge candidate in a merge mode.

As illustrated in FIG. 5, a prediction block A neighboring to a left side of a coding/decoding target prediction block in the same picture as the coding/decoding target prediction block, a prediction block B neighboring to an upper side of the coding/decoding target prediction block, a prediction block C neighboring to a top-right corner of the coding/decoding target prediction block, a prediction block D neighboring to a bottom-left corner of the coding/decoding target prediction block, and a prediction block E neighboring to a top-left corner of the coding/decoding target prediction block are defined as prediction blocks neighboring in the spatial direction.

Figure 6:
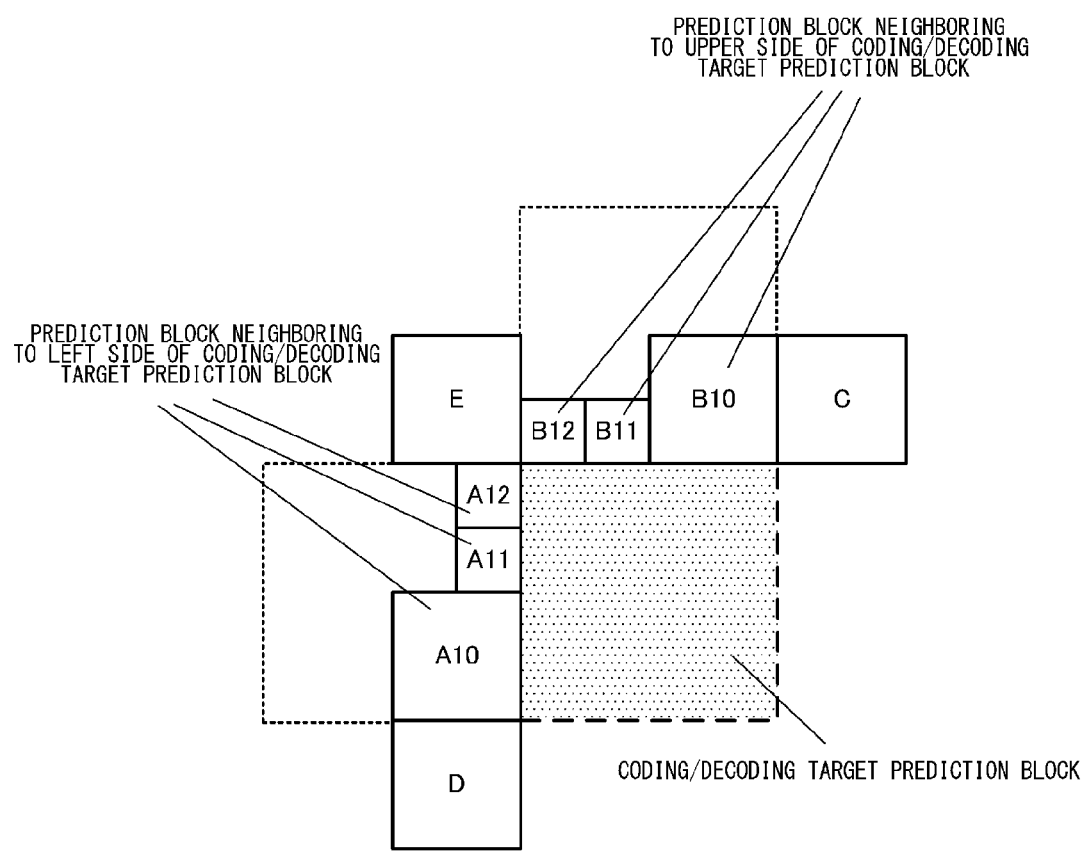
FIG. 6 is a diagram for describing a prediction block of a spatial merge candidate in a merge mode.

As illustrated in FIG. 6, when a plurality of prediction blocks neighboring to the left side of the coding/decoding target prediction block is present and has a smaller size than the coding/decoding target prediction block, only the lowermost prediction block A10 among the prediction blocks neighboring to the left side will be referred to as the prediction block A neighboring to the left side in the present embodiment.

Similarly, when a plurality of prediction blocks neighboring to the upper side of the coding/decoding target prediction block is present and has a smaller size than the coding/decoding target prediction block, only the rightmost prediction block B10 among the prediction blocks neighboring to the left side will be referred to as the prediction block B neighboring to the upper side in the present embodiment.

Figure 7:
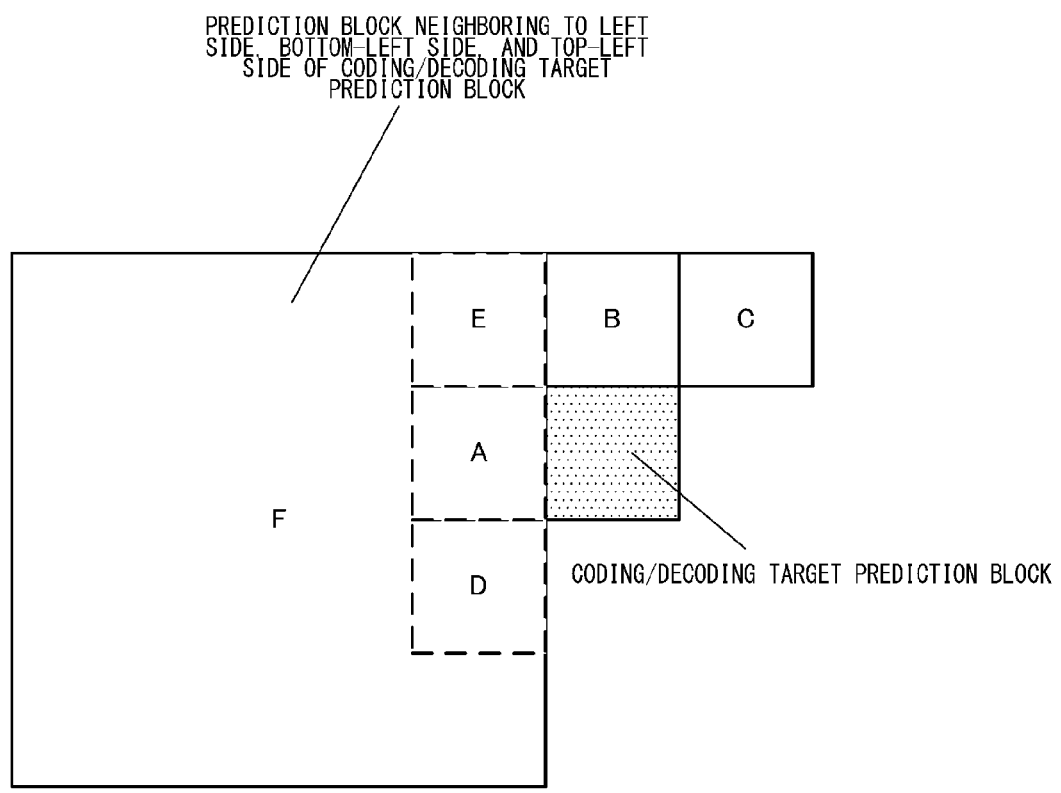
FIG. 7 is a diagram for describing a prediction block of a spatial merge candidate in a merge mode.

As illustrated in FIG. 7, even when the size of the prediction block F neighboring to the left side of the coding/decoding target prediction block is larger than the coding/decoding target prediction block, according to the conditions, the prediction block F is the prediction block A if the prediction block F neighboring to the left side neighbors to the left side of the coding/decoding target prediction block, the prediction block D if the prediction block F neighbors to the bottom-left corner of the coding/decoding target prediction block, and the prediction block E if the prediction block F neighbors to the top-left corner of the coding/decoding target prediction block. In the example of FIG. 7, the prediction block A, the prediction block D, and the prediction block E are the same prediction blocks.

Figure 8:
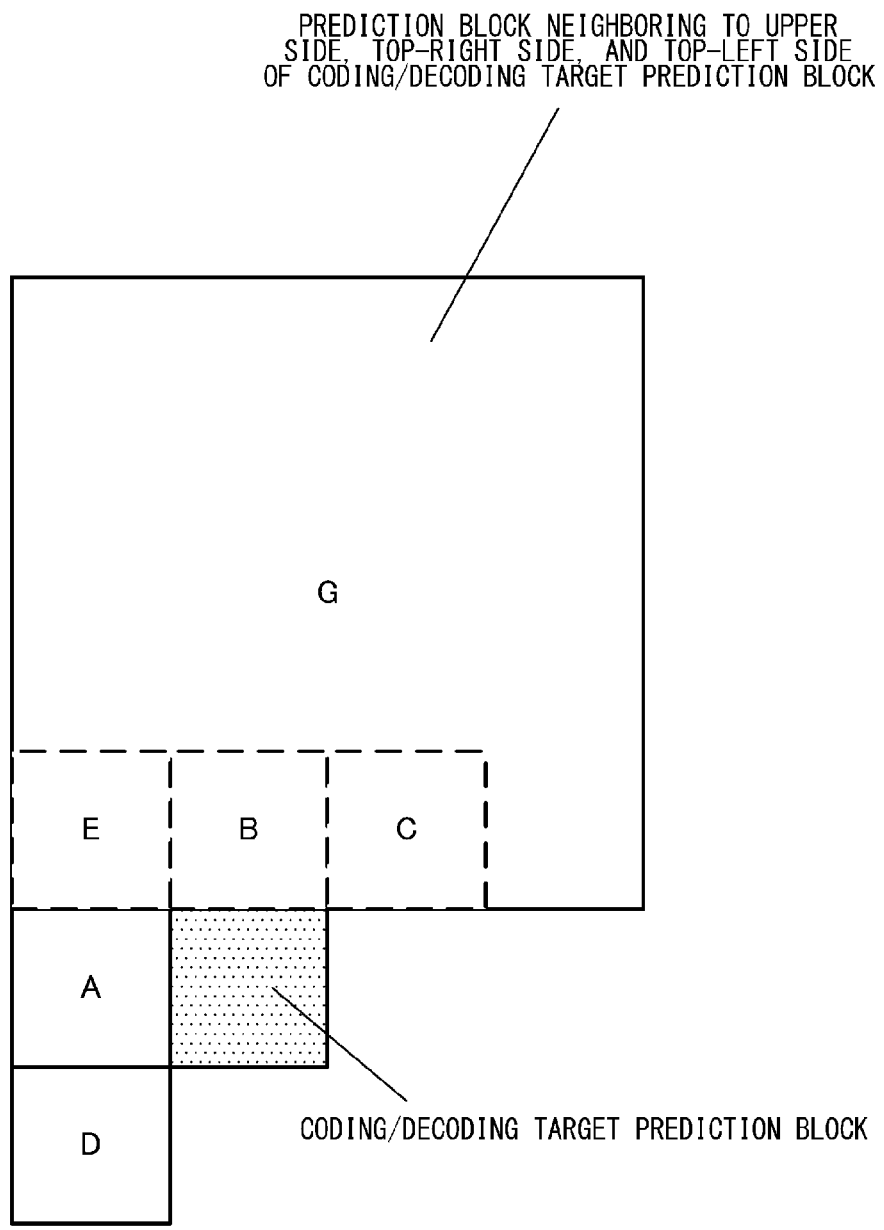
FIG. 8 is a diagram for describing a prediction block of a spatial merge candidate in a merge mode.

As illustrated in FIG. 8, even when the size of the prediction block G neighboring to the upper side of the coding/decoding target prediction block is larger than the coding/decoding target prediction block, according to the conditions, the prediction block G is the prediction block B if the prediction block G neighboring to the upper side neighbors to the upper side of the coding/decoding target prediction block, the prediction block C if the prediction block G neighbors to the top-right corner of the coding/decoding target prediction block, and the prediction block E if the prediction block G neighbors to the top-left corner of the coding/decoding target prediction block. In the example of FIG. 8, the prediction block B, the prediction block C, and the prediction block E are the same prediction blocks.

As illustrated in FIG. 9, in coded/decoded pictures at temporally different positions from the coding/decoding target prediction block, coded/decoded prediction blocks T0 and T1 present at the same position as or near the coding/decoding target prediction block are defined as prediction blocks at the same position of different time.

(POC)

A POC is a variable associated with a picture to be coded and a value that is incremented by 1 in the picture outputting/displaying order is set as the POC. Based on the POC value, it is possible to determine whether two pictures are the same picture, determine an anteroposterior relation between pictures in the outputting/displaying order, and derive a picture-to-picture distance. For example, when two pictures have the same POC value, it can be determined that both pictures are the same picture. When two pictures have different POC values, it can be determined that a picture having the smaller POC value is a picture that is output and displayed earlier, and a difference between POCs of two pictures indicates a picture-to-picture distance in a time axis direction.

Figure 1:
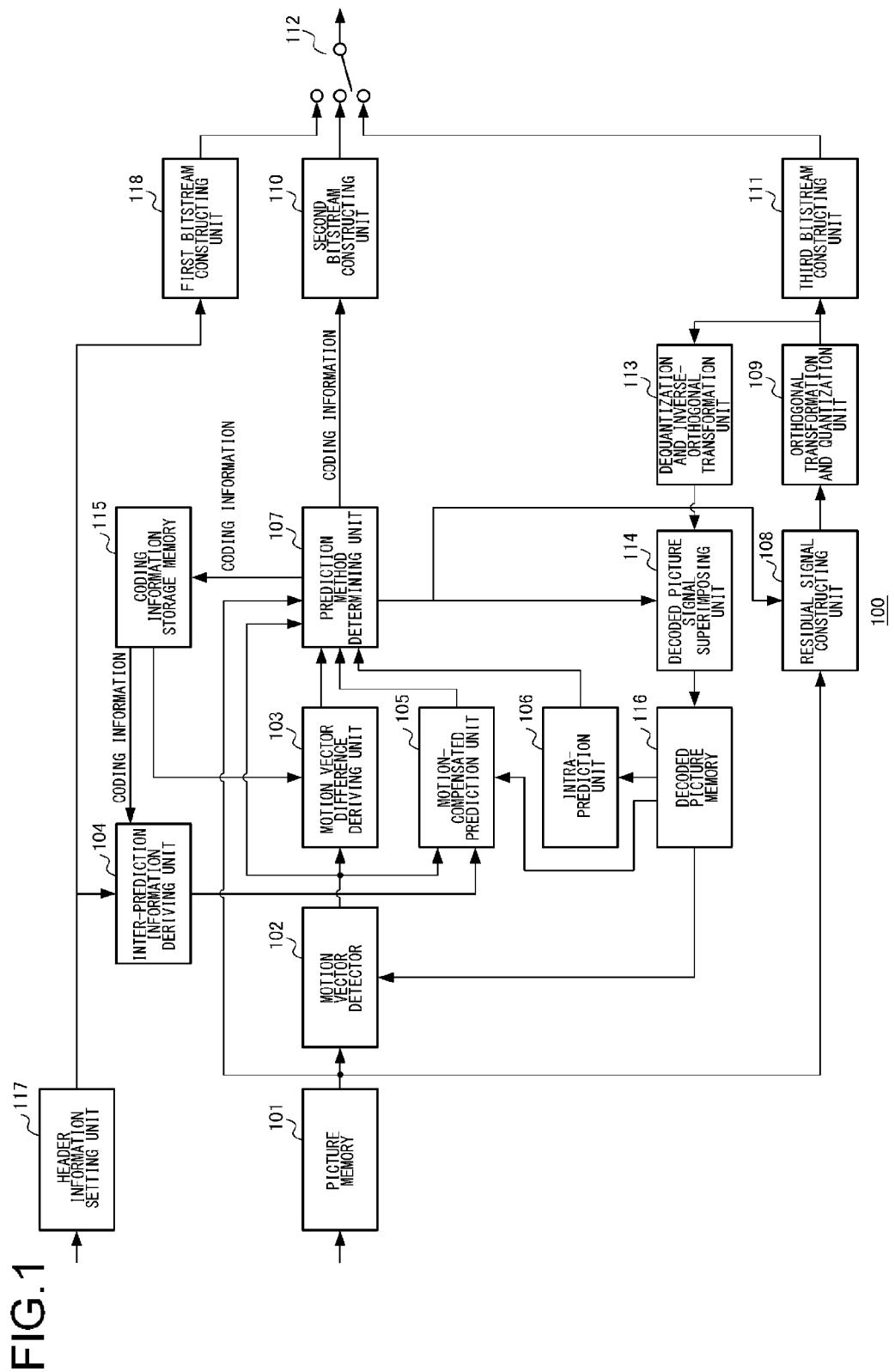
FIG. 1 is a block diagram illustrating a configuration of a moving picture coding device that executes a motion vector prediction method according to an embodiment.

Hereinafter, an embodiment of the present invention will be described with reference to the drawings. FIG. 1 is a block diagram illustrating a configuration of a moving picture coding device according to an embodiment of the present invention. The moving picture coding device of the embodiment includes a picture memory 101, a header information setting unit 117, a motion vector detector 102, a motion vector difference deriving unit 103, an inter-prediction information deriving unit 104, a motion-compensated prediction unit 105, an intra-prediction unit 106, a prediction method determining unit 107, a residual signal constructing unit 108, an orthogonal transformation and quantization unit 109, a first bitstream constructing unit 118, a second bitstream constructing unit 110, a third bitstream constructing unit 111, a multiplexer 112, a dequantization and inverse-orthogonal transformation unit 113, a decoded picture signal superimposing unit 114, a coding information storage memory 115, and a decoded picture memory 116.

The header information setting unit 117 sets information in sequence, picture, and slide units. The set information in sequence, picture, and slice units is supplied to the inter-prediction information deriving unit 104 and the first bitstream constructing unit 118 and is also supplied to all blocks although not illustrated in the drawing. The header information setting unit 117 also sets a largest number of merge candidates maxNumMergeCand described later.

The picture memory 101 temporarily stores picture signals of coding target pictures supplied in the order of the time at which the pictures are captured and displayed. The picture memory 101 supplies the stored picture signals of coding target pictures to the motion vector detector 102, the prediction method determining unit 107, and the residual signal constructing unit 108 in units of predetermined pixel blocks. In this case, the picture signals of the pictures stored in the capturing/displaying order are rearranged in the coding order and are output from the picture memory 101 in units of pixel blocks.

The motion vector detector 102 detects a motion vector of each prediction block size and each prediction mode in respective prediction blocks by performing block matching between the picture signals supplied from the picture memory 101 and the reference pictures supplied from the decoded picture memory 116 and supplies the detected motion vector to the motion-compensated prediction unit 105, the motion vector difference deriving unit 103, and the prediction method determining unit 107.

The motion vector difference deriving unit 103 derives a plurality of motion vector predictor candidates using coding information of coded picture signals stored in the coding information storage memory 115 to add the same in a motion vector predictor list, selects an optimal motion vector predictor among the plurality of motion vector predictor candidates added to the motion vector predictor list, derives a motion vector difference from the motion vector predictor and the motion vector detected by the motion vector detector 102, and supplies the derived motion vector difference to the prediction method determining unit 107. Further, the motion vector difference deriving unit 103 supplies a motion vector predictor index for specifying the motion vector predictor selected from the motion vector predictor candidates added to the motion vector predictor list to the prediction method determining unit 107.

The inter-prediction information deriving unit 104 derives merge candidates in a merge mode. The inter-prediction information deriving unit 104 derives a plurality of merge candidates using the coding information of the coded prediction blocks stored in the coding information storage memory 115 to add the same to a merge candidate list described later, selects an optimal merge candidate among the plurality of merge candidates added to the merge candidate list, supplies inter-prediction information such as flags predFlagL0[xP][yP] and predFlagL1[xP][yP] indicating whether or not to use L0 prediction and L1 prediction of each prediction block of the selected merge candidate, reference indice refIdxL0[xP][yP] and refIdxL1[xP][yP], and motion vectors mvL0[xP][yP] and mvL1[xP][yP] to the motion-compensated prediction unit 105, and supplies a merge index for specifying the selected merge candidate to the prediction method determining unit 107. Here, xP and yP are indice indicating the position of the top-left pixel of a prediction block in the picture. Detailed configuration and operations of the inter-prediction information deriving unit 104 will be described later.

The motion-compensated prediction unit 105 constructs a prediction picture signal by performing inter-prediction (motion-compensated prediction) from reference pictures using the motion vector detected by the motion vector detector 102 and the inter-prediction information deriving unit 104 and supplies the prediction picture signal to the prediction method determining unit 107. In L0 prediction and L1 prediction, prediction is performed in one direction. In the case of bi-prediction (Pred_BI), prediction is performed in two directions to obtain inter-prediction signals in L0 and L1 prediction modes, which are adaptively multiplied by a weighting factor and are superimposed by adding an offset value to thereby construct a final prediction picture signal.

The intra-prediction unit 106 performs intra-prediction in respective intra-prediction modes. The intra-prediction unit 106 constructs prediction picture signals by performing intra-prediction from the decoded picture signals stored in the decoded picture memory 116, selects an optimal intra-prediction mode among a plurality of intra-prediction modes, and supplies a prediction picture signal corresponding to the selected intra-prediction mode to the prediction method determining unit 107.

The prediction method determining unit 107 evaluates coding information, a coding amount of a residual signal, and a distortion amount between a prediction picture signal and a picture signal of each prediction method to thereby determine a partition mode PartMode and a prediction mode PredMode for identifying the prediction mode is inter-prediction (PRED_INTER) or intra-prediction (PRED_INTRA) for each optimal coding block among a plurality of prediction methods, determine whether the inter-prediction (PRED_INTER) is a merge mode in respective prediction blocks, determine a merge index when the inter-prediction is the merge mode, and determine an inter-prediction mode, a motion vector predictor index, L0 and L1 reference indice, a motion vector difference, and the like when the inter-prediction is not the merge mode, and supplies coding information corresponding to the determination to the second bitstream constructing unit 110.

Further, the prediction method determining unit 107 stores coding information including information indicating the determined prediction method and a motion vector and the like corresponding to the determined prediction method in the coding information storage memory 115. The coding information stored herein includes a prediction mode PredMode of each coding block, a partition mode PartMode, flags predFlagL0[xP][yP] and predFlagL1[xP][yP] indicating whether or not to use L0 prediction and L1 prediction of each prediction block, L0 and L1 reference indice refIdxL0[xP][yP] and refIdxL1[xP][yP], and L0 and L1 motion vectors mvL0[xP][yP] and mvL1[xP][yP]. Here, xP and yP are indice indicating the position of the top-left pixel of a prediction block in the picture. When the prediction mode PredMode is intra-prediction (MODE_INTRA), both the flag predFlagL0[xP][yP] indicating whether or not to use L0 prediction and the flag predFlagL1[xP][yP] indicating whether or not to use L1 prediction are 0. On the other hand, when the prediction mode PredMode is inter-prediction (MODE_INTER) and the inter-prediction mode is L0 prediction (Pred_L0), the flag predFlagL0[xP][yP] indicating whether or not to use L0 prediction is 1 and the flag predFlagL1[xP][yP] indicating whether or not to use L1 prediction is 0. When the inter-prediction mode is L1 prediction (Pred_L1), the flag predFlagL0[xP][yP] indicating whether or not to use L0 prediction is 0 and the flag predFlagL1[xP][yP] indicating whether or not to use L1 prediction is 1. When the inter-prediction mode is bi-prediction (Pred_BI), both the flag predFlagL0[xP][yP] indicating whether or not to use L0 prediction and the flag predFlagL1[xP][yP] indicating whether or not to use L1 prediction are 1. The prediction method determining unit 107 supplies the prediction picture signal corresponding to the determined prediction mode to the residual signal constructing unit 108 and the decoded picture signal superimposing unit 114.

The residual signal constructing unit 108 constructs a residual signal by performing subtraction between a picture signal to be coded and the prediction picture signal and supplies the same to the orthogonal transformation and quantization unit 109.

The orthogonal transformation and quantization unit 109 performs orthogonal transformation and quantization on the residual signal according to a quantization parameter to construct an orthogonally transformed and quantized residual signal and supplies the same to the third bitstream constructing unit 111 and the dequantization and inverse-orthogonal transformation unit 113. Further, the orthogonal transformation and quantization unit 109 stores the quantization parameter in the coding information storage memory 115.

The first bitstream constructing unit 118 codes the information in sequence, picture, and slice units set by the header information setting unit 117 to construct a first bitstream and supplies the same to the multiplexer 112. The first bitstream constructing unit 118 also codes a largest number of merge candidates maxNumMergeCand described later.

The second bitstream constructing unit 110 codes the coding information corresponding to the prediction method determined by the prediction method determining unit 107 for each coding block and each prediction block. Specifically, the second bitstream constructing unit 110 codes coding information according to a predetermined syntax rule described later to construct a second bitstream and supplies the same to the multiplexer 112, the coding information including information for identifying whether each coding block is a skip mode, a prediction mode PredMode for identifying inter-prediction (PRED_INTER) and intra-prediction (PRED_INTRA), a partition mode PartMode, an intra-prediction mode when the prediction mode is intra-prediction (PRED_INTRA), a flag for identifying whether the inter-prediction (PRED_INTER) is a merge mode, a merge index when the inter-prediction mode is a merge mode, and an inter-prediction mode, a motion vector predictor index, and information on the motion vector difference when the inter-prediction mode is not a merge mode. In the present embodiment, when the coding block is a skip mode (the syntax element skip_flag[x0][y0] is 1), the value of the prediction mode PredMode of a prediction block is inter-prediction (MODE_INTER), a merge mode (merge_flag[x0][y0] is 1), and the partition mode (PartMode) is 2N×2N partition (PART_2N×2N).

The third bitstream constructing unit 111 performs entropy coding on the orthogonally transformed and quantized residual signal according to a predetermined syntax rule to construct a third bitstream and supplies the same to the multiplexer 112. The multiplexer 112 multiplies the first, second, and third bitstreams according to the predetermined syntax rule and outputs the multiplexed bitstream.

The dequantization and inverse-orthogonal transformation unit 113 performs dequantization and inverse-orthogonal transformation on the orthogonally transformed and quantized residual signal supplied from the orthogonal transformation and quantization unit 109 to construct the residual signal and supplies the same to the decoded picture signal superimposing unit 114. The decoded picture signal superimposing unit 114 superimposes the prediction picture signal corresponding to the determination of the prediction method determining unit 107 and the residual signal dequantized and inverse-orthogonally transformed by the dequantization and inverse-orthogonal transformation unit 113 to construct a decoded picture and stores the same in the decoded picture memory 116. A filtering process of reducing distortion such as block distortion resulting from coding may be applied to the decoded picture and the resultant picture may be stored in the decoded picture memory 116.

Figure 2:
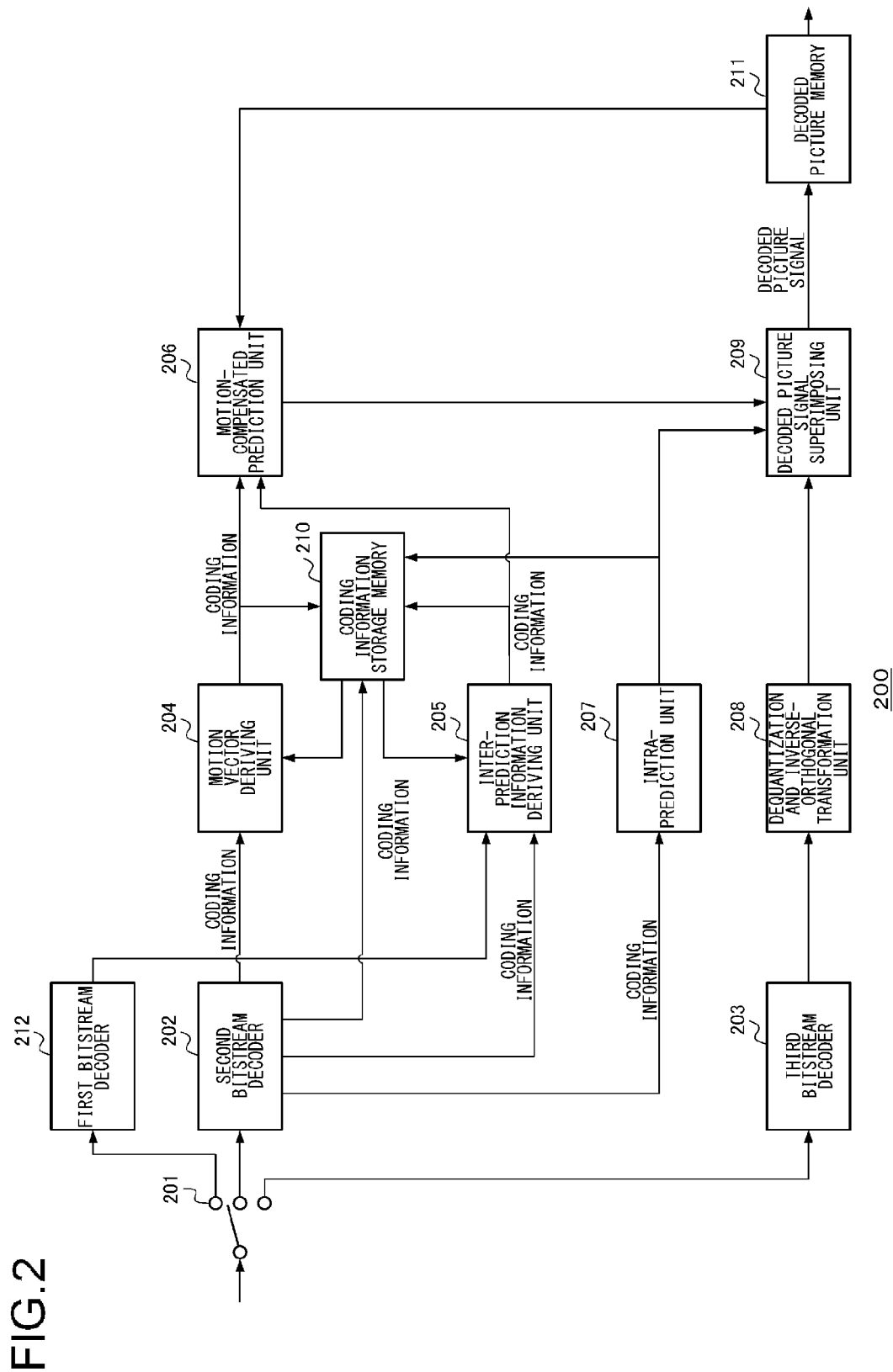
FIG. 2 is a block diagram illustrating a configuration of a moving picture decoding device that executes a motion vector prediction method according to an embodiment.

FIG. 2 is a block diagram illustrating a configuration of a moving picture decoding device according to an embodiment of the present invention, corresponding to the moving picture coding device of FIG. 1. The moving picture decoding device of the embodiment includes a demultiplexer 201, a first bitstream decoder 212, a second bitstream decoder 202, a third bitstream decoder 203, a motion vector deriving unit 204, an inter-prediction information deriving unit 205, a motion-compensated prediction unit 206, an intra-prediction unit 207, a dequantization and inverse-orthogonal transformation unit 208, a decoded picture signal superimposing unit 209, a coding information storage memory 210, and a decoded picture memory 211.

Since the decoding process of the moving picture decoding device illustrated in FIG. 2 corresponds to the decoding process performed in the moving picture coding device illustrated in FIG. 1, the respective components of the motion-compensated prediction unit 206, the dequantization and inverse-orthogonal transformation unit 208, the decoded picture signal superimposing unit 209, the coding information storage memory 210, and the decoded picture memory 211 illustrated in FIG. 2 have the functions corresponding to the respective components of the motion-compensated prediction unit 105, the dequantization and inverse-orthogonal transformation unit 113, the decoded picture signal superimposing unit 114, the coding information storage memory 115, and the decoded picture memory 116 of the moving picture coding device illustrated in FIG. 1.

The bitstream supplied to the demultiplexer 201 is demultiplexed according to a predetermined syntax rule and the demultiplexed bitstream is supplied to the first, second, and third bitstream decoders 212, 202, and 203.

The first bitstream decoder 212 decodes the supplied bitstream to obtain information in sequence, picture, and slice units. The obtained information in sequence, picture, and slice units is supplied to all blocks although not illustrated in the drawing. The first bitstream decoder 212 also decodes a largest number of merge candidates maxNumMergeCand described later.

The second bit stream decoder 202 decodes the supplied bitstream to obtain information in coding block units and coding information in prediction block units. Specifically, the second bitstream decoder 202 decodes coding information according to the predetermined syntax rule to obtain coding information, stores the coding information such as the decoded prediction mode PredMode and the decoded partition mode PartMode in the coding information storage memory 210, and supplies the same to the motion vector deriving unit 204, the inter-prediction information deriving unit 205, or the intra-prediction unit 207, the coding information including information for identifying whether each coding block is a skip mode, a prediction mode PredMode for identifying whether the prediction mode is inter-prediction (PRED_INTER) or intra-prediction (PRED_INTRA), a partition mode PartMode, a flag for identifying whether inter-prediction (PRED_INTER) is a merge mode, a merge index when the inter-prediction is a merge mode, and an inter-prediction mode, a motion vector predictor index, and a motion vector difference when the inter-prediction is not a merge mode. In the present embodiment, when the coding block is a skip mode (the syntax element skip_flag[x0][y0] is 1), the value of the prediction mode PredMode of a prediction block is inter-prediction (MODE_INTER), a merge mode (merge_flag[x0][y0] is 1), and the partition mode (PartMode) is 2N×2N partition (PART_2N×2N).

The third bitstream decoder 203 decodes the supplied bitstream to derive an orthogonally transformed and quantized residual signal and supplies the orthogonally transformed and quantized residual signal to the dequantization and inverse-orthogonal transformation unit 208.

When the prediction mode PredMode of a decoding target prediction block is not the inter-prediction (PRED_INTER) or the merge mode, the motion vector deriving unit 204 derives a plurality of motion vector predictor candidates using the coding information of the decoded picture signal stored in the coding information storage memory 210 to add the same to a motion vector predictor list described later, and selects a motion vector predictor corresponding to the motion vector predictor index decoded and supplied by the second bit stream decoder 202 among the plurality of motion vector predictor candidates added in the motion vector predictor list, derives a motion vector from the selected motion vector predictor and the vector difference decoded by the second bitstream decoder 202, supplies the same to the motion-compensated prediction unit 206 together with other items of coding information, and stores the same in the coding information storage memory 210. The coding information of the prediction block supplied and stored herein includes flags predFlagL0[xP][yP] and predFlagL1[xP][yP]

indicating whether or not to use L0 prediction and L1 prediction, L0 and L1 reference indice refIdxL0[xP][yP] and refIdxL1[xP][yP], and L0 and L1 motion vectors mvL0[xP][yP] and mvL1[xP][yP]. Here, xP and yP are indice indicating the position of the top-left pixel of a prediction block in the picture. When the prediction mode PredMode is inter-prediction (MODE_INTER) and the inter-prediction mode is L0 prediction (Pred_L0), a flag predFlagL0 indicating whether or not to use L0 prediction is 1 and a flag predFlagL1 indicating whether or not to use L1 prediction is 0. When the inter-prediction mode is L1 prediction (Pred_L1), a flag predFlagL0 indicating whether or not to use L0 prediction is 0 and a flag predFlagL1 indicating whether or not to use L1 prediction is 1. When the inter-prediction mode is bi-prediction (Pred_BI), both the flag predFlagL0 indicating whether or not to use L0 prediction and the flag predFlagL1 indicating whether or not to use L1 prediction are 1.

The inter-prediction information deriving unit 205 derives merge candidates when the prediction mode PredMode of a decoding target prediction block is inter-prediction (PRED_INTER) and a merge mode. The inter-prediction information deriving unit 205 derives a plurality of merge candidates using the decoded coding information of the prediction block stored in the coding information storage memory 115 to add the same to a merge candidate list described later, selects a merge candidate corresponding to the merge index decoded and supplied by the second bitstream decoder 202 among the plurality of merge candidates added to the merge candidate list, supplies inter-prediction information including flags predFlagL0[xP][yP] and predFlagL1[xP][yP] indicating whether or not to use L0 prediction and L1 prediction of the selected merge candidate, L0 and L1 reference indice refIdxL0[xP][yP] and refIdxL1[xP][yP], and L0 and L1 motion vectors mvL0[xP][yP] and mvL1[xP][yP] to the motion-compensated prediction unit 206, and stores the same in the coding information storage memory 210. Here, xP and yP are indice indicating the position of the top-left pixel of a prediction block in the picture. Detailed configuration and operations of the inter-prediction information deriving unit 205 will be described later.

The motion-compensated prediction unit 206 constructs a prediction picture signal by performing inter-prediction (motion-compensated prediction) from the reference pictures stored in the decoded picture memory 211 using the inter-prediction information derived by the motion vector deriving unit 204 or the inter-prediction information deriving unit 205 and supplies the prediction picture signal to the decoded picture signal superimposing unit 209. In the case of bi-prediction (Pred_BI), motion-compensated prediction is performed in two modes of L0 prediction and L1 prediction to obtain motion-compensated prediction picture signals which are adaptively multiplied by a weighting factor and are superimposed to thereby construct a final prediction picture signal.

The intra-prediction unit 207 performs intra-prediction when the prediction mode PredMode of the decoding target prediction block is intra-prediction (PRED_INTRA). The coding information decoded by the second bitstream decoder 202 includes an intra-prediction mode, and the intra-prediction unit 207 constructs a prediction picture signal by performing intra-prediction from the decoded picture signal stored in the decoded picture memory 211 according to the intra-prediction mode and supplies the prediction picture signal to the decoded picture signal superimposing unit 209. Both the flags predFlagL0[xP][yP] and predFlagL1[xP][yP] indicating whether or not to use L0 prediction and L1 prediction are set to 0 and are stored in the coding information storage memory 210. Here, xP and yP are indice indicating the position of the top-left pixel of a prediction block in the picture.

The dequantization and inverse-orthogonal transformation unit 208 performs dequantization and inverse-orthogonal transformation on the orthogonally transformed and quantized residual signal decoded by the second bitstream decoder 202 to obtain a dequantized and inverse-orthogonally transformed residual signal.

The decoded picture signal superimposing unit 209 superimposes the prediction picture signal inter-predicted by the motion-compensated prediction unit 206 or the prediction picture signal intra-predicted by the intra-prediction unit 207 on the residual signal dequantizated and inverse-orthogonally transformed by the dequantization and inverse-orthogonal transformation unit 208 to decode a decoded picture signal and stores the same in the decoded picture memory 211. When the decoded picture signal is stored in the decoded picture memory 211, a filtering process of reducing a block distortion or the like resulting from coding may be performed on the decoded picture and stored in the decoded picture memory 211.

(Syntax)

Next, a syntax which is a common rule of coding and decoding a moving picture bitstream which is coded by a moving picture coding device employing a motion vector prediction method according to the present embodiment and decoded by a decoding device will be described.

In the present embodiment, the header information setting unit 117 sets a largest number of merge candidates maxNumMergeCand added to the merge candidate list mergeCandList in sequence, picture, or slice units, and syntax elements are coded by the first bitstream constructing unit 118 of the moving picture coding device and are decoded by the first bitstream decoder 212 of the moving picture decoding device. A value from 0 to 5 can be set to the largest number of merge candidates maxNumMergeCand, and mainly, a small value is set to the largest number of merge candidates maxNumMergeCand when a processing amount of the moving picture coding device is to be reduced. When 0 is set to the largest number of merge candidates maxNumMergeCand, predetermined inter-prediction information is used as a merge candidate. In the description of the present embodiment, the largest number of merge candidates maxNumMergeCand is set to 5.

FIG. 10 illustrates a syntax rule described in prediction block units. In the present embodiment, when the coding block is a skip mode (the syntax element skip_flag[x0][y0] is 1), the value of the prediction mode PredMode of the prediction block is inter-prediction (MODE_INTER) and the merge mode (merge_flag[x0][y0] is 1) and the partition mode (PartMode) is 2N×2N partition (PART_2N×2N). When the flag merge_flag[x0][y0] is 1, it indicates that the prediction mode is a merge mode. When the value of the largest number of merge candidates maxNumMergeCand is larger than 1, a syntax element merge_idx[x0][y0] of an index of a merge list which is the list of merge candidates to be referred to is provided. When the flag skip_flag[x0][y0] is 1, it indicates that the coding block is a skip mode. When the value of the largest number of merge candidates maxNumMergeCand is larger than 1, a syntax element merge_idx[x0][y0] of an index of a merge list which is a list of merge candidates to be referred to is provided.

When the value of the prediction mode PredMode of a prediction block is inter-prediction (MODE_INTER), a flag merge_flag[x0][y0] indicating whether the prediction block is a merge mode is provided. Here, x0 and y0 are indice indicating the position of a pixel at the top-left corner of a prediction block in a picture of a luminance signal, and the flag merge_flag[x0][y0] is a flag indicating whether the prediction block positioned at (x0, y0) in the picture is a merge mode.

Subsequently, when the flag merge_flag[x0][y0] is 1, it indicates that the prediction block is a merge mode. When the value of the largest number of merge candidates maxNumMergeCand is 1, a syntax element merge_idx[x0][y0] of an index of a merge list which is a list of merge candidates to be referred to is provided. Here, x0 and y0 are indice indicating the position of a pixel at the top-left corner of a prediction block in the picture and an index merge_idx[x0][y0] is a merge index of a prediction block positioned at (x0,y0) in the picture. When a merge index is subjected to entropy-coding/decoding, the smaller the number of merge candidates, the smaller coding amount and the smaller processing amount with which the coding/decoding can be performed. FIG. 11 illustrates an example of an entropy symbol (code) of the syntax element merge_idx[x0][y0] of a merge index. When the largest number of merge candidates is 2 and the merge indice are 0 and 1, the symbols of the syntax element merge_idx[x0][y0] of the merge index are '0' and '1', respectively. When the largest number of merge candidates is 3 and the merge indice are 0, 1, and 2, the symbols of the syntax element merge_idx[x0][y0] of the merge index are '0', '10', and '11', respectively. When the largest number of merge candidates is 4 and the merge indice are 0, 1, 2, and 3, the symbols of the merge_idx[x0][y0] of the merge index are '0', '10', '110', and '111', respectively. When the largest number of merge candidates is 5 and the merge indice are 0, 1, 2, 3, and 4, the symbols of the merge_idx[x0][y0] of the merge index are '0', '10', '110', '1110', and '1111', respectively. That is, when the largest number of merge candidates maxNumMergeCand added to the merge candidate list mergeCandList is known, a merge index having the smaller largest number of merge candidates maxNumMergeCand can be represented with a smaller coding amount. In the present embodiment, as illustrated in FIG. 11, the coding amount of the merge indice is reduced by switching symbols indicating the values of the merge indice according to the number of merge candidates. In the present embodiment, a merge index having a value larger than or equal to the value of the largest number of merge candidates maxNumMergeCand will not be coded or decoded. When the largest number of merge candidates maxNumMergeCand is 1, the merge index is not coded/decoded and the merge index is 0. Moreover, the largest number of merge candidates is 0, the merge index is not required since the predetermined inter-prediction information is used as the merge candidate.

On the other hand, when the flag merge_flag[x0][y0] is 0, it indicates that the prediction mode is not a merge mode. When the slice type is the B-slice, a syntax element inter_pred_flag[x0][y0] for identifying an inter-prediction mode is provided, and L0 prediction (Pred_L0), L1 prediction (Pred_L1), and bi-prediction (Pred_BI) are identified by the syntax element. A syntax element ref_idx_l0[x0][y0] and ref_idx_l1[x0][y0] of a reference index for identifying a reference picture and a syntax element mvd_l0[x0][y0][j] and mvd_l1[x0][y0][j] of a motion vector difference which is a difference between the motion vector predictor and the motion vector of the prediction block obtained by motion vector detection are provided for the respective lists L0 and L1. Here, x0 and y0 are indices indicating the position of a pixel at the top-left corner of a prediction block in the picture, ref_idx_l0[x0][y0] and mvd_l0[x0][y0][j] are the L0 reference index and motion vector difference of the prediction block positioned at (x0, y0) in the picture, respectively, and ref_idx_l1[x0][y0] and mvd_l1[x0][y0][j] are the L1 reference index and motion vector difference of the prediction block positioned at (x0, y0) in the picture, respectively. Moreover, j indicates the component of the motion vector difference, j=0 indicates an x-component, and j=1 indicates a y-component. Subsequently, a syntax element mvp_idx_l0 [x0][y0] and mvp_idx_l1 [x0][y0] of an index of a motion vector predictor list which is a list of motion vector predictor candidates to be referred to is provided. Here, x0 and y0 are indice indicating the position of a pixel at the top-left corner of a prediction block in the picture, and mvp_idx_l0 [x0][y0] and mvp_idx_l1 [x0][y0] is a L0 and L1 motion vector predictor index of the prediction block positioned at (x0, y0) in the picture. In the present embodiment of the present invention, the value of the number of these candidates is set to 2.

A inter-prediction information deriving method according to the embodiment is performed by the inter-prediction information deriving unit 104 of the moving picture coding device illustrated in FIG. 1 and the inter-prediction information deriving unit 205 of the moving picture decoding device illustrated in FIG. 2.

The inter-prediction information deriving method according to the embodiment will be described with reference to the drawings. A motion vector prediction method is performed in the coding and decoding process in units of prediction blocks that constitute a coding block. When the prediction mode PredMode of a prediction block is inter-prediction (MODE_INTER) and a merge mode including a skip mode, the motion vector prediction method is performed when deriving a prediction mode, a reference index, and a motion vector of a coding target prediction block using a prediction mode, a reference index, and a motion vector of a coded prediction block in the case of coding and is performed when deriving a prediction mode, a reference index, and a motion vector of a decoding target prediction block using a prediction mode, a reference index, and a motion vector of a decoded prediction block in the case of decoding.

In the merge mode, merge candidates are derived from prediction blocks including a prediction block Col (T0 or T1) present at the same position of different time or near a coding target prediction block described with reference to FIG. 9 in addition to the five prediction blocks of the prediction block A neighboring to the left side, the prediction block B neighboring to the upper side, the prediction block C neighboring to the top-right corner, the prediction block D neighboring to the bottom-left corner, and the prediction block E neighboring to the top-left corner described with reference to FIGS. 5, 6, 7, and 8. The inter-prediction information deriving unit 104 of the moving picture coding device and the inter-prediction information deriving unit 205 of the moving picture decoding device add these merge candidates to the merge candidate list in the same predetermined procedure on the coder and decoder sides. The inter-prediction information deriving unit 104 of the moving picture coding device determines the merge index for identifying the elements of the merge candidate list to perform coding with the aid of the second bitstream constructing unit 110. The inter-prediction information deriving unit 205 of the moving picture decoding device receives the merge index decoded by the second bitstream decoder 202, selects the prediction block corresponding to the merge index from the merge candidate list, and performs motion-compensated prediction using the inter-prediction information such as the prediction mode, the reference index, and the motion vector of the selected merge candidate.

Figure 12:
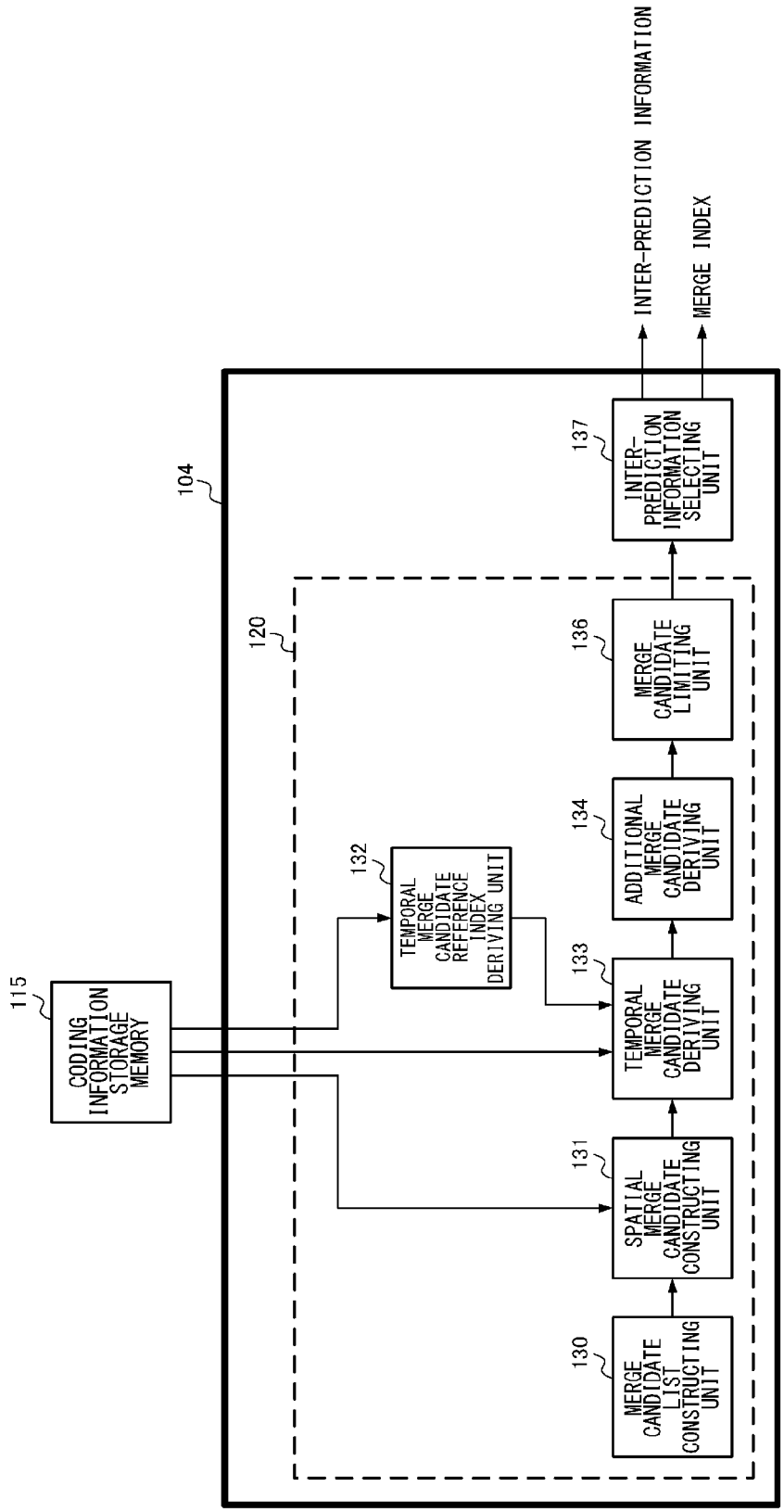
FIG. 12 is a block diagram illustrating a detailed configuration of an inter-prediction information deriving unit of a moving picture coding device illustrated in FIG. 1 according to a first practical example.
Figure 13:
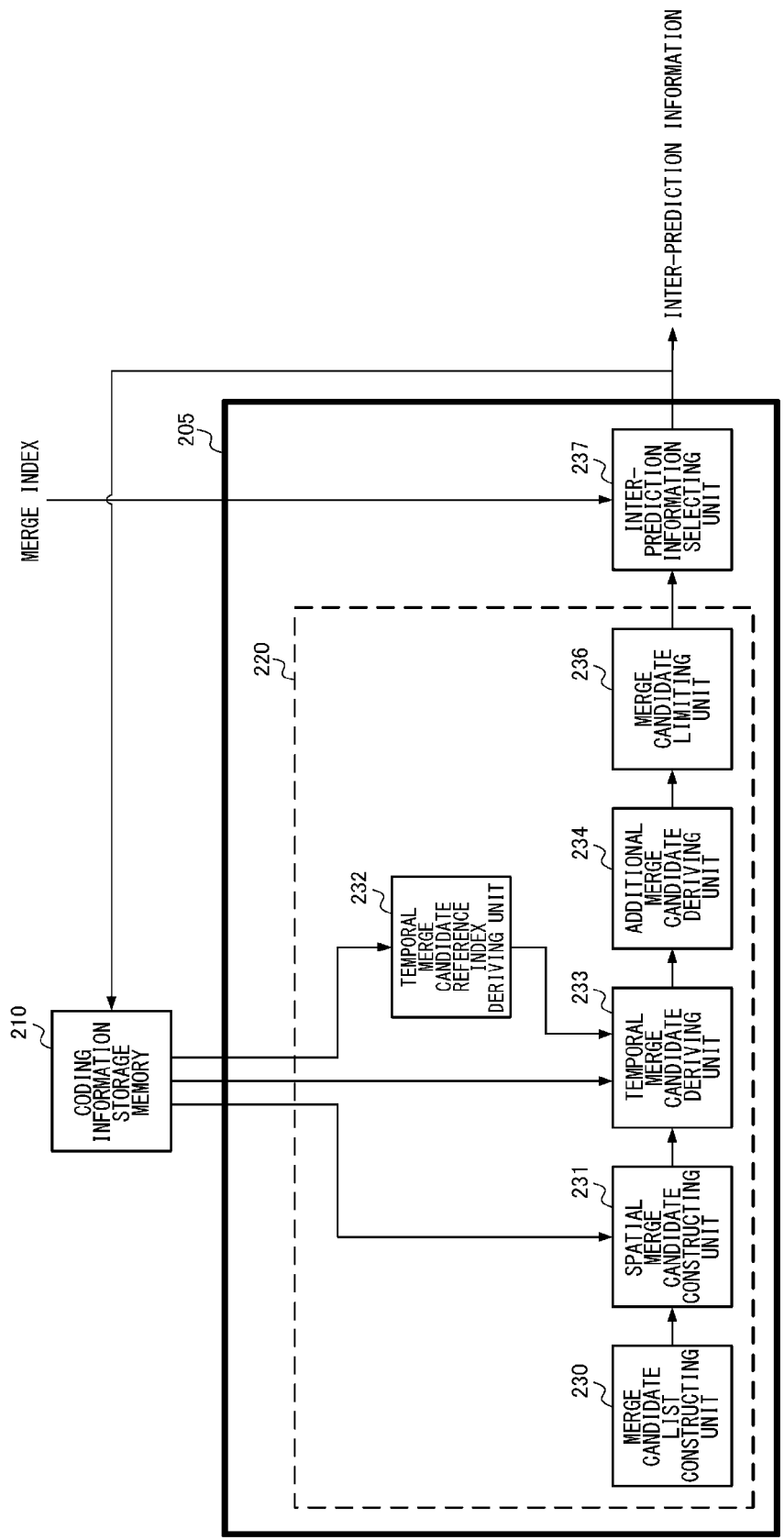
FIG. 13 is a block diagram illustrating a detailed configuration of an inter-prediction information deriving unit of a moving picture decoding device illustrated in FIG. 2 according to a first practical example.

An inter-prediction information deriving method according to a first practical example of the embodiment will be described with reference to the drawings. FIG. 12 is a diagram illustrating a detailed configuration of the inter-prediction information deriving unit 104 of the moving picture coding device illustrated in FIG. 1 according to the first practical example of the embodiment. FIG. 13 is a diagram illustrating a detailed configuration of the inter-prediction information deriving unit 205 of the moving picture decoding device illustrated in FIG. 2 according to the first practical example of the embodiment.

Portions surrounded by a frame depicted by a solid bold line in FIGS. 12 and 13 indicate the inter-prediction information deriving unit 104 and the inter-prediction information deriving unit 205, respectively.

Further, the portions surrounded by a bold dot line inside the frames indicate a merge candidate list constructing unit 120 of the moving picture coding device and a merge candidate list constructing unit 220 of the moving picture decoding device, which derive merge candidates to construct a merge candidate list. The same is provided in a moving picture decoding device corresponding to the moving picture coding device of the embodiment so that the same determination result consistent in coding and decoding is obtained.

In an inter-prediction information deriving method according to the embodiment, in a merge candidate deriving process and a merge candidate list constructing process of the merge candidate list constructing unit 120 of the moving picture coding device and the merge candidate list constructing unit 220 of the moving picture decoding device, merge candidates of a processing target prediction block are derived and a merge candidate list is constructed without referring to a prediction block included in the same coding block as a coding block that includes the processing target prediction block. By doing so, when the partition mode (PartMode) of a coding block is not 2N×2N partition (PART_2N×2N) (that is, when a plurality of prediction blocks is present in a coding block), the coder can perform the merge candidate deriving process and the merge candidate list constructing process in parallel for each prediction block in a coding block.

The parallel process of deriving the merge candidate list of each prediction block in a coding block will be described for each partition mode (PartMode) with reference to FIGS. 14A to 14H. FIGS. 14A to 14H are diagrams for describing a prediction block neighboring to a processing target prediction block for each partition mode (PartMode) of a processing target coding block. In FIGS. 14A to 14H, A0, B0, C0, D0, and E0 indicate a prediction block A neighboring to the left side, a prediction block B neighboring to the upper side, a prediction block C neighboring to the top-right corner, a prediction block D neighboring to the bottom-left corner, and a prediction block E neighboring to the top-left corner of each processing target prediction block of which the partition index PartIdx is 0, respectively. Moreover, A1, B1, C1, D1, and E1 indicate a prediction block A neighboring to the left side, a prediction block B neighboring to the upper side, a prediction block C neighboring to the top-right corner, a prediction block D neighboring to the bottom-left corner, and a prediction block E neighboring to the top-left corner of each processing target prediction block of which the partition index PartIdx is 1, respectively. Moreover, A2, B2, C2, D2, and E2 indicate a prediction block A neighboring to the left side, a prediction block B neighboring to the upper side, a prediction block C neighboring to the top-right corner, a prediction block D neighboring to the bottom-left corner, and a prediction block E neighboring to the top-left corner of each processing target prediction block of which the partition index PartIdx is 2, respectively. Further, A3, B3, C3, D3, and E3 indicate a prediction block A neighboring to the left side, a prediction block B neighboring to the upper side, a prediction block C neighboring to the top-right corner, a prediction block D neighboring to the bottom-left corner, and a prediction block E neighboring to the top-left corner of each processing target prediction block of which the partition index PartIdx is 3, respectively.

FIGS. 14B, 14C, and 14D are diagrams illustrating neighboring prediction blocks when the partition mode (PartMode) of partitioning a processing target coding block into two prediction blocks arranged in the vertical direction is 2N×N partition (PART_2N×N), 2N×nU partition (PART_2N×nU), and 2N×nD partition (PART_2N×nD), respectively. A prediction block B1 neighboring to a processing target prediction block having the PartIdx 1 is a prediction block having the PartIdx 0. Thus, when the merge candidate deriving process and the merge candidate list constructing process are performed for the prediction block having the PartIdx 1 by referring to the prediction block B1, the processes cannot be performed unless the merge candidate deriving process and the merge candidate list constructing process for the prediction block having the PartIdx 0 belonging to the same coding block which is the prediction block B1 and the merge candidates to be used are specified. Thus, in the inter-prediction information deriving method according to the embodiment, when the partition mode (PartMode) is 2N×N partition (PART_2N×N), 2N×nU partition (PART_2N×nU), and 2N×nD partition (PART_2N×nD) and PartIdx of the processing target prediction block is 1, by performing the merge candidate deriving process and the merge candidate list constructing process for the prediction block having the PartIdx 1 without referring to the prediction block B1 which is the prediction block having the PartIdx 0, it is possible to perform the merge candidate deriving process and the merge candidate list constructing process for two prediction blocks in the coding block in parallel.

FIGS. 14E, 14F, and 14G are diagrams illustrating neighboring prediction blocks when the partition mode (PartMode) of partitioning a processing target coding block into two prediction blocks arranged in the horizontal direction is N×2N partition (PART_N×2N), nL×2N partition (PART_nL×2N), and nR×2N partition (PART_nR×2N), respectively. A prediction block A1 neighboring to a processing target prediction block having the PartIdx 1 is a prediction block having the PartIdx 0. Thus, when the merge candidate deriving process and the merge candidate list constructing process are performed for the prediction block having the PartIdx 1 by referring to the prediction block A1, the processes cannot be performed unless the merge candidate deriving process and the merge candidate list constructing process for the prediction block having the PartIdx 0 belonging to the same coding block which is the prediction block A1 and the merge candidates to be used are specified. Thus, in the inter-prediction information deriving method according to the embodiment, when the partition mode (PartMode) is N×2N partition (PART_N×2N), nL×2N partition (PART_nL×2N), and nR×2N partition (PART_nR×2N) and PartIdx of the processing target prediction block is 1, by performing the merge candidate deriving process and the merge candidate list constructing process for the prediction block having the PartIdx 1 without referring to the prediction block A1 which is the prediction block having the PartIdx 0, it is possible to perform the merge candidate deriving process and the merge candidate list constructing process for two prediction blocks in the coding block in parallel.

FIG. 14H is a diagram illustrating neighboring prediction blocks when the partition mode (PartMode) of partitioning a processing target coding block into four prediction blocks in both vertical and horizontal directions is N×N partition (PART_N×N). A prediction block A1 neighboring to a processing target prediction block having the PartIdx 1 is a prediction block having the PartIdx 0. Thus, when the merge candidate deriving process and the merge candidate list constructing process are performed for the prediction block having the PartIdx 1 by referring to the prediction block A1, the processes cannot be performed unless the merge candidate deriving process and the merge candidate list constructing process for the prediction block having the PartIdx 0 belonging to the same coding block which is the prediction block A1 are completed and the merge candidates to be used are specified. Thus, in the inter-prediction information deriving method according to the embodiment, when the partition mode (PartMode) is N×N partition (PART_N×N) and PartIdx of the processing target prediction block is 1, by performing the merge candidate deriving process and the merge candidate list constructing process for the prediction block having the PartIdx 1 without referring to the prediction block A1 which is the prediction block having the PartIdx 0, it is possible to perform the merge candidate deriving process and the merge candidate list constructing process for respective prediction blocks in the coding block in parallel. A prediction block B2 neighboring to a processing target prediction block having the PartIdx 2 is a prediction block having the PartIdx 0, and a prediction block C2 is a prediction block having the PartIdx 1. Thus, when the merge candidate deriving process and the merge candidate list constructing process are performed for the prediction block having the PartIdx 2 by referring to the prediction blocks B2 and C2, the processes cannot be performed unless the merge candidate deriving process and the merge candidate list constructing process for the prediction blocks having the PartIdx 0 and 1 belonging to the same coding blocks which are the prediction blocks B2 and C2 are completed and the merge candidates to be used are specified. Thus, in the inter-prediction information deriving method according to the embodiment, when the partition mode (PartMode) is N×N partition (PART_N×N) and PartIdx of the processing target prediction block is 2, by performing the merge candidate deriving process and the merge candidate list constructing process for the prediction block having the PartIdx 2 without referring to the prediction blocks B2 and C2 which are the prediction blocks having the PartIdx 0 and 1, it is possible to perform the merge candidate deriving process and the merge candidate list constructing process for respective prediction blocks in the coding block in parallel. A prediction block E3 neighboring to a processing target prediction block having the PartIdx 3 is a prediction block having the PartIdx 0, a prediction block B3 is a prediction block having PartIdx 1, and a prediction block A3 is a prediction block having the PartIdx 2. Thus, when the merge candidate deriving process and the merge candidate list constructing process are performed for the prediction block having the PartIdx 3 by referring to the prediction blocks E3, B3, and A3, the processes cannot be performed unless the merge candidate deriving process and the merge candidate list constructing process for the prediction blocks having the PartIdx 0, 1, and 2 belonging to the same coding blocks which are the prediction blocks E3, B3, and A3 are completed and the merge candidates to be used are specified. Thus, in the inter-prediction information deriving method according to the embodiment, when the partition mode (PartMode) is N×N partition (PART_N×N) and PartIdx of the processing target prediction block is 3, by performing the merge candidate deriving process and the merge candidate list constructing process for the prediction block having the PartIdx 3 without referring to the prediction blocks E3, B3, and A3 which are the prediction blocks having the PartIdx 0, 1, and 2, it is possible to perform the merge candidate deriving process and the merge candidate list constructing process for respective prediction blocks in the coding block in parallel.

The inter-prediction information deriving unit 104 of the moving picture coding device illustrated in FIG. 12 includes a merge candidate list constructing unit 130, a spatial merge candidate constructing unit 131, a temporal merge candidate reference index deriving unit 132, a temporal merge candidate deriving unit 133, an additional merge candidate deriving unit 134, a merge candidate limiting unit 136, and an inter-prediction information selecting unit 137.

The inter-prediction information deriving unit 205 of the moving picture decoding device illustrated in FIG. 13 includes a merge candidate list constructing unit 230, a spatial merge candidate constructing unit 231, a temporal merge candidate reference index deriving unit 232, a temporal merge candidate deriving unit 233, an additional merge candidate deriving unit 234, a merge candidate limiting unit 236, and an inter-prediction information selecting unit 237.

Figure 15:
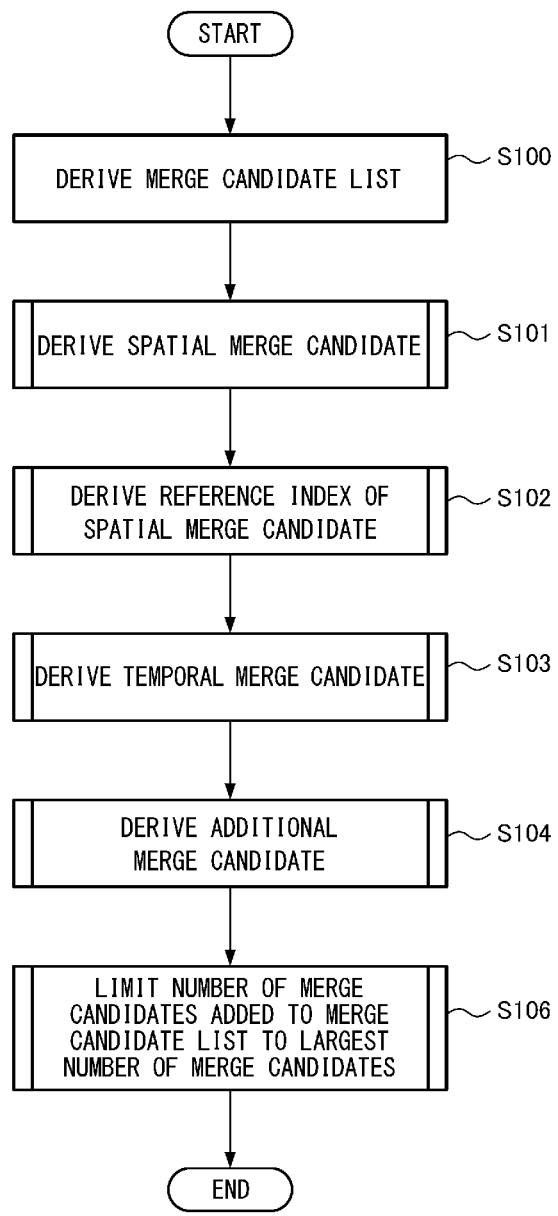
FIG. 15 is a flowchart for describing the flow of a process of deriving merge candidates of a merge mode and a process of constructing a merge candidate list according to the first practical example.

FIG. 15 is a flowchart for describing the flow of a merge candidate deriving process and a merge candidate list constructing process which are the common functions of the merge candidate list constructing unit 120 of the inter-prediction information deriving unit 104 of the moving picture coding device and the merge candidate list constructing unit 220 of the inter-prediction information deriving unit 205 of the moving picture decoding device according to the first practical example of the embodiment of the present invention.

Hereinafter, the respective processes will be described in sequence. In the following description, although a case where the slice type slice_type is B-slice is described unless otherwise set forth, the same can be applied to P-slice. However, when the slice type slice_type is P-slice, since the inter-prediction mode includes L0 prediction (Pred_L0) only and does not include L1 prediction (Pred_L1) and bi-prediction (Pred_BI), processes associated with L1 can be omitted. In the present embodiment, in the moving picture coding device and the moving picture decoding device, when the value of the largest number of merge candidates maxNumMergeCand is 0, the merge candidate deriving process and the merge candidate list constructing process of FIG. 15 can be omitted.

First, the merge candidate list constructing unit 130 of the inter-prediction information deriving unit 104 of the moving picture coding device and the merge candidate list constructing unit 230 of the inter-prediction information deriving unit 205 of the moving picture decoding device create a merge candidate list mergeCandList (step S100 of FIG. 15). The merge candidate list mergeCandList has a list structure and includes a merge index indicating the locations in the merge candidate list and a storage area that stores a merge candidate corresponding to an index as an element. The merge index number starts with 0, and a merge candidate is stored in the storage area of the merge candidate list mergeCandList. In the following process, a prediction block serving as a merge candidate corresponding to a merge index i added to the merge candidate list mergeCandList is expressed as mergeCandList[i] so as to distinguish the arrangement notation from merge candidate list mergeCandList. In the present embodiment, it is assumed that the merge candidate list mergeCandList can add at least five merge candidates (inter-prediction information). Further, 0 is set to a variable numMergeCand indicating the number of merge candidates added to the merge candidate list mergeCandList. The created merge candidate list mergeCandList is supplied to the spatial merge candidate constructing unit 131 of the inter-prediction information deriving unit 104 of the moving picture coding device and the spatial merge candidate constructing unit 231 of the inter-prediction information deriving unit 205 of the moving picture decoding device.

The spatial merge candidate constructing unit 131 of the inter-prediction information deriving unit 104 of the moving picture coding device and the spatial merge candidate constructing unit 231 of the inter-prediction information deriving unit 205 of the moving picture decoding device derive spatial merge candidates A, B, C, D, and E from the respective prediction blocks A, B, C, D, and E neighboring to the coding/decoding target block from the coding information stored in the coding information storage memory 115 of the moving picture coding device or the coding information storage memory 210 of the moving picture decoding device and add the derived spatial merge candidates to the merge candidate list mergeCandList (step S101 of FIG. 15). Here, N indicating A, B, C, D, E, or anyone of the temporal merge candidates Col is defined. A flag availableFlagN indicating whether inter-prediction information of a prediction block N can be used as a spatial merge candidate N, a L0 reference index refIdxL0N and a L1 reference index refIdxL1N of the spatial merge candidate N, a L0 prediction flag predFlagL0N indicating whether or not to perform L0 prediction, a L1 prediction flag predFlagL1N indicating whether or not to perform L1 prediction, a L0 motion vector mvL0N, and a L1 motion vector mvL1N are derived. However, in the present embodiment, since merge candidates are derived without referring to a prediction block included in the same coding block as the coding block that includes a processing target prediction block, the spatial merge candidates included in the same coding block as the coding block that includes the processing target prediction block are not derived. The flow of a detailed process of step S101 will be described later with reference to the flowchart of FIG. 16. The merge candidate list mergeCandList is supplied to the temporal merge candidate deriving unit 133 of the inter-prediction information deriving unit 104 of the moving picture coding device and the temporal merge candidate deriving unit 233 of the inter-prediction information deriving unit 205 of the moving picture decoding device.

Subsequently, the temporal merge candidate reference index deriving unit 132 of the inter-prediction information deriving unit 104 of the moving picture coding device and the temporal merge candidate reference index deriving unit 232 of the inter-prediction information deriving unit 205 of the moving picture decoding device derive the reference indice of temporal merge candidates from prediction blocks neighboring to the coding/decoding target block and supply the derived reference indice to the temporal merge candidate deriving unit 133 of the inter-prediction information deriving unit 104 of the moving picture coding device and the temporal merge candidate deriving unit 233 of the inter-prediction information deriving unit 205 of the moving picture decoding device (step S102 of FIG. 15). However, in the present embodiment, the reference indice of temporal merge candidates are derived without referring to a prediction block included in the same coding block as the coding block that includes the processing target prediction block. When the slice type slice_type is P-slice and the inter-prediction is performed using the inter-prediction information of the temporal merge candidates, only the L0 reference indice only are derived since L0 prediction (Pred_L0) only is performed. When the slice type slice_type is B-slice and the inter-prediction is performed using the inter-prediction information of temporal merge candidates, L0 and L1 reference indice are derived since bi-prediction (Pred_BI) is performed. The flow of a detailed process of step S102 will be described in detail later with reference to the flowchart of FIG. 18.

Subsequently, the temporal merge candidate deriving unit 133 of the inter-prediction information deriving unit 104 of the moving picture coding device and the temporal merge candidate deriving unit 233 of the inter-prediction information deriving unit 205 of the moving picture decoding device derive temporal merge candidates from pictures of different time and add the derived temporal merge candidates to the merge candidate list mergeCandList (step S103 of FIG. 15). A flag available FlagCol indicating whether temporal merge candidates can be used, a L0 prediction flag predFlagL0Col indicating whether L0 prediction is performed, a L1 prediction flag predFlagL1Col indicating whether L1 prediction is performed, a L0 motion vector mvL0N, and a L1 motion vector mvL1N are derived. The flow of a detailed process of step S103 will be described in detail later with reference to the flowchart of FIG. 19. The merge candidate list mergeCandList is supplied to the additional merge candidate deriving unit 134 of the inter-prediction information deriving unit 104 of the moving picture coding device and the additional merge candidate deriving unit 234 of the inter-prediction information deriving unit 205 of the moving picture decoding device.

Subsequently, the additional merge candidate deriving unit 134 of the inter-prediction information deriving unit 104 of the moving picture coding device and the additional merge candidate deriving unit 234 of the inter-prediction information deriving unit 205 of the moving picture decoding device derive additional merge candidates using the largest number of merge candidates maxNumMergeCand as an upper limit when the number of merge candidates numMergeCand added to the merge candidate list mergeCandList is smaller than the largest number of merge candidates maxNumMergeCand and add the derived additional merge candidates to the merge candidate list mergeCandList (step S104 of FIG. 15). Using the largest number of merge candidates maxNumMergeCand as an upper limit, for the P-slices, merge candidates which have different reference indice and of which the motion vector has the value (0, 0) and the prediction mode is L0 prediction (Pred_L0) are added. For the B-slices, merge candidates which have different reference indice and of which the motion vector has the value (0, 0) and the prediction mode is bi-prediction (Pred_BI) are added. The flow of a detailed process of step S104 will be described in detail later with reference to the flowchart of FIG. 26. For the B-slices, merge candidates which have been added and of which the combinations of L0 prediction and L1 prediction are changed and the prediction mode is bi-prediction (Pred_BI) may be derived and added. The merge candidate list mergeCandList is supplied to the merge candidate limiting unit 136 of the inter-prediction information deriving unit 104 of the moving picture coding device and the merge candidate limiting unit 236 of the inter-prediction information deriving unit 205 of the moving picture decoding device.

Subsequently, the merge candidate limiting unit 136 of the inter-prediction information deriving unit 104 of the moving picture coding device and the merge candidate limiting unit 236 of the inter-prediction information deriving unit 205 of the moving picture decoding device limit the value of the number of merge candidates numMergeCand added to the merge candidate list mergeCandList to the largest number of merge candidates maxNumMergeCand when the value of the number of merge candidates numMergeCand added to the merge candidate list mergeCandList is larger than the largest number of merge candidates maxNumMergeCand (step S106 of FIG. 15). The merge candidate list mergeCandList is supplied to the inter-prediction information selecting unit 137 of the inter-prediction information deriving unit 104 of the moving picture coding device and the inter-prediction information selecting unit 237 of the inter-prediction information deriving unit 205 of the moving picture decoding device. The flow of a detailed process of step S106 will be described with reference to the flowchart of FIG. 27.

Figure 27:
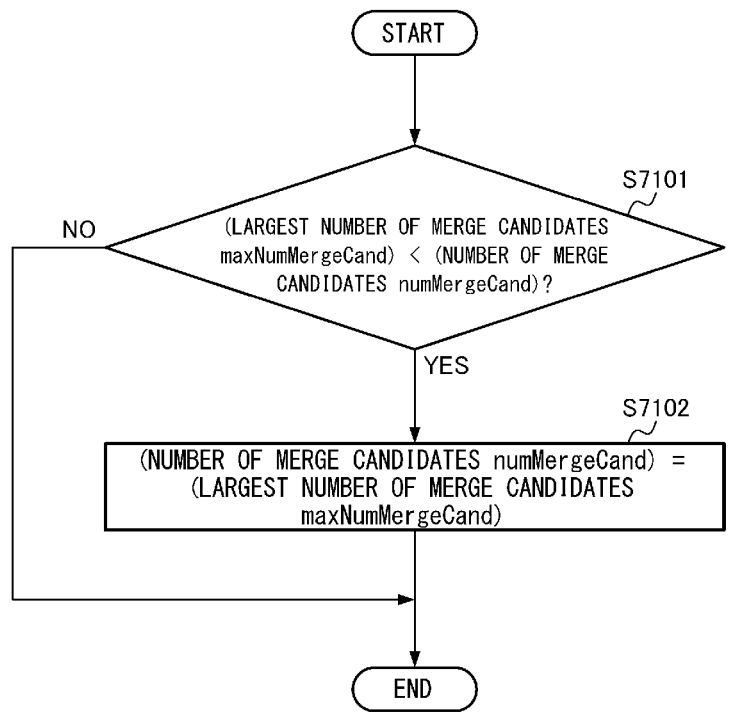
FIG. 27 is a flowchart for describing the flow of a merge candidate limiting process.

When the value of the number of merge candidates numMergeCand added to the merge candidate list mergeCandList is larger than the largest number of merge candidates maxNumMergeCand (step S7101 of FIG. 27: YES), the value of the number of merge candidates numMergeCand is updated to the largest number of merge candidates maxNumMergeCand (step S7102 of FIG. 27). The process of step S7102 means inhibiting accesses to all merge candidates of which the merge index in the merge candidate list mergeCandList is larger than (maxNumMergeCand−1) and limiting the number of merge candidates added to the merge candidate list mergeCandList to the largest number of merge candidates maxNumMergeCand.

In the present embodiment, the number of merge candidates added to the merge candidate list mergeCandList is set to a fixed number in respective slices. The reason why the number of merge candidates added to the merge candidate list mergeCandList is fixed is as follows. If the number of merge candidates added to the merge candidate list mergeCandList changes depending on the state of the constructed merge candidate list, entropy decoding depends on the constructed merge candidate list. Thus, the decoder cannot decode merge indice by entropy decoding unless a merge candidate list is constructed for respective prediction blocks and the number of merge candidates added to the merge candidate list mergeCandList is derived. As a result, decoding of merge indice is delayed and entropy decoding becomes complex. Further, if entropy decoding depends on the state of a constructed merge candidate list that includes merge candidates Col derived from prediction blocks of pictures of different time, when an error occurs during decoding of a bitstream of a different picture, a bitstream of the current picture is also influenced by the error. Thus, it is not possible to derive the number of merge candidates added to a normal merge candidate list mergeCandList and to continue entropy decoding properly. As in the present embodiment, when the number of merge candidates added to the merge candidate list mergeCandList is set to a fixed value for respective slices, it is not necessary to derive the number of merge candidates added to the merge candidate list mergeCandList in respective prediction blocks and it is possible to decode merge indice by entropy decoding independently from construction of the merge candidate list. Moreover, even if an error occurs during decoding of a bitstream of another picture, it is possible to continue entropy decoding of a bitstream of the current picture without being influenced by the error. In the present embodiment, a syntax element indicating the number of merge candidates added to the merge candidate list mergeCandList is coded for respective slices, and the number of merge candidates added to the mergeCandList is defined as the largest number of merge candidates maxNumMergeCand.

Figure 16:
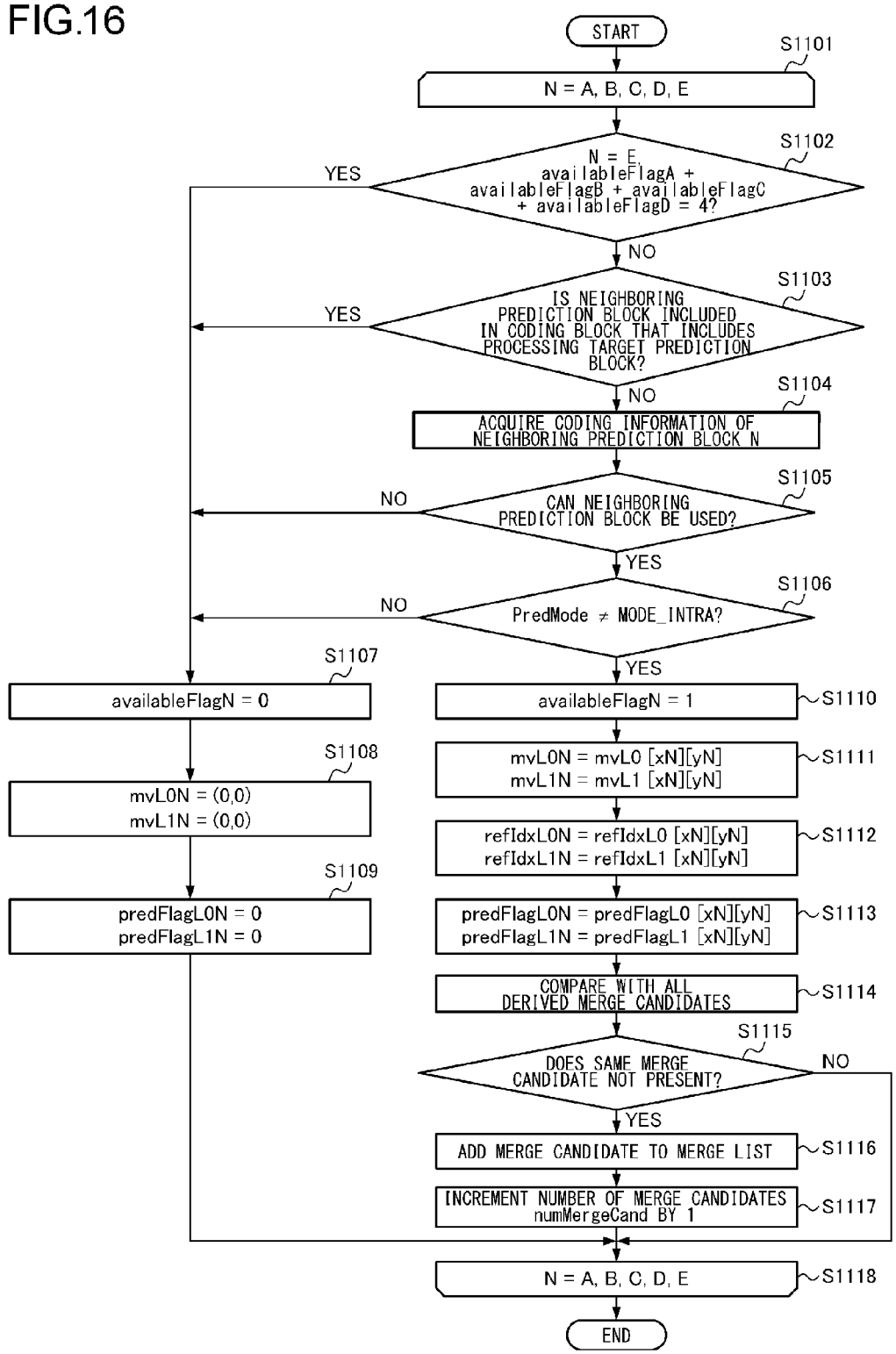
FIG. 16 is a flowchart for describing the flow of a process of deriving spatial merge candidates of a merge mode.

Subsequently, a method of deriving merge candidates N from prediction blocks N neighboring to a coding/decoding target block, which is the process of step S101 of FIG. 15 will be described in detail. FIG. 16 is a flowchart for describing the flow of a spatial merge candidate deriving process of step S101 of FIG. 15. N is a variable A (left), B (upper), C (top-right), D (bottom-left), or E (top-left) indicating the region of a neighboring prediction block. In the present embodiment, four spatial merge candidates at most are derived from five neighboring prediction blocks.

In FIG. 16, the coding information of a prediction block A neighboring to the left side of a coding/decoding target prediction block using the variable N set to A is investigated to derive a merge candidate A, the coding information of a prediction block B neighboring to the left side of a coding/decoding target prediction block using the variable N set to B is investigated to derive a merge candidate B, the coding information of a prediction block C neighboring to the left side of a coding/decoding target prediction block using the variable N set to C is investigated to derive a merge candidate C, the coding information of a prediction block D neighboring to the left side of a coding/decoding target prediction block using the variable N set to D is investigated to derive a merge candidate D, and the coding information of a prediction block E neighboring to the left side of a coding/decoding target prediction block using the variable N set to E is investigated to derive a merge candidate E. The derived merge candidates are added to the merge candidate list (steps S1101 to S1118 of FIG. 16).

First, when the variable N is E and the sum of the values of flags availableFlagA, availableFlagB, availableFlagC, and availableFlagD is 4 (step S1102 of FIG. 16: YES) (that is, four spatial merge candidates are derived), the flag availableFlagE of the merge candidate E is set to 0 (step S1107 of FIG. 16), both values of the motion vectors mvL0E and mvL1E of the merge candidate E are set to (0, 0) (step S1108 of FIG. 16), both values of the flags predFlagL0E and predFlagL1E of the merge candidate E are set to 0 (step S1109 of FIG. 16). After that, the flow proceeds to step S1118 and the spatial merge candidate deriving process ends.

In the present embodiment, since four merge candidates at most are derived from the neighboring prediction blocks, when four spatial merge candidates have already been derived, it is not necessary to perform the spatial merge candidate deriving process further.

On the other hand, when the variable N is not E or the sum of the values of the flags availableFlagA, availableFlagB, availableFlagC, and availableFlagD is not 4 (step S1102 of FIG. 16: NO) (that is, four spatial merge candidates are not derived), the flow proceeds to step S1103. When the neighboring prediction block N is included in the same coding block as the coding block that includes the deriving target prediction block (step S1103 of FIG. 16; YES), the value of the flag availableFlagN of the merge candidate N is set to 0 (step S1107 of FIG. 16), both values of the motion vectors mvL0N and mvL1N of the merge candidate N are set to (0, 0) (step S1108 of FIG. 16), both values of the flags predFlagL0N and predFlagL1N of the merge candidate N are set to 0 (step S1109 of FIG. 16), and then, the flow proceeds to step S1118. When the neighboring prediction block N is included in the same coding block as the coding block that includes the deriving target prediction block (step S1103 of FIG. 16: YES), the neighboring prediction block N is not referred to so that the prediction block merge candidate deriving process and the merge candidate list constructing process can be performed in parallel.

Specifically, the neighboring prediction block B of which the partition mode (PartMode) is 2N×N partition (PART_2N×N), 2N×nU partition (PART_2N×nU), or 2N×nD partition (PART_2N×nD) and the PartIdx of the processing target prediction block is 1 is the case that the neighboring prediction block N is included in the same coding block as the coding block that includes the deriving target prediction block. In this case, since the neighboring prediction block B is a prediction block having the PartIdx 0, the neighboring prediction block B is not referred to so that the prediction block merge candidate deriving process and the merge candidate list constructing process can be performed in parallel.

Further, the neighboring prediction block A of which the partition mode (PartMode) is N×2N partition ((PART_N×2N), nL×2N partition (PART_nL×2N), or nR×2N partition (PART_nR×2N) and the PartIdx of the processing target prediction block is 1 is the case that the neighboring prediction block N is included in the same coding block as the coding block that includes the deriving target prediction block. In this case, since the neighboring prediction block A is the prediction block having the PartIdx 0, the neighboring prediction block A is not referred to so that the prediction block merge candidate deriving process and the merge candidate list constructing process can be performed in parallel.

Further, when the partition mode (PartMode) is N×N partition (PART_N×N) and the PartIdx of the processing target prediction block is 1, 2, or 3, the neighboring prediction block N may be included in the same coding block as the coding block that includes the deriving target prediction block.

On the other hand, when the neighboring prediction block N is not included the same coding block that includes the processing target prediction block (step S1103 of FIG. 16: NO), the prediction blocks N neighboring to the coding/decoding target prediction block are specified, and when the respective prediction blocks N can be used, the coding information of the prediction blocks N is acquired from the coding information storage memory 115 or 210 (step S1104 of FIG. 16).

When the neighboring prediction block N cannot be used (step S1105 of FIG. 16: NO) or the prediction mode PredMode of the prediction block N is intra-prediction (MODE_INTRA) (step S1106 of FIG. 16: NO), the value of the flag availableFlagN of the merge candidate N is set to 0 (step S1107 of FIG. 16), both values of the motion vectors mvL0N and mvL1N of the merge candidate N are set to (0, 0) (step S1108 of FIG. 16), and both values of the flags predFlagL0N and predFlagL1N of the merge candidate N are set to 0 (step S1109). Then, the flow proceeds to step S1118. Here, specific examples of the case where the neighboring prediction block N cannot be used include a case where the neighboring prediction block N is positioned outside a coding/decoding target slice and a case where a coding/decoding process is not completed because the neighboring prediction block N is later in the order of the coding/decoding process.

On the other hand, when the neighboring prediction block N is outside the same coding block as the coding block of the deriving target prediction block (step S1104 of FIG. 16: YES), the neighboring prediction block N can be used (step S1105 of FIG. 16: YES), and the prediction mode PredMode of the prediction block N is not the intra-prediction (MODE_INTRA) (step S1106 of FIG. 16: YES), the inter-prediction information of the prediction block N is used as the inter-prediction information of the merge candidate N. The value of the flag availableFlagN of the merge candidate N (step S1110 of FIG. 16) is set to 1, the motion vectors mvL0N and mvL1N of the merge candidate N are set to the same values of the motion vectors mvL0N [xN][yN] and mvL1N [xN][yN] of the motion vectors of the prediction block N (step S1111 of FIG. 16), the reference indice refIdxL0N and refIdxL1N of the merge candidate N are set to the same values as the reference indice refIdxL0[xN][yN] and refIdxL1[xN][yN] of the prediction block N (step S1112 of FIG. 16), and the flags predFlagL0N and predFlagL1N of the merge candidate N are set to the flags predFlagL0[xN][yN] and predFlagL1[xN][yN] of the prediction block N (step S1113 of FIG. 16). Here, xN and yN are indice indicating the position of a pixel at the top-left corner of the prediction block N in the picture.

Subsequently, the flags predFlagL0N and predFlagL1N of the merge candidate N, the reference indice refIdxL0N and refIdxL1N of the merge candidate N, and the motion vectors mvL0N and mvL1N of the merge candidate N are compared with those of the merge candidates which have been derived (step S1114: FIG. 16). When the same merge candidate is not present (step S1115 of FIG. 16: YES), the merge candidate N is added to the position at which the merge index of the merge candidate list mergeCandList has the same value as numMergeCand (step S1116 of FIG. 16) and the number of merge candidates numMergeCand is incremented by 1 (step S1117 of FIG. 16). On the other hand, when the same merge candidate is present (step S1115 of FIG. 16: NO), steps S1116 and S1117 are skipped and the flow proceeds to step S1118.

The processes of steps S1102 to S1117 are repeatedly performed for N=A, B, C, D, and E (steps S1101 to S1118 of FIG. 16).

Next, a method of deriving the reference indice of temporal merge candidates of step S102 of FIG. 15 will be described in detail. The L0 and L1 reference indice of the temporal merge candidates are derived.

In the present embodiment, the reference indice of the temporal merge candidates are derived using the reference indice of spatial merge candidates (that is, the reference indice used in the prediction blocks neighboring to the coding/decoding target block). This is because when a temporal merge candidate is selected, the reference index of the coding/decoding target prediction block has high correlation with the reference index of the prediction blocks neighboring to the coding/decoding target block which becomes the spatial merge candidate. In particular, in the present embodiment, the reference indice only of the prediction block A neighboring to the left side of the coding/decoding target prediction block are used. This is because the prediction blocks A and B neighboring to the side of the coding/decoding target prediction block among the neighboring prediction blocks A, B, C, D, and E which are also spatial merge candidates have higher correlation than the prediction blocks C, D, and E neighboring to the corner of the coding/decoding target prediction block. Since the prediction blocks C, D, and E having relatively low correlation are not used and the prediction blocks to be used are limited to the prediction block A, it is possible to improve the coding efficiency resulting from deriving of the reference indice of temporal merge candidates and to reduce the processing amount and the memory access amount associated with the process of deriving the reference indice of temporal merge candidates.

FIGS. 17A to 17H are diagrams illustrating neighboring blocks referred to in the temporal merge candidate reference index deriving process of the present embodiment. In the present embodiment, whether or not to refer to the prediction block neighboring to the left side of the deriving target prediction block is changed according to the partition index PartIdx of the prediction block regardless of the partition mode (PartMode) of a coding block. When the partition index PartIdx of the prediction block is 0, the prediction block neighboring to the left side is referred to. When the partition index PartIdx is not 0, the neighboring prediction block is not referred to but a default value is used. When the partition index PartIdx of the prediction block is 0, in any partition mode (PartMode), the prediction block neighboring to the left side does always not belong to the coding block. When the partition index PartIdx of the prediction block is not 0, the prediction block neighboring to the left side belongs to the coding block depending on the partition mode (PartMode). When the partition mode (PartMode) is 2N×2N partition (PART_2N×2N), as illustrated in FIG. 17A, a prediction block A0 neighboring to the left side of the deriving target prediction block is referred to, and the LX reference index of the temporal merge candidate is set to the value of the LX reference index of the prediction block A0.

When the partition mode (PartMode) of partitioning a processing target coding block into two prediction blocks arranged in the vertical direction is 2N×N partition (PART_2N×N), 2N×nU partition (PART_2N×nU), and 2N×nD partition (PART_2N×nD) and the partition mode (PartMode) of partitioning a processing target coding block into two prediction block arranged in the horizontal direction is N×2N partition ((PART_N×2N), nL×2N partition (PART_nL×2N), and nR×2N partition (PART_nR×2N), as illustrated in FIGS. 17B, 17C, 17D, 17E, 17F, and 17G, the prediction block A0 neighboring to the left side is referred to in the prediction block of which the partition index PartIdx is 0, and the LX reference index of the temporal merge candidate is set to the value of the LX reference index of the prediction block A0. The neighboring prediction block is not referred to in the prediction block of which the partition index PartIdx of the deriving target is 1, and the LX reference index of the temporal merge candidate is set to the default value 0. Since the prediction block A0 to be referred to does not belong to the coding block, the reference indice of the temporal merge candidates of two prediction blocks of which the partition indice PartIdx are 0 and 1 can be derived in parallel.

When the partition mode (PartMode) of partitioning a processing target coding block into four prediction blocks in vertical and horizontal directions is N×N partition (PART_N×N), as illustrated in FIG. 17H, the prediction block A0 neighboring to the left side is referred to in the prediction block of which the deriving target partition index PartIdx is 0, the LX reference index of the temporal merge candidate is set to the value of the LX reference index of the prediction block A0. In the prediction blocks of which the deriving target partition indice PartIdx are 1, 2, and 3, the neighboring prediction block is not referred to, and the LX reference index of the temporal merge candidate is set to the default value 0. Since the prediction block A0 to be referred to does not belong to the coding block, the reference indice of the temporal merge candidates of four prediction blocks of which the partition indice PartIdx are 0, 1, 2, and 3 are derived in parallel.

However, when the neighboring prediction block A does not perform LX prediction, the value of the LX refractive index of the temporal merge candidate is set to the default value 0. The reason why the default value of the LX reference index of the temporal merge candidate is set to 0 when the neighboring prediction block A does not perform LX prediction and the partition index PartIdx of the deriving target prediction block is 1 is because the reference picture of which the value of the reference index in inter-prediction is 0 is most probable to be selected. However, the present invention is not limited to this, the default value of the reference index may be a value (1, 2, or the like) other than 0, and a syntax element indicating the default value of the reference index may be provided in a bitstream in sequence, picture, or slice levels and be transmitted so that the default value can be selected on the coder side.

Figure 18:
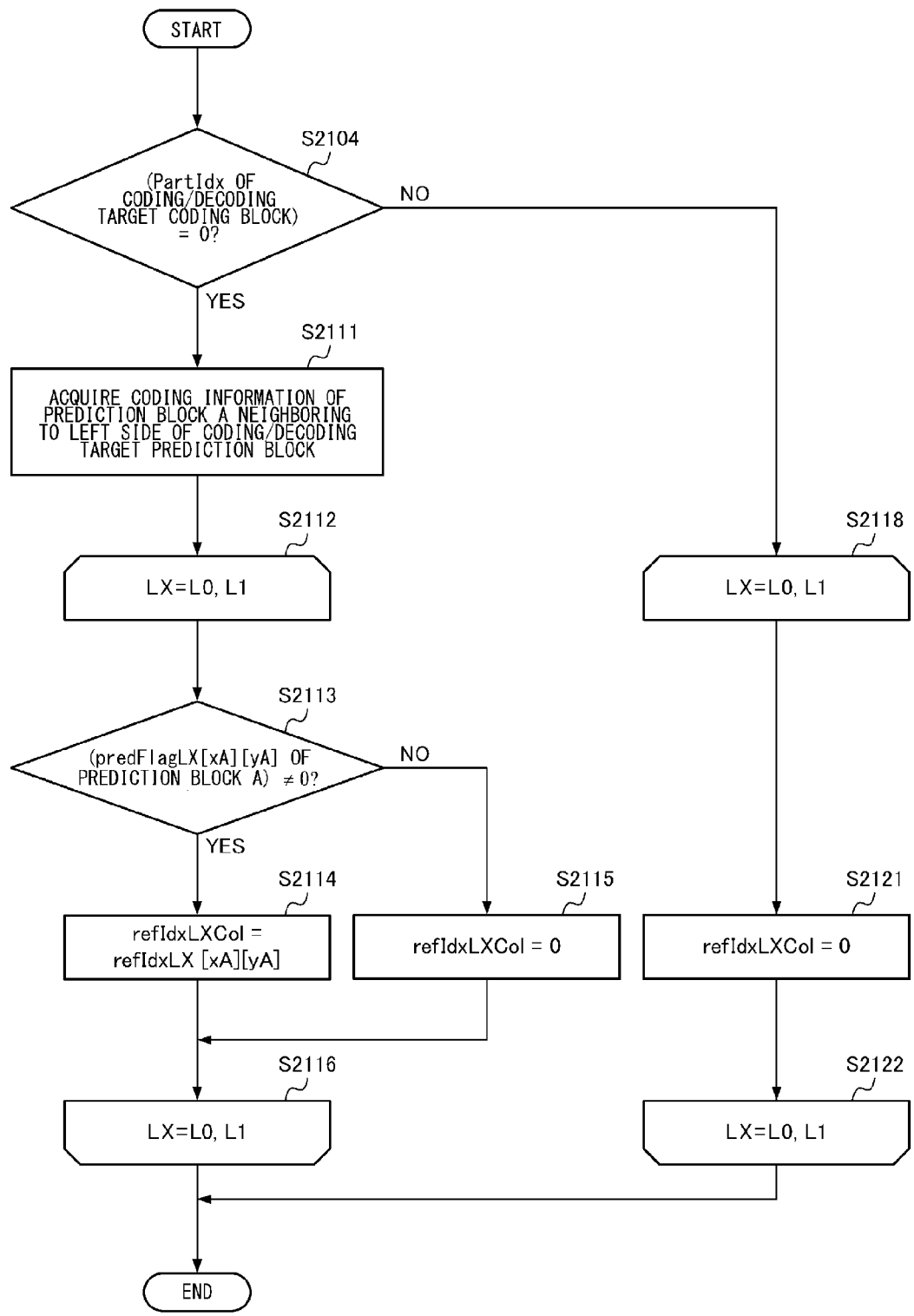
FIG. 18 is a flowchart for describing the flow of a process of deriving reference indice of temporal merge candidates of a merge mode.

FIG. 18 is a flowchart for describing the flow of a temporal merge candidate reference index deriving process of step S102 of FIG. 15 according to the present embodiment. First, when the partition index PartIdx is 0 (step S2104: YES), the coding information of the prediction block A neighboring to the left side of the deriving target prediction block is acquired from the coding information storage memory 115 or 210 (step S2111).

The subsequent processes of steps S2113 to S2115 are performed in the respective lists L0 and L1 (steps S2112 to S2116). LX is set to L0 when the L0 reference index of the temporal merge candidate is derived and LX is set to L1 when the L1 reference index of the temporal merge candidate is derived. However, when the slice_type slice_type is P-slice, since the inter-prediction mode includes L0 prediction (Pred_L0) only and does not include L1 prediction (Pred_L1) and bi-prediction (Pred_BI), processes associated with L1 can be omitted.

When the flag predFlagLX[xA][yA] indicating whether or not to perform LX prediction of the prediction block A is not 0 (step S2113: YES), the LX reference index refIdxLX-Col of the temporal merge candidate is set to the same value as the value of the LX reference index refIdxLX[xA][yA] of the prediction block A (step S2114). Here, xA and yA are indice indicating the position of a pixel at the top-left corner of the prediction block A in the picture.

In the present embodiment, in the prediction block N (N=A, B), when the prediction block N is outside the coding/decoding target slice and cannot be used, when the prediction block N is later than the coding/decoding target prediction block in the coding/decoding order and cannot be used if it is coded/decoded, or when the prediction mode PredMode of the prediction block N is intra-prediction (MODE_INTRA), both the flag predFlagL0[xN][yN] indicating whether or not to use L0 prediction and the flag predFlagL1[xN][yN] indicating whether or not to use L1 prediction of the prediction block N are 0. Here, xN and yN are indice indicating the position of a pixel at the top-right corner of the prediction block N in the picture. When the prediction mode PredMode of the prediction block N is inter-prediction (MODE_INTER) and the inter-prediction mode is L0 prediction (Pred_L0), the flag predFlagL0[xN][yN] indicating whether or not to use L0 prediction of the prediction block N is 1 and the flag predFlagL1[xN][yN] indicating whether or not to use L1 prediction is 0. When the inter-prediction mode of the prediction block N is L1 prediction (Pred_L1), the flag predFlagL0[xN][yN] indicating whether or not to use L0 prediction of the prediction block N is 0 and the flag predFlagL1[xN][yN] indicating whether or not to use L1 prediction is 1. When the inter-prediction mode of the prediction block N is bi-prediction (Pred_BI), both the flag predFlagL0[xN][yN] indicating whether or not to use L0 prediction of the prediction block N and the flag predFlagL1[xN][yN] indicating whether or not to use L1 prediction are 1.

When the flag predFlagLX[xA][yA] indicating whether or not to perform LX prediction of the prediction block A is 0 (step S2113: NO), the LX reference index refIdxLXCol of the temporal merge candidate is set to the default value 0 (step S2115).

The processes of steps S2113 to S2115 are performed for each of L0 and L1 (steps S2112 to S2116), and the reference index deriving process ends.

On the other hand, when the partition index PartIdx is not 0 (step S2104: NO), the subsequent process of step S2121 is performed for each of L0 and L1 (steps S2118 to S2122). LX is set to L0 when the L0 reference index of the temporal merge candidate is to be derived, and LX is set to L1 when the L1 reference index is to be derived. However, when the slice_type slice_type is P-slice, since the inter-prediction mode includes L0 prediction (Pred_L0) only and does not include L1 prediction (Pred_L1) and bi-prediction (Pred_BI), the processes associated with L1 can be omitted.

The LX reference index refIdxLXCol of the temporal merge candidate is set to the default value 0 (step S2121).

The processes up to step S2121 are performed for each of L0 and L1 (steps S2118 to S2122), and the reference index deriving process ends.

In the present embodiment, although whether or not to refer to the prediction block neighboring to the left side of the deriving target prediction block is switched, whether or not to refer to the prediction block neighboring to the upper side may be switched instead of the prediction block neighboring to the left side.

Figure 19:
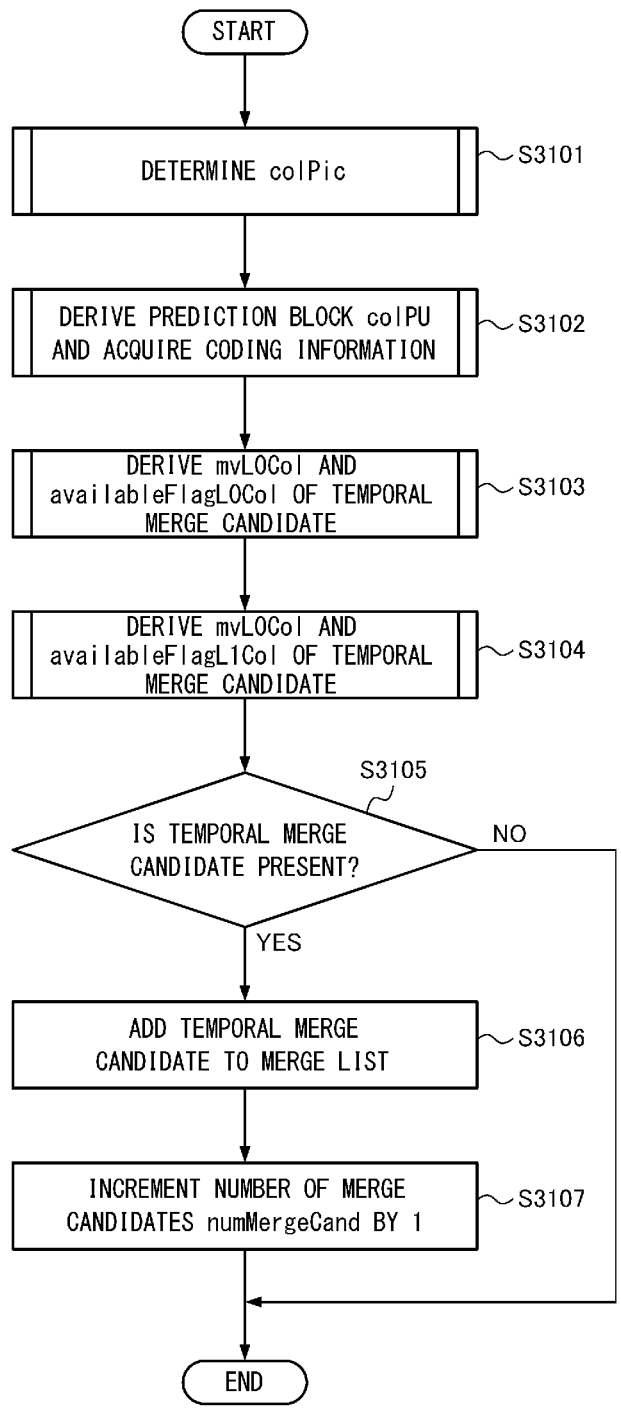
FIG. 19 is a flowchart for describing the flow of a process of deriving temporal merge candidates of a merge mode.

Next, a method of deriving merge candidates of different time in step S103 of FIG. 15 will be described in detail. FIG. 19 is a flowchart for describing the flow of a temporal merge candidate deriving process of step S103 of FIG. 15.

First, a picture colPic of different time is derived using a flag collocated_from_l0_flag indicating whether the picture colPic of different time used when deriving the slice_type slice_type described in the slice header in respective slices and a motion vector predictor candidate in a temporal direction, or a merge candidate uses a reference picture added to any one of the L0 reference list or L1 reference list of a picture in which the processing target prediction block is included (step S3101).

Figure 20:
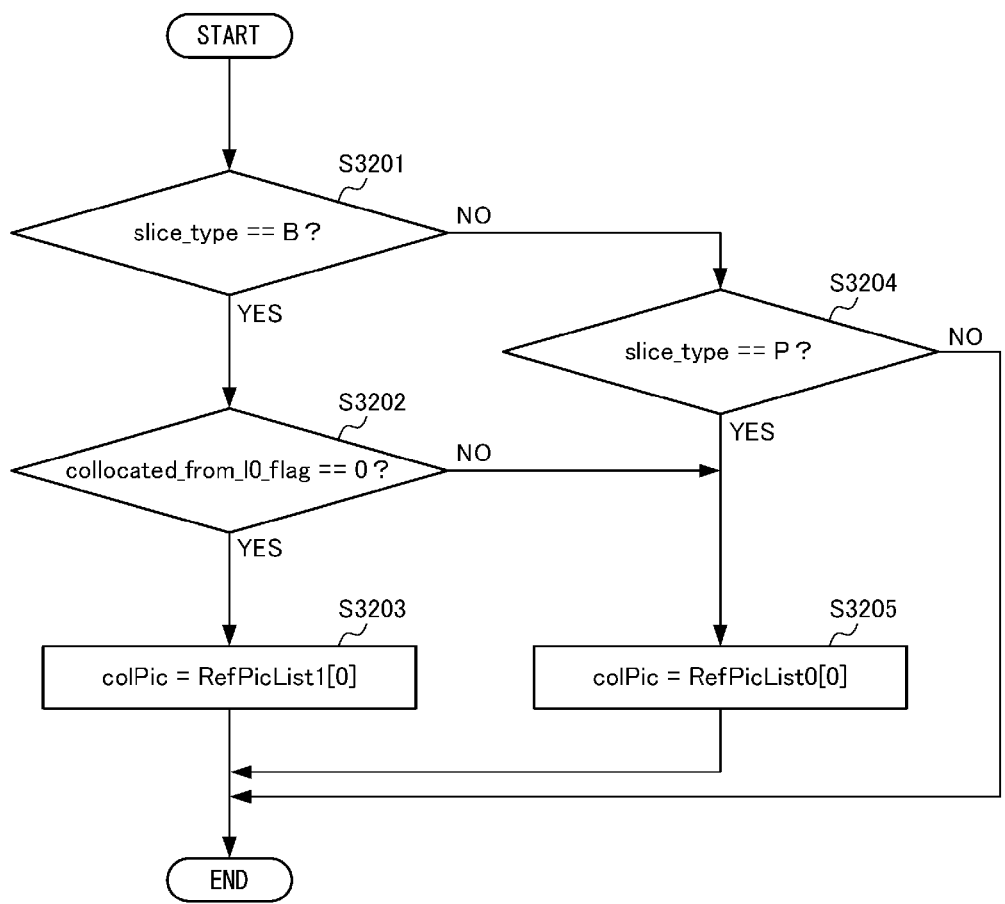
FIG. 20 is a flowchart for describing the flow of a process of deriving pictures of different time of a merge mode.

FIG. 20 is a flowchart for describing the flow of a process of deriving the picture colPic of different time in step S3101 of FIG. 19. When the slice_type slice_type is B-slice and the flag collocated_from_l0_flag is 0 (step S3201: YES, step S3202: YES), a picture of which the RefPicList1[0] (that is, the reference index of a reference list L1) is 0 becomes the picture colPic of different time (step S3203). In other cases, that is, when the slice_type slice_type is B-slice and the flag collocated_from_l0_flag is 1 (step S3201: YES, step S3202: NO), or when the slice_type slice_type is P-slice (step S3201: NO, step S3204: YES), a picture of which the RefPicList0[0] (that is, the reference index of the reference list L0) is 0 becomes the picture colPic of different time (step S3205).

Subsequently, the flow returns to the flowchart of FIG. 19, a prediction block colPU of different time is derived, and coding information is acquired (step S3102).

Figure 21:
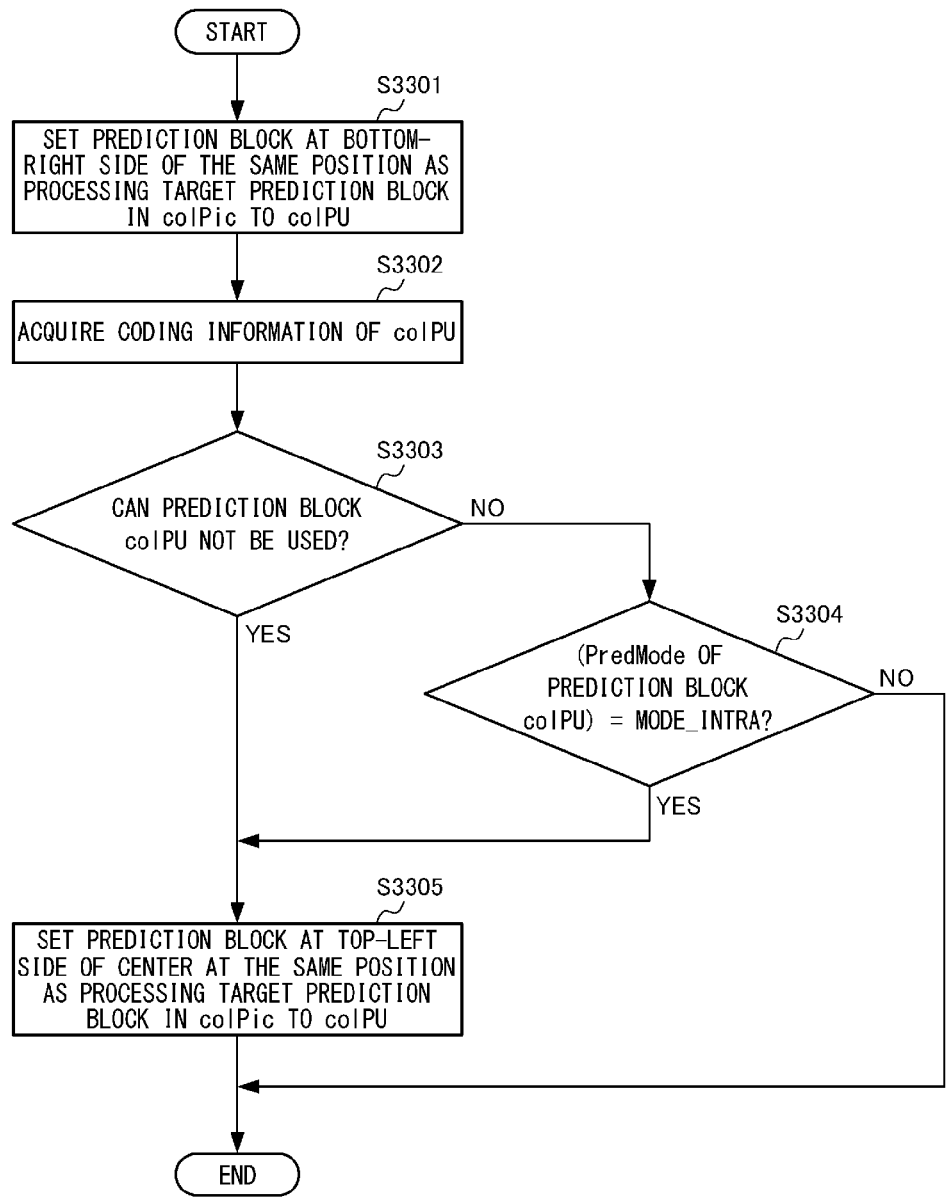
FIG. 21 is a flowchart for describing the flow of a process of deriving prediction blocks of pictures of different time of a merge mode.

FIG. 21 is a flowchart for describing the flow of a process of deriving a prediction block colPU of the picture colPic of different time in step S3102 of FIG. 19.

First, a prediction block positioned on the bottom-right corner (outside) of the same position as the processing target prediction block in the picture colPic of different time is set as the prediction block colPU of different time (step S3301). This prediction block corresponds to the prediction block T0 illustrated in FIG. 9.

Subsequently, the coding information of the prediction block colPU of different time is acquired (step S3302). When PredMode of the prediction block colPU of different time cannot be used or the prediction mode PredMode of the prediction block colPU of different time is intra-prediction (MODE_INTRA) (step S3303: YES, step S3304: YES), a prediction block positioned at the top-left corner of the center of the same position as the processing target prediction block in the picture colPic of different time is set as the prediction block colPU of different time (step S3305). This prediction block corresponds to the prediction block T1 illustrated in FIG. 9.

Next, the flow returns to the flowchart of FIG. 19, a flag availableFlagL0Col indicating whether the L0 motion vector predictor mvL0Col and the temporal merge candidate Col derived from the prediction block of a different picture at the same position as the coding/decoding target prediction block are valid is derived (step S3103), and a flag availableFlagL1Col indicating whether the L1 motion vector predictor mvL0Col and the temporal merge candidate Col are valid is derived (step S3104). Further, when the flag availableFlagL0Col or the flag availableFlagL1Col is 1, the flag availableFlagCol indicating whether the temporal merge candidate Col is valid is set to 1.

Figure 22:
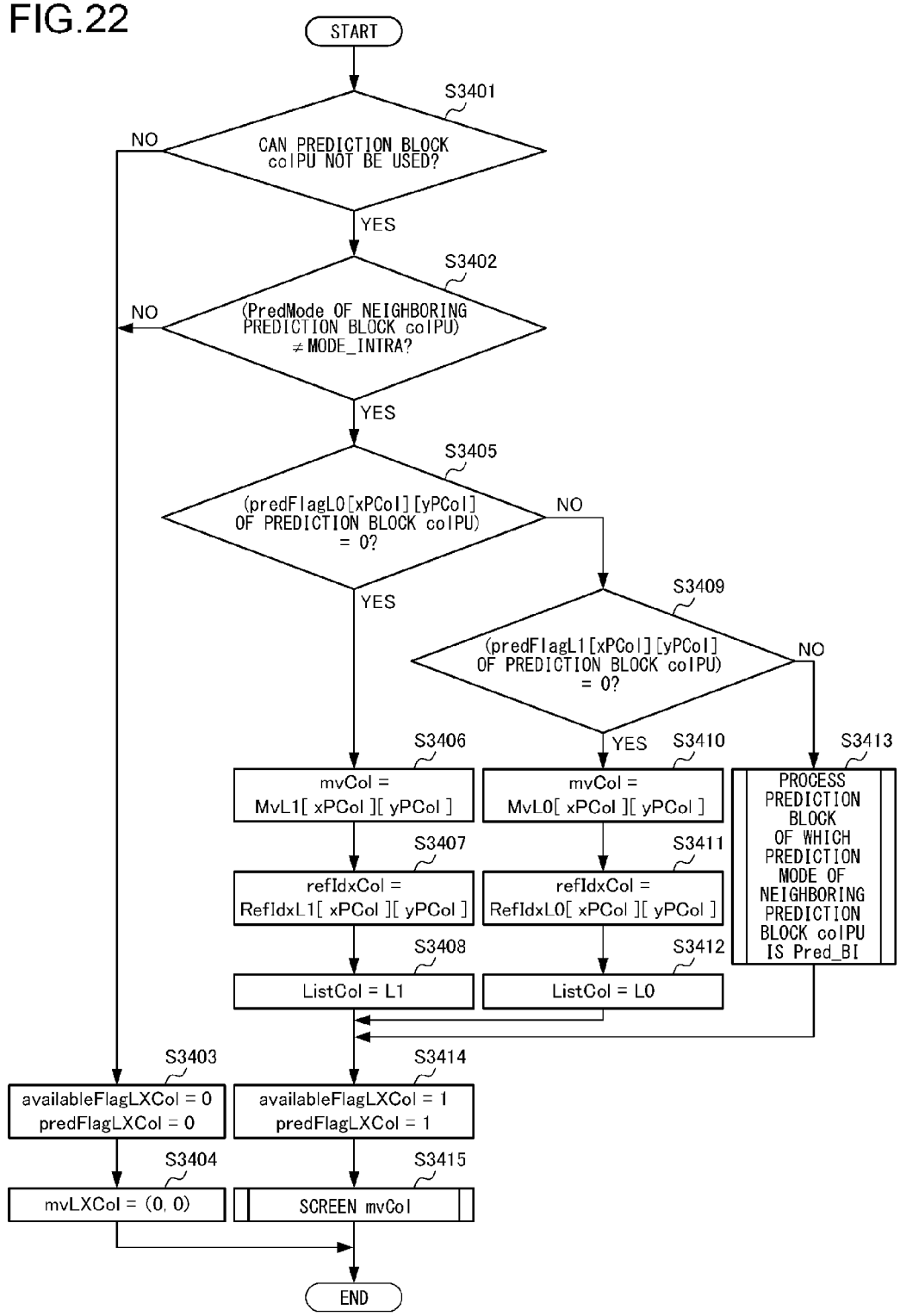
FIG. 22 is a flowchart for describing the flow of a process of deriving temporal merge candidates of a merge mode.

FIG. 22 is a flowchart for describing the flow of the process of deriving inter-prediction information of temporal merge candidates in steps S3103 and S3104 of FIG. 19. The temporal merge candidate deriving target list L0 or L1 is referred to as LX and prediction using LX is referred to as LX prediction. The same is true for the following description unless otherwise set forth below. LX is L0 when step S3103 which is the deriving process of the list L0 of the temporal merge candidate is invoked, and LX is L1 when step S3104 which is the deriving process of the list L1 of the temporal merge candidate is invoked.

When the prediction mode PredMode of the prediction block colPU of different time is intra-prediction (MODE_INTRA) or cannot be used (step S3401: NO, step S3402: NO), it is assumed that temporal merge candidates are not present. Both the flag availableFlagLXCol and the flag predFlagLXCol are set to 0 (step S3403), the motion vector mvLXCol is set to (0, 0) (step S3404), and the process of deriving inter-prediction information of temporal merge candidates ends.

When the prediction block colPU can be used and the prediction mode PredMode is not intra-prediction (MODE_INTRA) (step S3401: YES, step S3402: YES), mvCol, refIdxCol, and availableFlagCol are derived in the following flow.

When the flag PredFlagL0[xPCol][yPCol] indicating whether L0 prediction of the colPU is used is 0 (step S3405: YES), since the prediction mode of the prediction block colPU is Pred_L1, the motion vector mvCol is set to the same value as MvL1[xPCol][yPCol] which is the L1 motion vector of the prediction block colPU (step S3406), the reference index refIdxCol is set to the same value as the L1 reference index RefIdxL1[xPCol][yPCol] (step S3407), and the list ListCol is set to L1 (step S3408). Here, xPCol and yPCol are indice indicating the position of a pixel at the top-left corner of the prediction block colPU in the picture colPic of different time.

On the other hand, when the L0 prediction flag PredFlagL0[xPCol][yPCol] of the prediction block colPU is not 0 (step S3405 of FIG. 22: NO), it is determined whether the L1 prediction flag PredFlagL1[xPCol][yPCol] of the prediction block colPU is 0. When the L1 prediction flag PredFlagL1[xPCol][yPCol] of the prediction block colPU is 0 (step S3409: YES), the motion vector mvCol is set to the same value as MvL0[xPCol][yPCol] which is the L0 motion vector of the prediction block colPU (step S3410), the reference index refIdxCol is set to the same value as the L0 reference index RefIdxL0[xPCol][yPCol] (step S3411), and the list ListCol is set to L0 (step S3412).

When both the L0 prediction flag PredFlagL0[xPCol][yPCol] of the prediction block colPU and the L1 prediction flag PredFlagL1[xPCol][yPCol] of the prediction block colPU are not 0 (step S3405: NO, step S3409: NO), since the inter-prediction mode of the prediction block colPU is bi-prediction (Pred_BI), one of the two L0 and L1 motion vectors is selected (step S3413).

Figure 23:
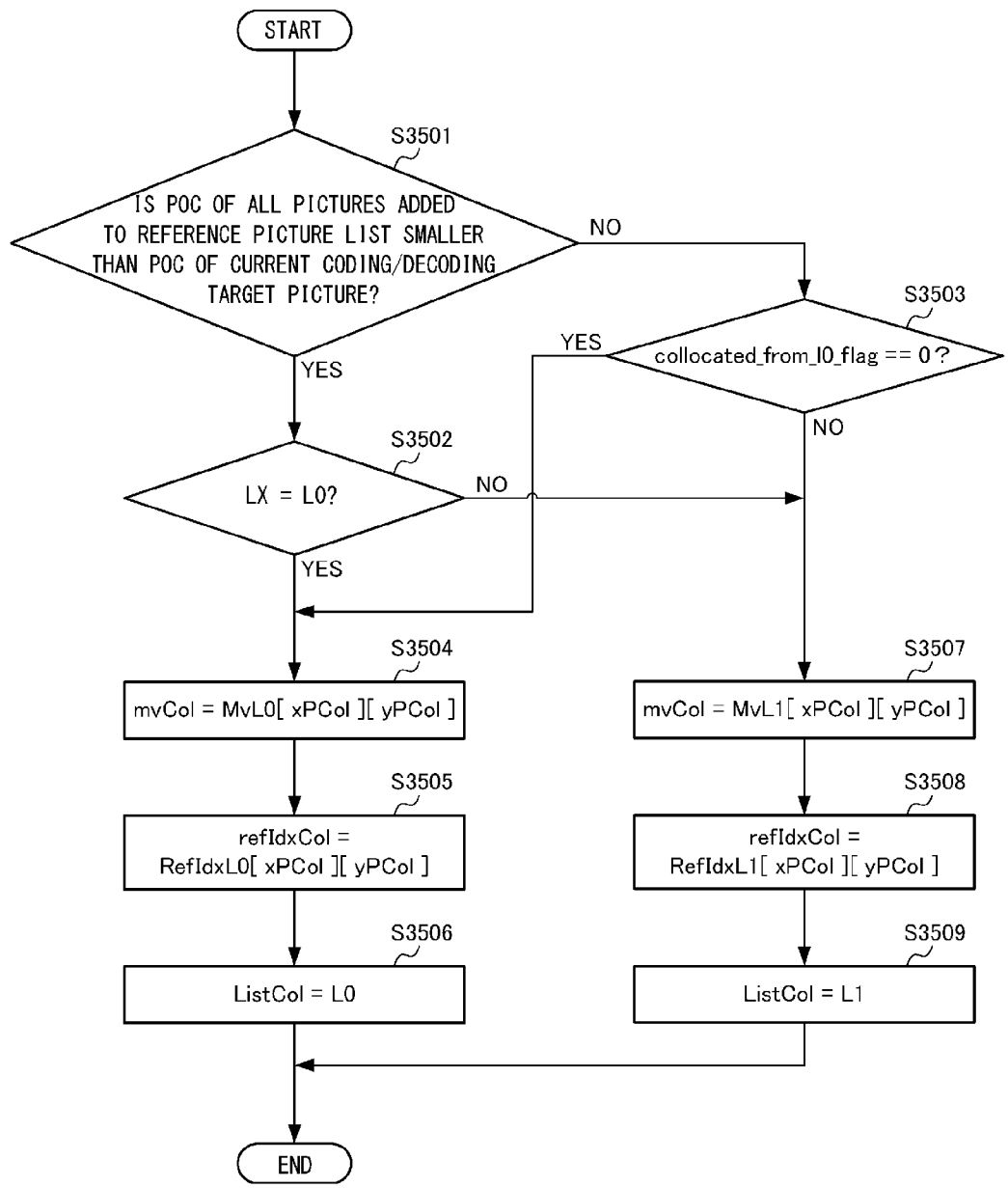
FIG. 23 is a flowchart for describing the flow of a process of deriving temporal merge candidates of a merge mode.

FIG. 23 is a flowchart illustrating the flow of the process of deriving inter-prediction information of temporal merge candidates when the inter-prediction mode of the prediction block colPU is bi-prediction (Pred_BI).

First, it is determined whether the POCs of all pictures added to all reference lists are smaller than the POC of the current coding/decoding target picture (step S3501). When the POCs of all pictures added to all reference lists L0 and L1 of the prediction block colPU are smaller than the POC of the current coding/decoding target picture (step S3501: YES) and when LX is L0 (that is, the vector predictor candidates of the L0 motion vector of the coding/decoding target picture have been derived) (step S3502: YES), the inter-prediction information of the list L0 of the prediction block colPU is selected. In this case, when LX is L1 (that is, the vector predictor candidates of the L1 motion vector of the coding/decoding target picture have been derived) (step S3502: NO), the inter-prediction information of the list L1 of the prediction block colPU is selected. On the other hand, when at least one of the POCs of the pictures added to all reference lists L0 and L1 of the prediction block colPU is larger than the POC of the current coding/decoding target picture (step S3501: NO) and when the flag collocated_from_l0_flag is 0 (step S3503: YES), the inter-prediction information of the list L0 of the prediction block colPU is selected. In this case, when the flag collocated_from_l0_flag is 1 (step S3503: NO), the inter-prediction information of the list L1 of the prediction block colPU is selected.

When the inter-prediction information of the list L0 of the prediction block colPU is selected (step 3502: YES, step S3503: YES), the motion vector mvCol is set to the same value as MvL0[xPCol][yPCol] (step S3504), the reference index refIdxCol is set to the same value as RefIdxL0[xPCol][yPCol] (step S3505), and the list ListCol is set to L0 (step S3506).

When the inter-prediction information of the list L1 of the prediction block colPU is selected (step S3502: NO, step S3503: NO), the motion vector mvCol is set to the same value as MvL1[xPCol][yPCol] (step S3507), the reference index refIdxCol is set to the same value as RefIdxL1[xPCol][yPCol] (step S3508), and the list ListCol is set to L1 (step S3509).

Returning to FIG. 22, if inter-prediction information can be acquired from the prediction block colPU, both the flag availableFlagLXCol and the flag predFlagLXCol are set to 1 (step S3414).

Subsequently, the motion vector mvCol is scaled to obtain the LX motion vector mvLXCol of the temporal merge candidate (step S3415). The flow of this motion vector scaling process will be described with reference to FIGS. 24 and 25.

Figure 24:
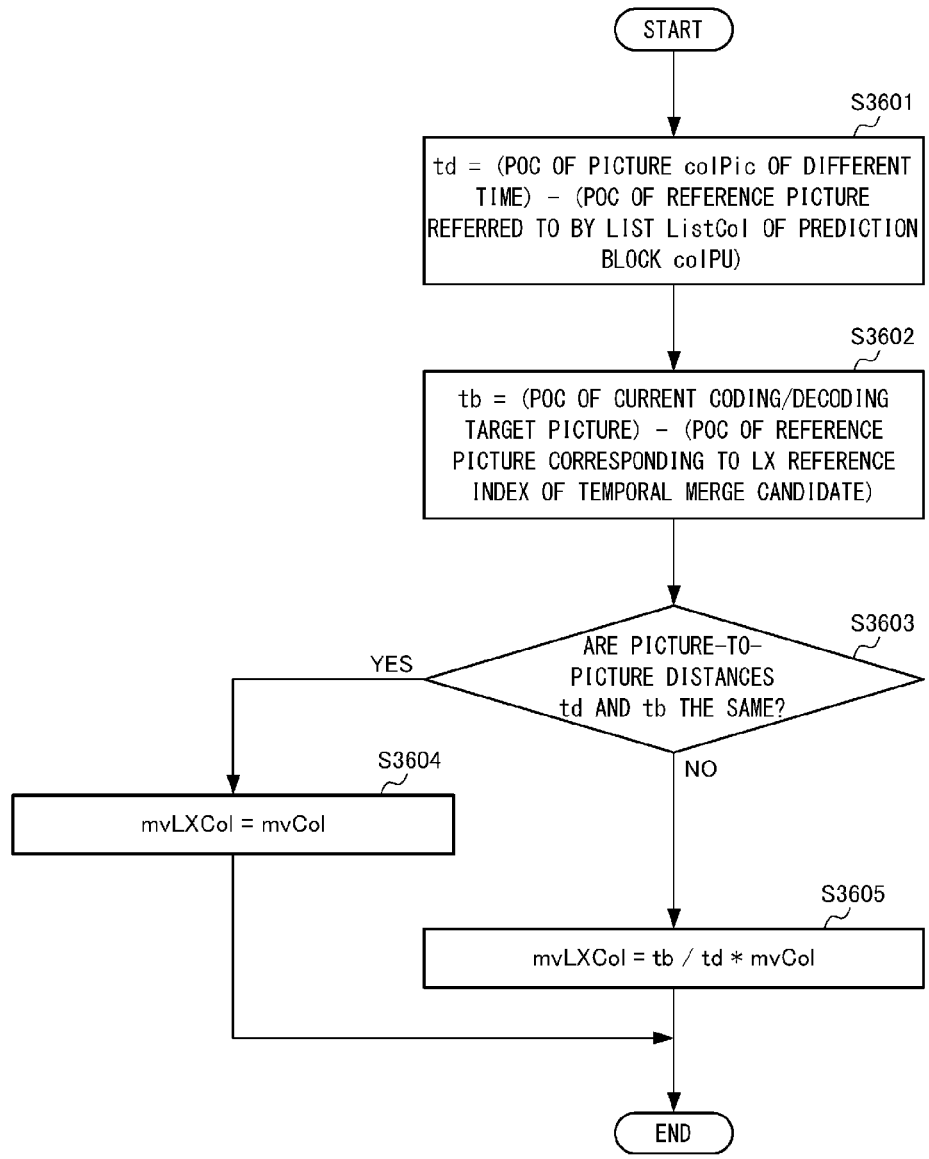
FIG. 24 is a flowchart for describing the flow of a motion vector scaling process.

FIG. 24 is a flowchart illustrating the flow of the motion vector scaling process of step S3415 of FIG. 22.

The POC of the reference picture corresponding to the reference index refIdxCol referred to by the list ListCol of the prediction block colPU is subtracted from the POC of the picture colPic of different time to derive the picture-to-picture distance td (step S3601). When the POC of the reference picture referred to by the list ListCol of the prediction block colPU is earlier in the display order than the picture colPic of different time, the picture-to-picture distance td has a positive value. When the POC of the reference picture referred to by the list ListCol of the prediction block colPU is later in the display order than the picture colPic of different time, the picture-to-picture distance td has a negative value.

$$td=(POC \text{ of Picture colPic of different time})-(POC \text{ of Reference picture referred to by List ListCol of Prediction block col}PU)$$

The POC of the reference picture corresponding to the LX reference index of the temporal merge candidate derived in step S102 of FIG. 15 is subtracted from the POC of the current coding/decoding target picture to derive the picture-to-picture distance tb (step S3602). When the reference picture referred to by the list LX of the current coding/decoding target picture is earlier in the display order than the current coding/decoding target picture, the picture-to-picture distance tb has a positive value. When the reference picture referred to by the list LX of the current coding/decoding target picture is later in the display order than the current coding/decoding target picture, the picture-to-picture distance tb has a negative value.

$$tb=(POC \text{ of Current coding/decoding target picture})-(POC \text{ of Reference picture corresponding to } LX \text{ reference index of Temporal merge candidate})$$

Subsequently, the picture-to-picture distances td and tb are compared (step S3603). When the picture-to-picture distances td and tb are the same (step S3603: YES), the LX motion vector mvLXCol of the temporal merge candidate is set to the same value as the motion vector mvCol (step S3604), and the scaling process ends.

$$mvLXCol=mvCol$$

On the other hand, when the picture-to-picture distances td and tb are not the same (step S3603: NO), mvCol is multiplied by a scaling factor tb/td according to the following expression to perform the scaling process (step S3605) to obtain the scaled LX motion vector mvLXCol of the temporal merge candidate.

$$mvLXCol=tb/td*mvCol$$

Figure 25:
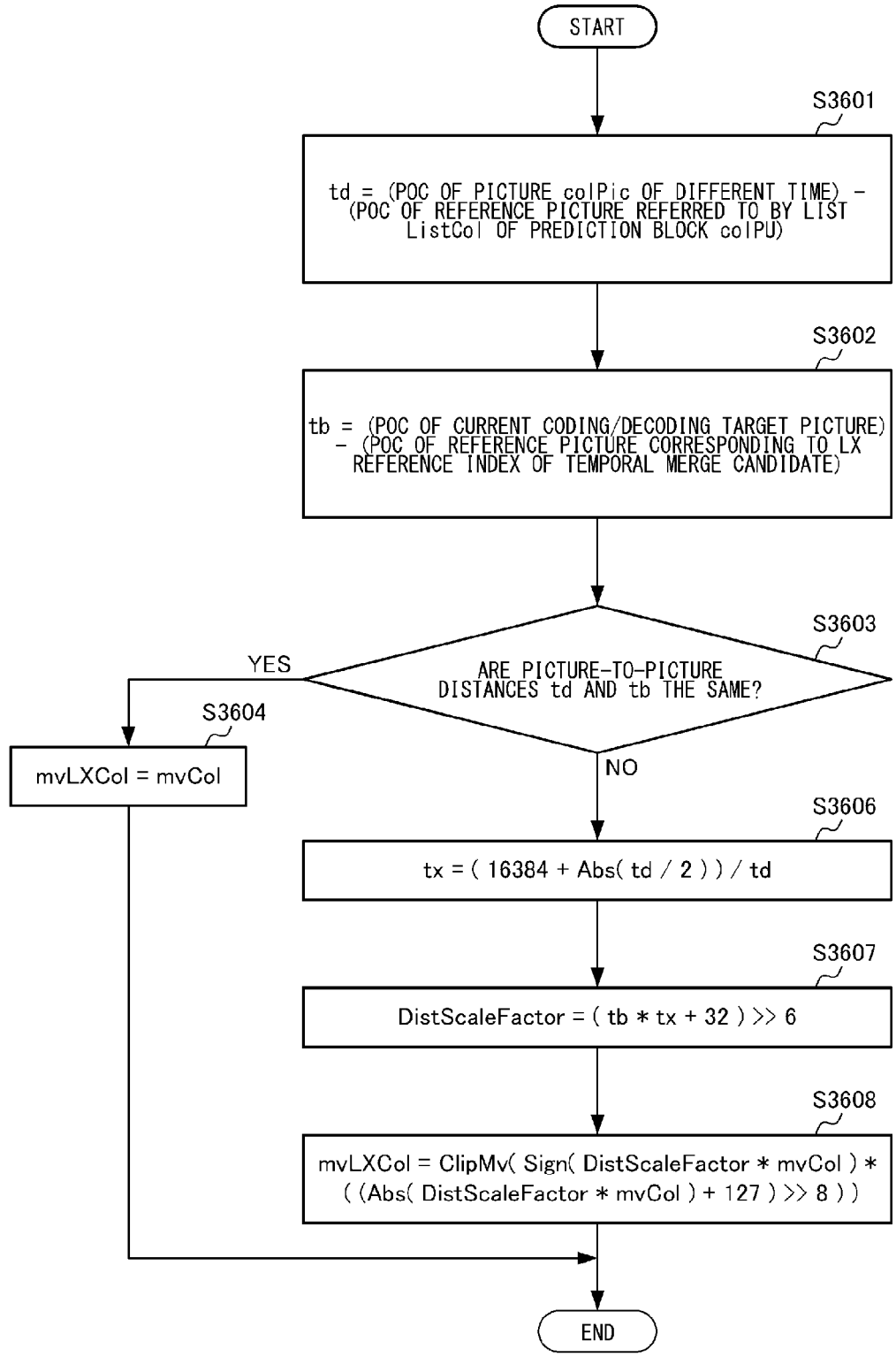
FIG. 25 is a flowchart for describing the flow of a motion vector scaling process.

FIG. 25 illustrates an example in which the scaling process of step S3605 is performed with integer-level accuracy. The processes of steps S3606 to S3608 of FIG. 25 correspond to the process of step S3605 of FIG. 24.

First, similarly to the flowchart of FIG. 24, the picture-to-picture distance td and the picture-to-picture distance tb are derived (steps S3601 and S3602).

Subsequently, the picture-to-picture distances td and tb are compared (step S3603). When the picture-to-picture distances td and tb are the same (step S3603: YES), similarly to the flowchart of FIG. 24, the LX motion vector mvLXCol of the temporal merge candidate is set to the same value as the motion vector mvCol (step S3604), and the scaling process ends.

$$mvLXCol=mvCol$$

On the other hand, when the picture-to-picture distances td and tb are not the same (step S3603: NO), a variable tx is derived according to the following expression (step S3606).

$$tx=(16384+Abs(td/2))/td$$

Subsequently, a scaling factor DistScaleFactor is derived according to the following expression (step S3607).

$$DistScaleFactor=(tb*tx+32)>>6$$

Subsequently, a scaled LX motion vector mvLXCol of the temporal merge candidate is obtained according to the following expression (step S3608).

$$mvLXCol=ClipMv(Sign(DistScaleFactor*mvCol)*\\((Abs(DistScaleFactor*mvCol)+127)>>8))$$

Subsequently, returning to the flowchart of FIG. 19, when a temporal merge candidate is present (step S3105: YES), the temporal merge candidate is added to the position at which the merge index of the merge candidate list mergeCandList has the same value as numMergeCand (step S3106), the number of merge candidates numMergeCand is incremented by 1 (step S3107), and the temporal merge candidate deriving process ends. On the other hand, when the temporal merge candidate is not present (step S3105: NO), steps S3106 and S3107 are skipped and the temporal merge candidate deriving process ends.

Figure 26:
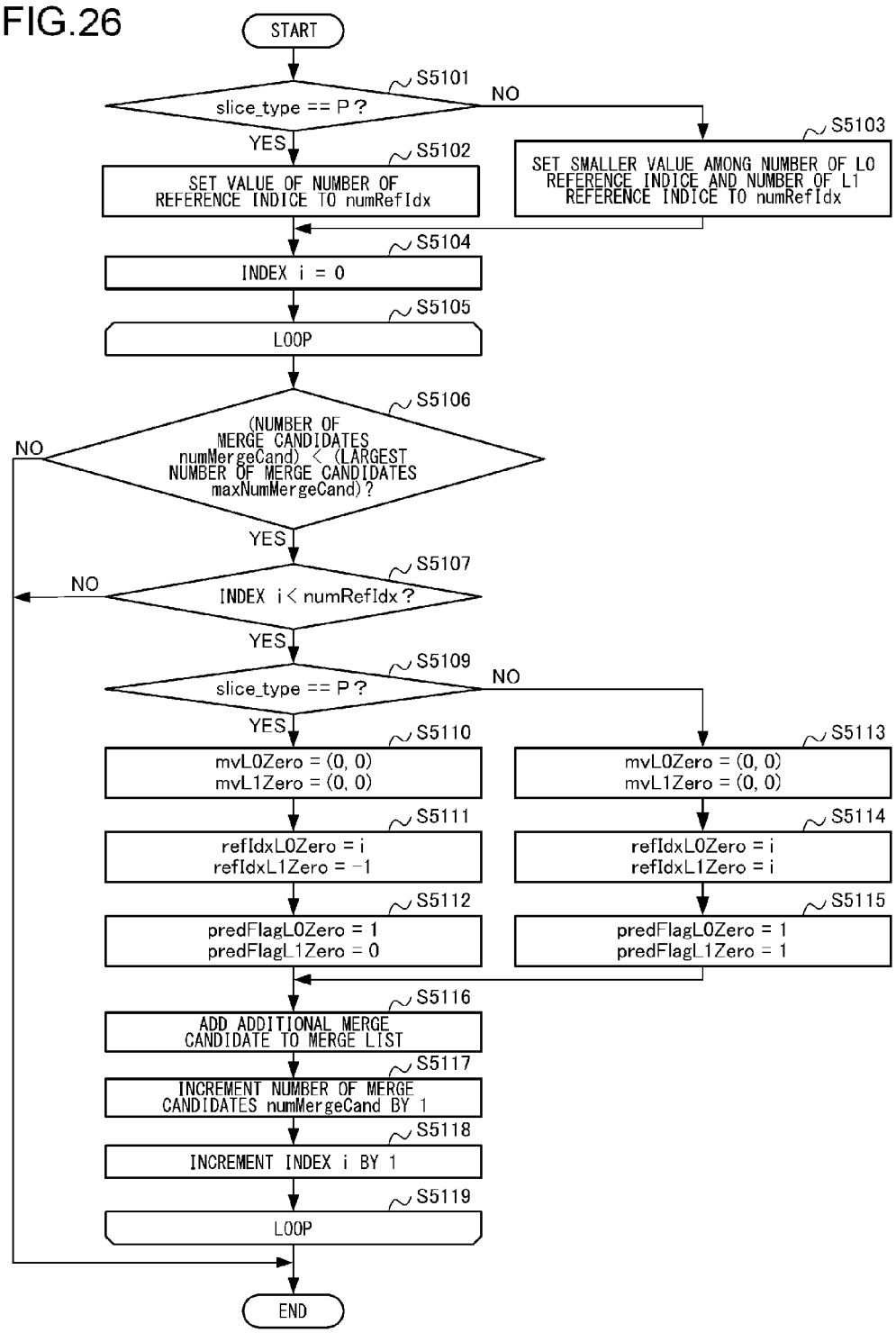
FIG. 26 is a flowchart for describing the flow of a process of deriving additional merge candidates of a merge mode.

Next, a method of deriving additional merge candidates which is the process of step S104 of FIG. 15, performed by the additional merge candidate deriving unit 134 of FIG. 12 and the additional merge candidate deriving unit 234 of FIG. 13 will be described in detail. FIG. 26 is a flowchart for describing the flow of the additional merge candidate deriving process of step S104 of FIG. 15.

In the additional merge candidate deriving process performed by the additional merge candidate deriving unit 134 of FIG. 12 and the additional merge candidate deriving unit 234 of FIG. 13, a plurality of merge candidates having different values of inter-prediction information is derived and added to the merge candidate list in order to broaden the choices for merge candidates to improve the coding efficiency. In particular, in the additional merge candidate deriving process of FIG. 26, the values of the prediction mode and the motion vector are fixed, and a plurality of merge candidates having different values of reference indice is derived and added to the merge candidate list (steps S5101 to S5119 of FIG. 26).

First, when the slice type is P-slice (step S5101 of FIG. 26: YES), the value of the number of L0 reference indice is set to a variable numRefIdx indicating the number of reference indice (step S5102 of FIG. 26). On the other hand, when the slice type is no P-slice (step S5101 of FIG. 26: NO) (that is, when the slice type is B-slice), the smaller value among the number of L0 reference indice and the number of L1 reference indice is set to the variable numRefIdx indicating the number of reference indice (step S5103 of FIG. 26). Subsequently, 0 is set to the reference index i (step S5104 of FIG. 26).

Subsequently, an additional merge candidate of which the value of the motion vector of the prediction mode corresponding to the slice type is (0, 0) is derived while changing the reference index i and added to the merge candidate list (steps S5105 to S5119 of FIG. 26).

First, when the number of merge candidates numMergeCand is smaller than the largest number of merge candidates maxNumMergeCand (step S5106 of FIG. 26: YES), the flow proceeds to step S5107. When the number of merge candidates numMergeCand is not smaller than the largest number of merge candidates maxNumMergeCand (step S5106 of FIG. 26: NO), the additional merge candidate deriving process ends. Subsequently, when the reference index i is smaller than the variable numRefIdx (step S5107 of FIG. 26: YES), the flow proceeds to step S5109. When the reference index i is not smaller than the variable numRefIdx (step S5107 of FIG. 26: NO), the additional merge candidate deriving process ends.

Subsequently, when the slice type is P-slice (step S5109 of FIG. 26: YES), (0, 0) is set to the motion vectors mvL0Zero and mvL1Zero of the additional merge candidates (step S5110 of FIG. 26), the value of the reference index i and −1 are set to the reference indice refIdxL0Zero and refIdxL1Zero of the additional merge candidates, respectively (step S5111 of FIG. 26), and 1 and 0 are set to the flags predFlagL0Zero and predFlagL1Zero of the additional merge candidates, respectively (step S5112 of FIG. 26). Then, the flow proceeds to step S5116.

On the other hand, when the slice type is not P-slice (step S5109 of FIG. 26: NO) (that is, when the slice type is B-slice), (0, 0) is set to the motion vectors mvL0Zero and mvL1Zero (step S5113 of FIG. 26), the value of the reference index i is set to the reference indice refIdxL0Zero and refIdxL1Zero of the additional merge candidates (step S5114 of FIG. 26), and 1 is set to the flags predFlagL0Zero and predFlagL1Zero of the additional merge candidates (step S5115 of FIG. 26). Then, the flow proceeds to step S5116.

Subsequently, the additional merge candidate is added to the position at which the merge index of the merge candidate list mergeCandList is indicated by the same value as numMergeCand (step S5116 of FIG. 26), and the number of merge candidates numMergeCand is incremented by 1 (step S5117 of FIG. 26). Subsequently, the index i is incremented by 1 (step S5118 of FIG. 26), and the flow proceeds to step S5119.

The processes of steps S5106 to S5118 are repeatedly performed for respective reference indice i (steps S5105 to S5119 of FIG. 26).

In FIG. 26, although the values of the prediction mode and the motion vector are fixed and a plurality of merge candidates having different values of reference indice is derived and added to the merge candidate list, a plurality of merge candidates of different prediction modes may be derived and added to the merge candidate list, and merge candidates having different values of motion vectors may be derived and added to the merge candidate list. When the value of the motion vector is changed, merge candidates may be added while changing the value of the motion vector in the order of (0, 0), (1, 0), (−1, 0), (0, 1), and (0,−1), for example.

Figure 37:
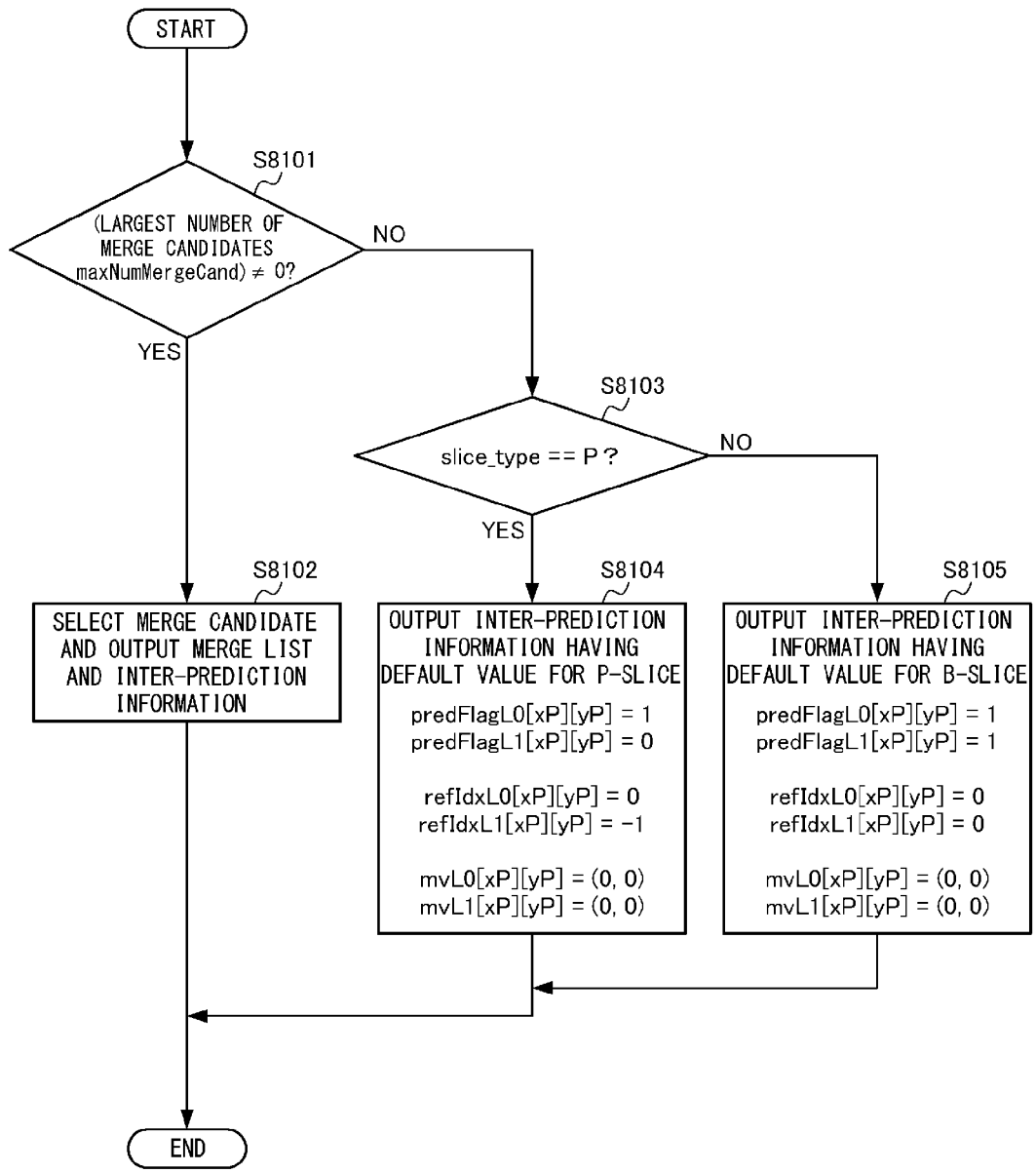
FIG. 37 is a flowchart for describing the flow of the process of an inter-prediction information selecting unit of an inter-prediction information deriving unit of a moving picture coding device.

Next, the inter-prediction information selecting unit 137 of the inter-prediction information deriving unit 104 of the moving picture coding device will be described. FIG. 37 is a flowchart for describing the flow of the process of the inter-prediction information selecting unit 137 of the inter-prediction information deriving unit 104 of the moving picture coding device. In FIG. 12 of the first practical example, in the inter-prediction information selecting unit 137 of the inter-prediction information deriving unit 104 of the moving picture coding device, when the number of merge candidates numMergeCand is larger than 0 (step S8101 of FIG. 37: YES), a merge candidate is selected among valid merge candidates which are added to the merge candidate list and of which the merge index is within the range of 0 to (numMergeCand−1), the inter-prediction information including the flags predFlagL0[xP][yP] and predFlagL1[xP][yP] indicating whether or not to use the L0 prediction and L1 prediction of the respective prediction blocks of the selected merge candidate, the reference indice refIdxL0[xP][yP] and refIdxL1[xP][yP], and the motion vectors mvL0[xP][yP] and mvL1[xP][yP] are supplied to the motion-compensated prediction unit 105, and the merge index for identifying the selected merge candidate is supplied to the prediction method determining unit 107 (step S8102 of FIG. 37). When the value of the merge index mergeIdx is smaller than the value of the number of merge candidates numMergeIdx, the merge index mergeIdx indicates a valid merge candidate added to the merge candidate list mergeCandList. When the value of the merge index mergeIdx is larger than or equal to the value of the number of merge candidates numMergeIdx, the merge index mergeIdx indicates an invalid merge candidate that is not added to the merge candidate list mergeCandList. By applying rules described later to the coder side, even when the merge index mergeIdx indicates an invalid merge candidate, it is possible to select a valid merge candidate.

When merge candidates are selected, the same method as that used by the prediction method determining unit 107 can be used. Coding information, a coding amount of a residual signal, and a coding distortion between a prediction picture signal and a picture signal are derived for respective merge candidates and a merge candidate having the smallest coding amount and coding distortion is determined. The syntax element merge_idx of the merge index, which is the coding information of the merge mode is entropy-coded for respective merge candidates to derive a coding amount of the coding information. Further, a coding amount of a prediction residual signal obtained by coding a prediction residual signal between a prediction picture signal obtained by performing motion compensation using the inter-prediction information of the merge candidates according to the same method as the motion-compensated prediction unit 105 for respective merge candidates and a picture signal of a coding target supplied from the picture memory 101 is derived. A total occurrence coding amount obtained by adding a coding amount of the coding information (that is, the merge index) and a coding amount of the prediction residual signal is derived and used as an evaluation value.

Moreover, after such a prediction residual signal is coded, the prediction residual signal is decoded for evaluation of a distortion amount, and a coding distortion is derived as a ratio representing an error from an original picture signal resulting from coding. The total occurrence coding amount and the coding distortion are compared for respective merge candidates, whereby the coding information having the smaller occurrence coding amount and coding distortion is determined. The merge index corresponding to the determined coding information is coded as a flag merge_idx represented by a second syntax pattern of prediction block units.

The occurrence coding amount derived herein is preferably obtained by simulating the coding process but may be obtained by approximation or estimation.

On the other hand, when the number of merge candidates numMergeCand is 0 (step S8102 of FIG. 37: NO), the inter-prediction information having the default value corresponding to the predetermined slice type is supplied to the motion-compensated prediction unit 105 (steps S8103 to S8105). When the slice type is P-slice (step S8103 of FIG. 37: YES), the default value of the inter-prediction information is set such that L0 prediction (Pred_L0) is used (the values of the flags predFlagL0[xP][yP] and predFlagL1[xP][yP] are 1 and 0, respectively), the L0 reference index is 0 (the values of the reference indice refIdxL0[xP][yP] and refIdxL1[xP][yP] are 0 and −1, respectively), and the L0 vector value mvL0[xP][yP] is (0, 0) (step S8104 of FIG. 37). On the other hand, when the slice type is not P-slice (step S8103: NO), (that is, the slice type is B-slice), the default value of the inter-prediction information is set such that the inter-prediction mode is bi-prediction (Pred_BI) (both values of the flags predFlagL0[xP][yP] and predFlagL1[xP][yP] are 1), both reference indice are 0 (both values of the reference indice refIdxL0[xP][yP] and refIdxL1[xP][yP] are 0), and both the L0 and L1 vector values mvL0[xP][yP] and mvL1[xP][yP] are (0, 0) (step S8105). Regardless of the slice type, even when the slice type is B-slice, the default value of the inter-prediction information may be set such that L0 prediction (Pred_L0) is used (the values of the flags predFlagL0[xP][yP] and predFlagL1[xP][yP] are 1 and 0, respectively), the L0 reference index is 0 (the values of the reference indice refIdxL0[xP][yP] and refIdxL1[xP][yP] are 0 and −1, respectively), and the L0 vector value mvL0[xP][yP] is (0, 0).

Figure 38:
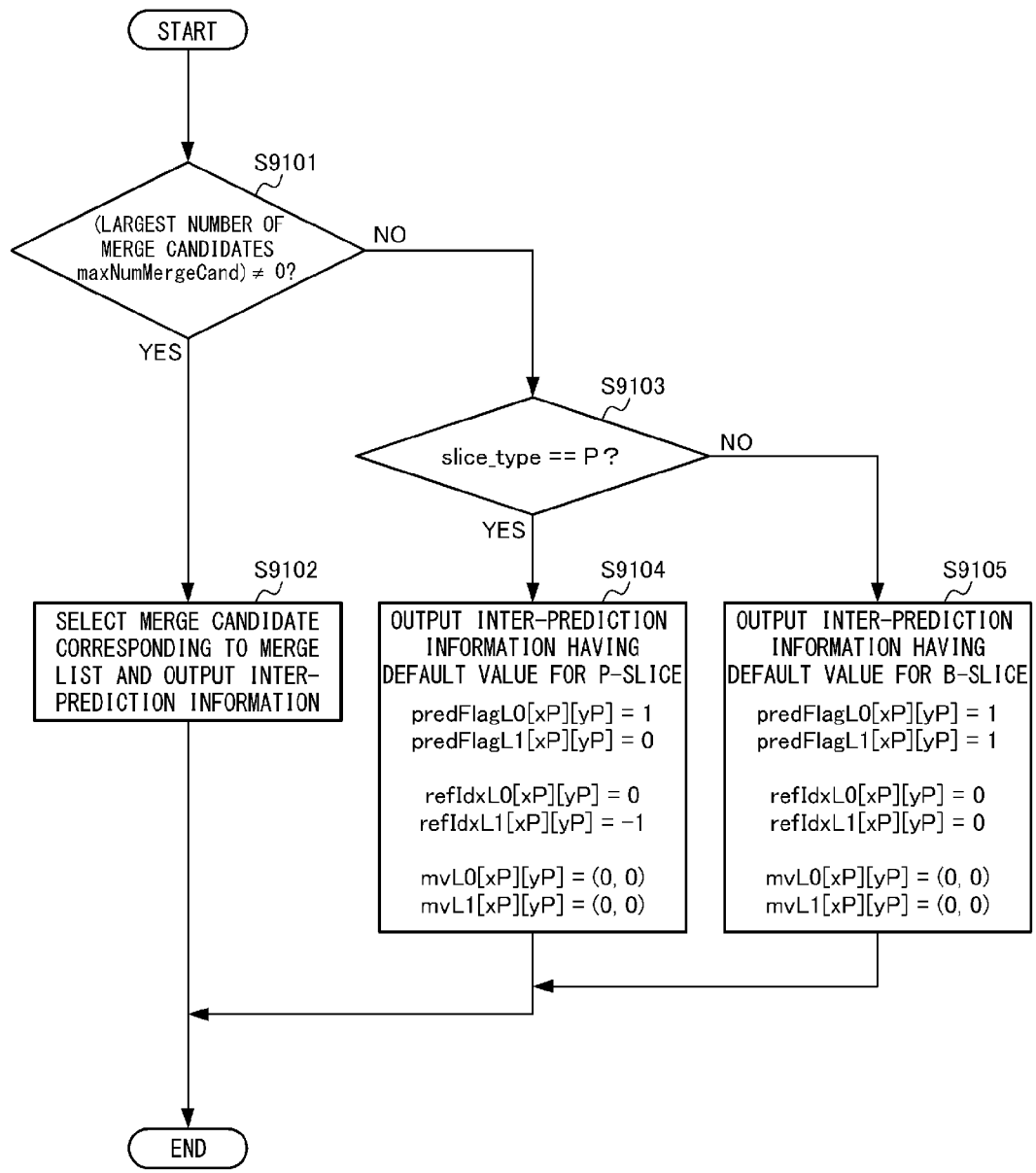
FIG. 38 is a flowchart for describing the flow of the process of an inter-prediction information selecting unit of an inter-prediction information deriving unit of a moving picture decoding device.

Next, the inter-prediction information selecting unit 237 of the inter-prediction information deriving unit 205 of the moving picture decoding device will be described. FIG. 38 is a flowchart for describing the flow of the process of the inter-prediction information selecting unit 237 of the inter-prediction information deriving unit 205 of the moving picture decoding device. In FIG. 13 of the first practical example, when the number of merge candidates numMergeCand is larger than 0 (step S9101 of FIG. 38: YES), the inter-prediction information selecting unit 237 of the inter-prediction information deriving unit 205 of the moving picture decoding device selects a merge candidate corresponding to the merge index mergeIdx supplied from the second bitstream decoder 202 among the merge candidates added to the merge candidate list mergeCandList, supplies the inter-prediction information including the flags predFlagL0[xP][yP] and predFlagL1[xP][yP] indicating whether or not to use the L0 prediction and L1 prediction of the selected merge candidate, the L0 and L1 reference indice refIdxL0[xP][yP] and refIdxL1[xP][yP], and the L0 and L1 motion vectors mvL0[xP][yP] and mvL1[xP][yP] to the motion-compensated prediction unit 206, and stores the same in the coding information storage memory 210 (step S9102 of FIG. 38).

When a merge index indicating an invalid merge candidate is coded on the coder side, an invalid merge candidate is selected on the decoder side. In this case, inter-prediction is performed using the invalid inter-prediction information and unexpected prediction signals may be obtained. Moreover, the inter-prediction mode may have a value that does not conform to the standards and the reference index may indicate a reference picture that is not present whereby an error may occur and decoding may end abnormally.

Thus, in the first practical example of the present embodiment, when the value of the supplied merge index mergeIdx is larger than or equal to the value of the number of merge candidates numMergeIdx, the value of the number of merge candidates numMergeIdx is set to the merge index mergeIdx, and then, the process is performed. When the value of the supplied merge index mergeIdx is larger than or equal to the number of merge candidates numMergeIdx, the merge index mergeIdx set on the coder side indicates an invalid merge candidate that is not added to the merge candidate list mergeCandList. By clipping the merge index mergeIdx, it is possible to obtain a merge candidate that is added last to the merge candidate list mergeCandList. By defining the clipping process on the merge index mergeIdx, it is possible to prevent the decoder from selecting an invalid merge candidate that is not added to the merge candidate list mergeCandList.

Alternatively, when the value of the supplied merge index mergeIdx is larger than or equal to the number of merge candidates numMergeIdx, by setting the inter-prediction information of the merge candidate to a predetermined value, it is possible to prevent an invalid merge candidate from being selected. The predetermined inter-prediction information of the merge candidate is set such that the prediction mode is L0 prediction, the value of the reference index is 0, and the value of the motion vector is (0, 0). In the case of B-slices, the prediction mode may be set to bi-prediction.

On the other hand, when the number of merge candidates numMergeCand is 0 (step S9102 of FIG. 38: NO), the inter-prediction information having the default value corresponding to the predetermined slice type is supplied to the motion-compensated prediction unit 206 and is stored in the coding information storage memory 210 (steps S9103 to S9105 of FIG. 38). When the slice type is P-slice (step S9103 of FIG. 38: YES), the default value of the inter-prediction information is set such that L0 prediction (Pred_L0) is used (the values of the flags predFlagL0[xP][yP] and predFlagL1[xP][yP] are 1 and 0, respectively), the L0 reference index is 0 (the values of the reference indice refIdxL0[xP][yP] and refIdxL1[xP][yP] are 0 and −1, respectively), and the L0 vector value mvL0[xP][yP] is (0, 0) (step S9104 of FIG. 38). On the other hand, when the slice type is not P-slice (step S9103 of FIG. 38: NO), (that is, the slice type is B-slice), the default value of the inter-prediction information is set such that the inter-prediction mode is bi-prediction (Pred_BI) (both values of the flags predFlagL0[xP][yP] and predFlagL1[xP][yP] are 1), both reference indice are 0 (both values of the reference indice refIdxL0[xP][yP] and refIdxL1[xP][yP] are 0), and both the L0 and L1 vector values mvL0[xP][yP] and mvL1[xP][yP] are (0, 0) (step S9105 of FIG. 38). Regardless of the slice type, even when the slice type is B-slice, the default value of the inter-prediction information may be set such that L0 prediction (Pred_L0) is used (the values of the flags predFlagL0[xP][yP] and predFlagL1[xP][yP] are 1 and 0, respectively), the L0 reference index is 0 (the values of the reference indice refIdxL0[xP][yP] and refIdxL1[xP][yP] are 0 and −1, respectively), and the L0 vector value mvL0[xP][yP] is (0, 0).

Figure 28:
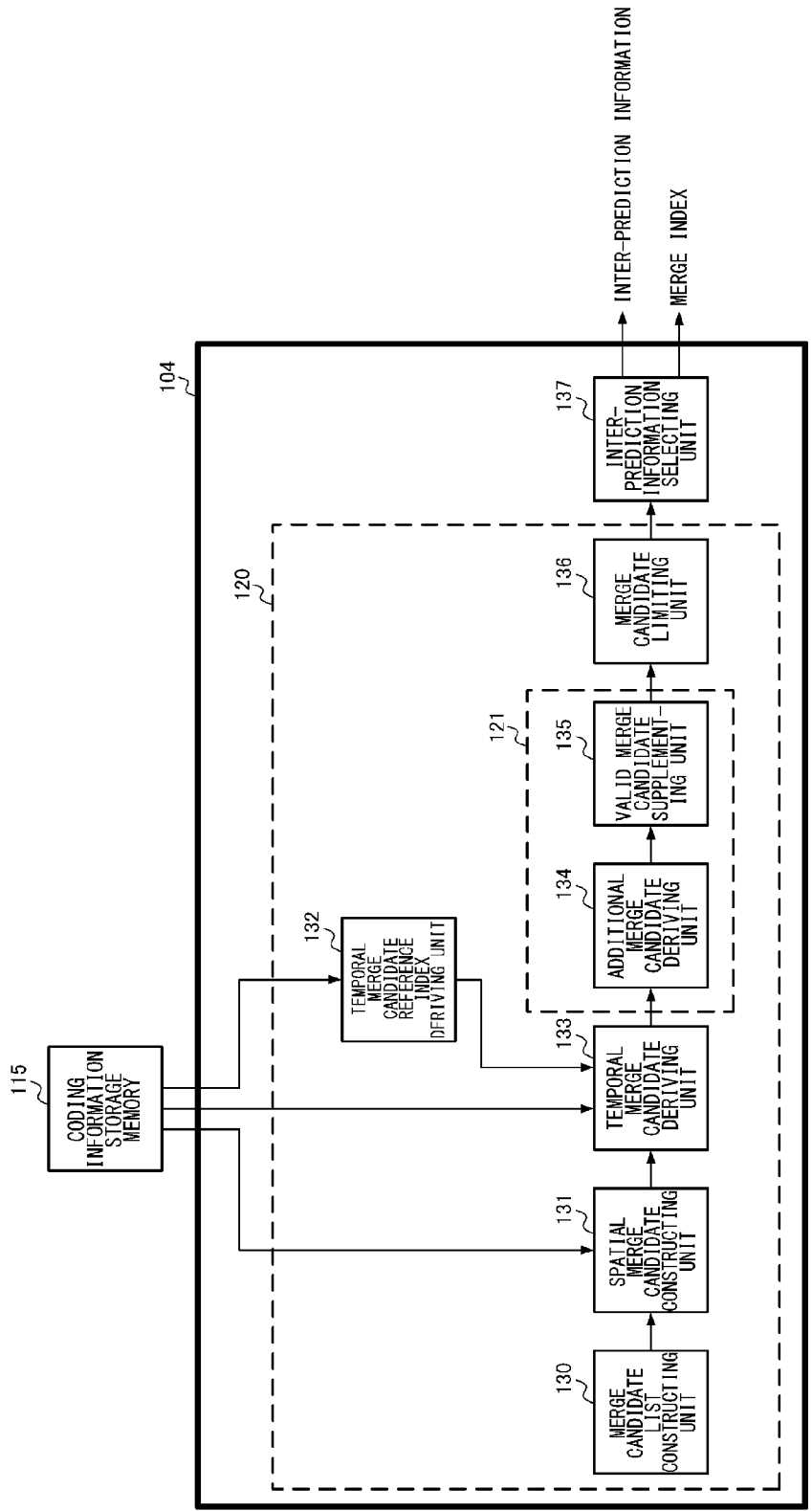
FIG. 28 is a block diagram illustrating a detailed configuration of an inter-prediction information deriving unit of a moving picture coding device illustrated in FIG. 2 according to second to seventh practical examples.
Figure 29:
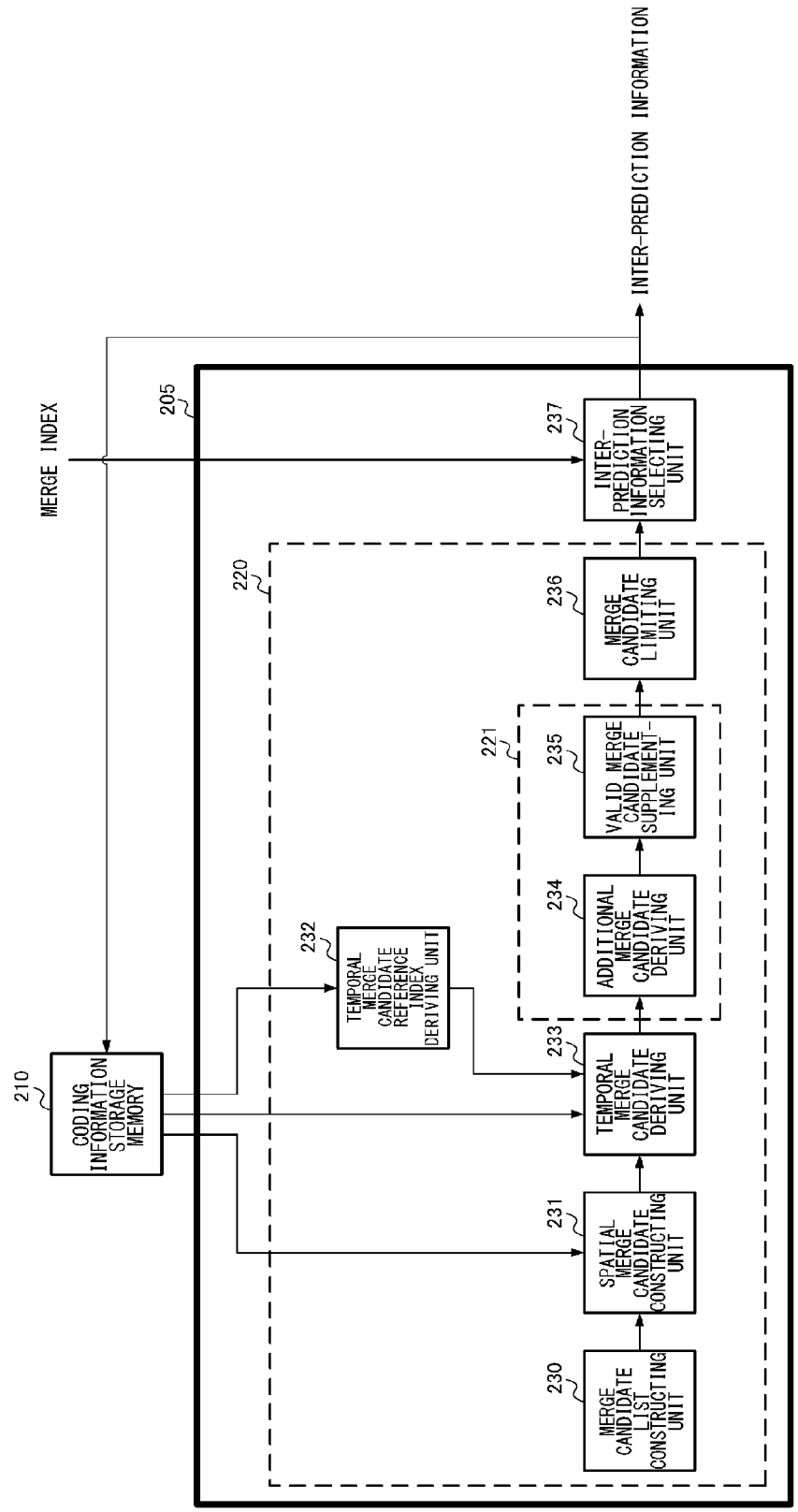
FIG. 29 is a block diagram illustrating a detailed configuration of an inter-prediction information deriving unit of a moving picture decoding device illustrated in FIG. 2 according to the second to seventh practical examples.

Next, an inter-prediction information deriving method according to a second practical example of the embodiment will be described with reference to the drawings. FIG. 28 is a diagram illustrating a detailed configuration of the inter-prediction information deriving unit 104 of the moving picture coding device illustrated in FIG. 1 according to the second practical example of the embodiment. FIG. 29 is a diagram illustrating a detailed configuration of the inter-prediction information deriving unit 205 of the moving picture decoding device illustrated in FIG. 2 according to the second practical example of the embodiment. The inter-prediction information deriving unit 104 illustrated in FIG. 28 of the second practical example is different from the inter-prediction information deriving unit 104 illustrated in FIG. 12 of the first practical example in that a valid merge candidate supplementing unit 135 is added. The inter-prediction information deriving unit 205 illustrated in FIG. 29 of the second practical example is different from the inter-prediction information deriving unit 205 illustrated in FIG. 13 of the first practical example in that a valid merge candidate supplementing unit 235 is added. In the present embodiment, in the moving picture coding device and the moving picture decoding device, when the value of the largest number of merge candidates maxNumMergeCand is 0, the merge candidate deriving process and the merge candidate list constructing process of FIG. 30 may be omitted.

Figure 30:
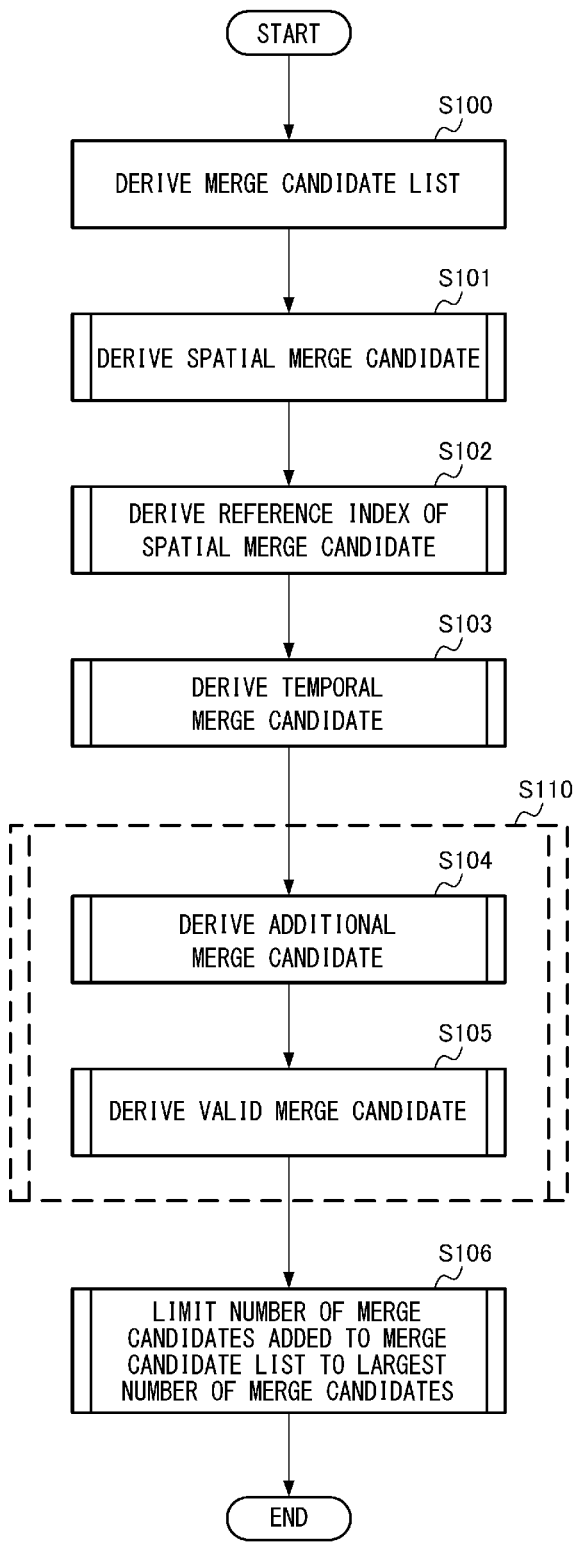
FIG. 30 is a flowchart for describing the flow of a process of deriving merge candidates of a merge mode and a process of constructing a merge candidate list according to the second to seventh practical examples.

FIG. 30 is a flowchart for describing the flow of a merge candidate deriving process and a merge candidate list constructing process which are the common functions of the merge candidate list constructing unit 120 of the inter-prediction information deriving unit 104 of the moving picture coding device and the merge candidate list constructing unit 220 of the inter-prediction information deriving unit 205 of the moving picture decoding device according to the second practical example of the embodiment of the present invention. The flowchart of FIG. 30 of the second practical example is different from the flowchart of FIG. 15 of the first practical example in that a valid merge candidate deriving process of step S105 is added.

Similarly to the first practical example, the merge candidate list constructing unit 130 of the inter-prediction information deriving unit 104 of the moving picture coding device and the merge candidate list constructing unit 230 of the inter-prediction information deriving unit 205 of the moving picture decoding device create the merge candidate list mergeCandList (step S100 of FIG. 30). The spatial merge candidate constructing unit 131 of the inter-prediction information deriving unit 104 of the moving picture coding device and the spatial merge candidate constructing unit 231 of the inter-prediction information deriving unit 205 of the moving picture decoding device derive spatial merge candidates A, B, C, D, and E from the prediction blocks A, B, C, D, and E neighboring to the coding/decoding target block from the coding information stored in the coding information storage memory 115 of the moving picture coding device or the coding information storage memory 210 of the moving picture decoding device and add the derived spatial merge candidates to the merge candidate list mergeCandList (step S101 of FIG. 30). The temporal merge candidate reference index deriving unit 132 of the inter-prediction information deriving unit 104 of the moving picture coding device and the temporal merge candidate reference index deriving unit 232 of the inter-prediction information deriving unit 205 of the moving picture decoding device derive the reference indice of the temporal merge candidates from the prediction blocks neighboring to the coding/decoding target block and supply the derived reference indice to the temporal merge candidate deriving unit 133 of the inter-prediction information deriving unit 104 of the moving picture coding device and the temporal merge candidate deriving unit 233 of the inter-prediction information deriving unit 205 of the moving picture decoding device (step S102 of FIG. 30). The temporal merge candidate deriving unit 133 of the inter-prediction information deriving unit 104 of the moving picture coding device and the temporal merge candidate deriving unit 233 of the inter-prediction information deriving unit 205 of the moving picture decoding device derive the temporal merge candidates from pictures of different time and add the derived temporal merge candidates to the merge candidate list mergeCandList (step S103 of FIG. 30). The additional merge candidate deriving unit 134 of the inter-prediction information deriving unit 104 of the moving picture coding device and the additional merge candidate deriving unit 234 of the inter-prediction information deriving unit 205 of the moving picture decoding device derive additional merge candidates using the number of merge candidates numMergeCand added to the merge candidate list mergeCandList as the largest number of merge candidates maxNumMergeCand when the number of merge candidates numMergeCand added to the merge candidate list mergeCandList is smaller than the largest number of merge candidates maxNumMergeCand and add the derived additional merge candidates to the merge candidate list mergeCandList (step S104 of FIG. 30). The above processes are the same as those of the first practical example. Subsequently, in the second practical example, the valid merge candidate supplementing unit 135 and the valid merge candidate supplementing unit 235 supplement a valid merge candidate to eliminate an invalid merge candidate within a range where the merge index in the merge candidate list is indicated by a value of 0 to (maxNumMergeCand−1) (step S105 of FIG. 30). By eliminating the invalid merge candidate within a range where the merge index has a value of 0 to (maxNumMergeCand−1), it is guaranteed that an invalid merge candidate is not selected on the decoder side and only a valid merge candidate is selected.

Figure 31:
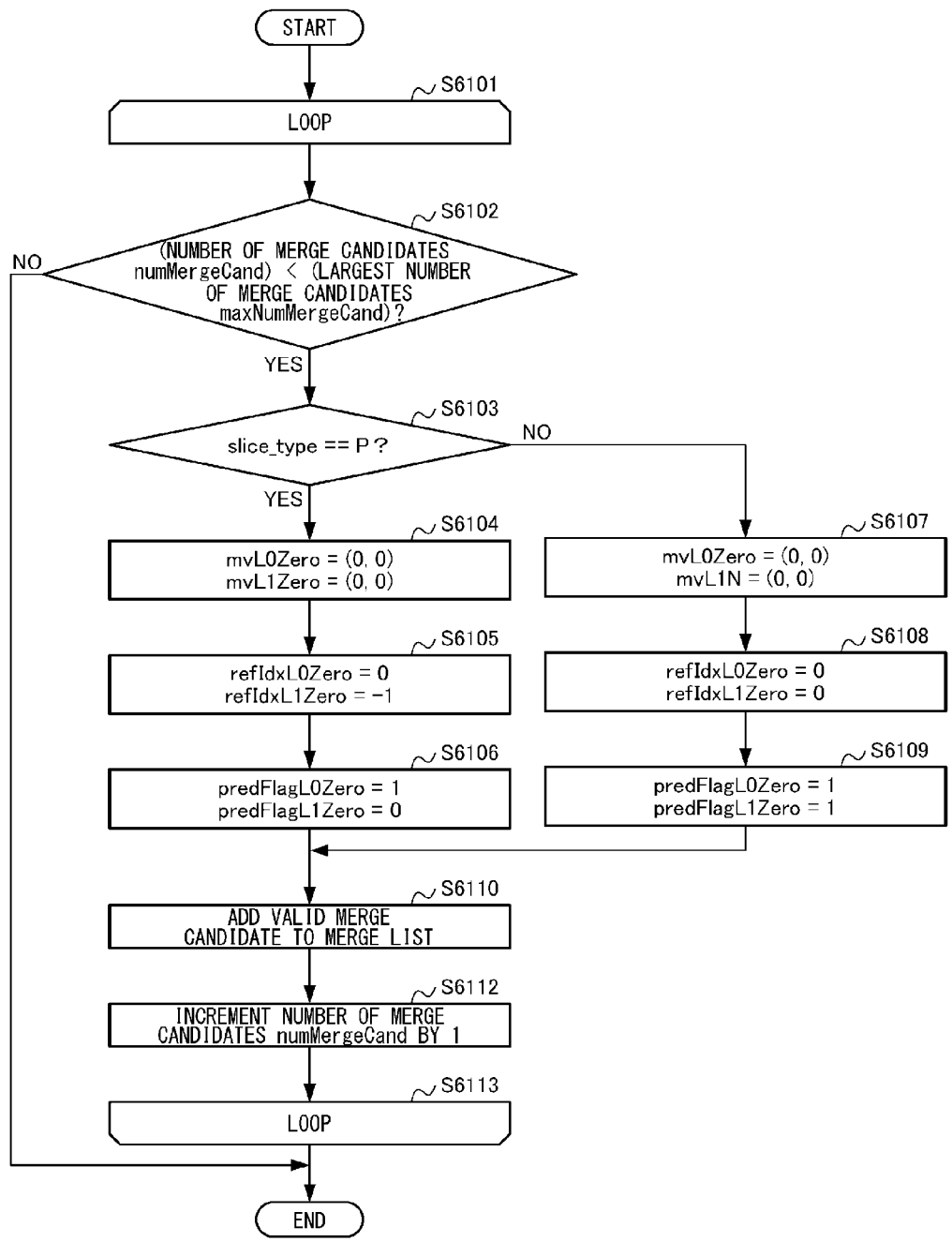
FIG. 31 is a flowchart for describing the flow of a process of supplementing valid merge candidates of a merge mode according to the second practical example.

A valid merge candidate deriving method which is the process of step S105 of FIG. 30 performed by the valid merge candidate supplementing unit 135 illustrated in FIG. 28 and the valid merge candidate supplementing unit 235 illustrated in FIG. 29 illustrated in FIG. 30 of the second practical example of the present embodiment will be described in detail with reference to the flowchart of FIG. 31. FIG. 31 is a flowchart for describing the flow of the valid merge candidate deriving process of step S105 of FIG. 30 according to the second practical example of the present embodiment.

In the valid merge candidate deriving process of FIG. 31 of the second practical example, a plurality of merge candidates having the same value of inter-prediction information is added to the merge candidate list in order to add a valid merge candidate to the merge candidate list with a simple process until an invalid merge candidate is eliminated within a range where the merge index in the merge candidate list is indicated by a value of 0 to (maxNumMergeCand−1). A valid merge candidate of which the value of the motion vector of the inter-prediction mode corresponding to the slice type is (0, 0) is added to the merge candidate list (steps S6101 to S6113 of FIG. 31).

First, when the number of merge candidates numMergeCand is smaller than the largest number of merge candidates maxNumMergeCand (step S6102 of FIG. 31: YES), the flow proceeds to step S6103. When the number of merge candidates numMergeCand is not smaller than the largest number of merge candidates maxNumMergeCand (step S6102 of FIG. 31: NO), the valid merge candidate deriving process ends.

Subsequently, when the slice type is P-slice (step S6103 of FIG. 31: YES), merge candidates of which the inter-prediction mode is L0 prediction (Pred_L0), the reference index is 0, and the vector value is (0, 0) are used as the valid merge candidates. (0, 0) is set to the motion vectors mvL0Zero and mvL1Zero of the valid merge candidates (step S6104 of FIG. 31), 0 and −1 are set to the reference indice refIdxL0Zero and refIdxL1Zero of the valid merge candidates, respectively (step S6105 of FIG. 31), and 1 and 0 are set to the flags predFlagL0Zero and predFlagL1Zero of the valid merge candidates, respectively (step S6106 of FIG. 31). Then, the flow proceeds to step S6110.

On the other hand, when the slice type is not P-slice (step S6103 of FIG. 31: NO) (that is, when the slice type is B-slice), merge candidates of which the inter-prediction mode is bi-prediction (Pred_BI), both reference indice are 0, both vector values are (0, 0) are used as valid merge candidates. (0, 0) is set to the motion vectors mvL0Zero and mvL1Zero of the valid merge candidates (step S6107 of FIG. 31), the value of the reference index i is set to the reference indice refIdxL0Zero and refIdxL1Zero of the valid merge candidates (step S6108 of FIG. 31), and 1 is set to the flags predFlagL0Zero and predFlagL1Zero of the valid merge candidates (step S6109 of FIG. 31). Then, the flow proceeds to step S6110.

Subsequently, the valid merge candidate is added to the position at which the merge index of the merge candidate list mergeCandList is indicated by the same value as numMergeCand (step S6110 of FIG. 31), and the number of merge candidates numMergeCand is incremented by 1 (step S6112 of FIG. 31). Then, the flow proceeds to step S6113.

The processes of steps S6102 to S6112 are repeatedly performed until the number of merge candidates numMergeCand reaches the largest number of merge candidates maxNumMergeCand (steps S6101 to S6113 of FIG. 31). With these processes, in the second practical example, invalid merge candidates are eliminated within a range where the merge index in the merge candidate list is indicated by the value of 0 to (maxNumMergeCand−1).

In FIG. 28 of the second practical example, when the number of merge candidates numMergeCand is larger than 0 (step S8101 of FIG. 37: YES), similarly to the inter-prediction information selecting unit 137 of illustrated in FIG. 12 of the first practical example, the inter-prediction information selecting unit 137 of the inter-prediction information deriving unit 104 of the moving picture coding device selects merge candidates among the merge candidates added to the merge candidate list, supplies the inter-prediction information including the flags predFlagL0[xP][yP] and predFlagL1[xP][yP] indicating whether or not to use the L0 prediction and L1 prediction of the respective prediction blocks of the selected merge candidate, the reference indice refIdxL0[xP][yP] and refIdxL1[xP][yP], and the motion vectors mvL0[xP][yP] and mvL1[xP][yP] is supplied to the motion-compensated prediction unit 105, and the merge index for identifying the selected merge candidate is supplied to the prediction method determining unit 107 (step S8102 of FIG. 37). However, in the second practical example, invalid merge candidates are not present in the range where the merge index in the merge candidate list is indicated by the value of 0 to (maxNumMergeCand−1) and all merge candidates are valid merge candidates. When the number of merge candidates numMergeCand is 0 (step S8102: NO), the inter-prediction information having the default value corresponding to the predetermined slice type is supplied to the motion-compensated prediction unit 105 (steps S8103 to S8105).

On the other hand, in FIG. 29 of the second practical example, when the number of merge candidates numMergeCand is larger than 0 (step S9101 of FIG. 38: YES), similarly to the inter-prediction information selecting unit 237 illustrated in FIG. 13 of the first practical example, the inter-prediction information selecting unit 237 of the inter-prediction information deriving unit 205 of the moving picture decoding device selects a merge candidate corresponding to the merge index mergeIdx supplied from the second bitstream decoder 202 among the merge candidates added to the merge candidate list mergeCandList, supplies the inter-prediction information including the flags predFlagL0[xP][yP] and predFlagL1[xP][yP] indicating whether or not to use the L0 prediction and L1 prediction of the selected merge candidate, the L0 and L1 reference indice refIdxL0[xP][yP] and refIdxL1[xP][yP], and the L0 and L1 motion vectors mvL0[xP][yP] and mvL1[xP][yP] to the motion-compensated prediction unit 206, and stores the same in the coding information storage memory 210. However, in the second practical example, invalid merge candidates are not present in the range where the merge index in the merge candidate list is indicated by the value of 0 to (maxNumMergeCand−1) and all merge candidates are valid merge candidates. On the other hand, when the number of merge candidates numMergeCand is 0 (step S9102 of FIG. 38: NO), the inter-prediction information having the default value corresponding to the predetermined slice type is supplied to the motion-compensated prediction unit 206 and is stored in the coding information storage memory 210 (steps S9103 to S9105 of FIG. 38).

Next, an inter-prediction information deriving method according to a third practical example of the present embodiment will be described. FIG. 28 is also a diagram illustrating a detailed configuration of the inter-prediction information deriving unit 104 of the moving picture coding device illustrated in FIG. 1 according to the third practical example of the embodiment. FIG. 29 is also a diagram illustrating a detailed configuration of the inter-prediction information deriving unit 205 of the moving picture decoding device illustrated in FIG. 2 according to the third practical example of the embodiment. FIG. 30 is also a flowchart for describing the flow of a merge candidate deriving process and a merge candidate list constructing process which are the common functions of the merge candidate list constructing unit 120 of the inter-prediction information deriving unit 104 of the moving picture coding device and the merge candidate list constructing unit 220 of the inter-prediction information deriving unit 205 of the moving picture decoding device according to the third practical example of the embodiment of the present invention. In the third practical example, similarly to the second practical example, the valid merge candidate supplementing unit 135 illustrated in FIG. 28 and the valid merge candidate supplementing unit 235 illustrated in FIG. 29 supplement valid merge candidates to eliminate invalid merge candidates within the range where the merge index in the merge candidate list is indicated by the value of 0 to (maxNumMergeCand−1) (step S105 of FIG. 30). By eliminating the invalid merge candidate within a range where the merge index has a value of 0 to (maxNumMergeCand−1), it is guaranteed that an invalid merge candidate is not selected on the decoder side and only a valid merge candidate is selected. However, in the third practical example, regardless of the slice type, merge candidates of which the inter-prediction mode is L0 prediction (Pred_L0), the reference index is 0, and the vector value is (0, 0) are used as the valid merge candidates. The merge candidate list constructing unit 120 of the inter-prediction information deriving unit 104 of the moving picture coding device of the second practical example illustrated in FIG. 28 and the merge candidate list constructing unit 220 of the inter-prediction information deriving unit 205 of the moving picture decoding device illustrated in FIG. 29 have the same configuration as those of the third practical example. However, the process of step S105 of FIG. 30 performed by the valid merge candidate supplementing unit 135 and the valid merge candidate supplementing unit 235 is different from that of the second practical example.

Figure 32:
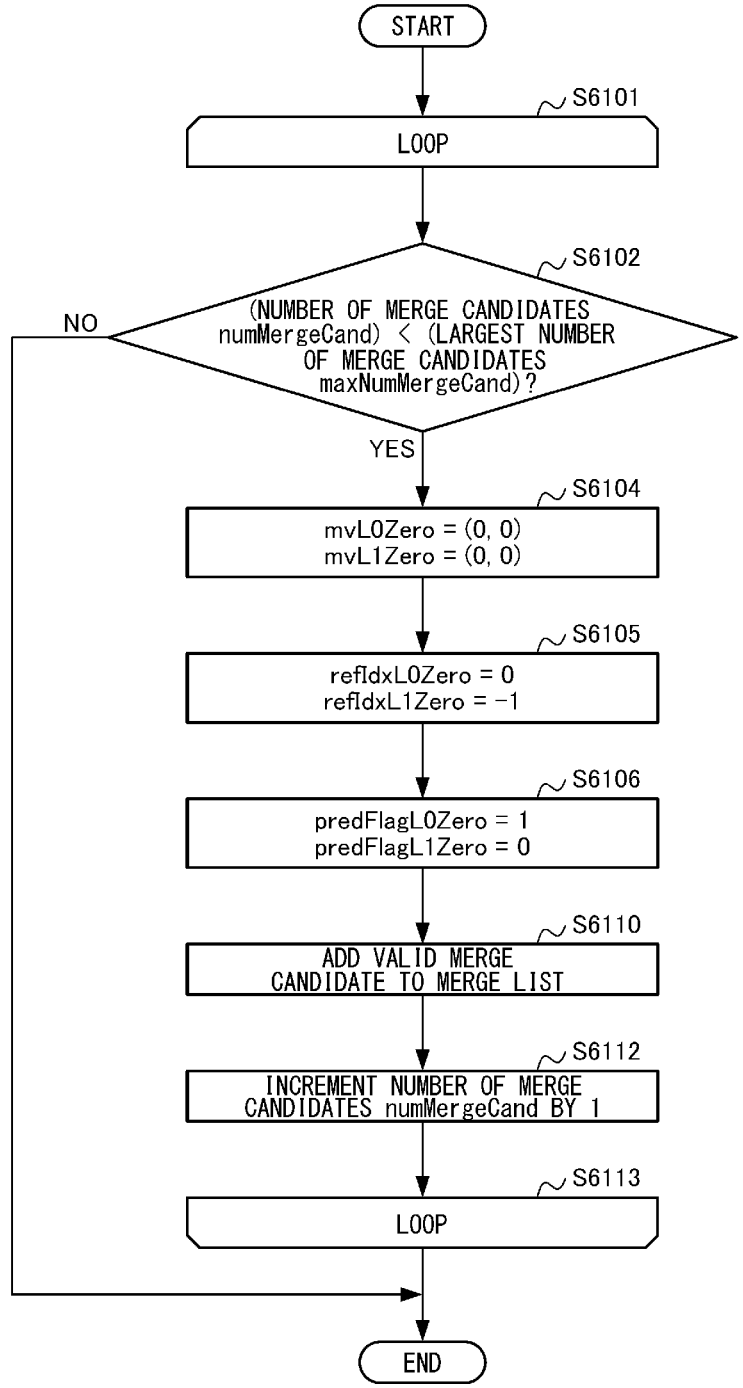
FIG. 32 is a flowchart for describing the flow of a process of supplementing valid merge candidates of a merge mode according to the third practical example.

A valid merge candidate deriving method which is the process of step S105 of FIG. 30 performed by the valid merge candidate supplementing unit 135 illustrated in FIG. 28 and the valid merge candidate supplementing unit 235 illustrated in FIG. 29 of the third practical example of the present embodiment will be described in detail with reference to the flowchart of FIG. 32. FIG. 32 is a flowchart for describing the flow of the valid merge candidate deriving process of step S105 of FIG. 30 according to the third practical example of the present embodiment.

In the valid merge candidate deriving process of FIG. 32 of the third practical example, similarly to the valid merge candidate deriving process of FIG. 31 of the second practical example, a plurality of merge candidates having the same value of inter-prediction information is added to the merge candidate list in order to add a valid merge candidate to the merge candidate list with a simple process until an invalid merge candidate is eliminated within a range where the merge index in the merge candidate list is indicated by a value of 0 to (maxNumMergeCand−1). However, in the third practical example, regardless of the slice type, by setting the inter-prediction mode to L0 prediction (Pred_L0), a valid merge candidate of which the value of the motion vector of the inter-prediction mode corresponding to the slice type is (0, 0) is added to the merge candidate list (steps S6101 to S6113 of FIG. 32).

First, when the number of merge candidates numMergeCand is smaller than the largest number of merge candidates maxNumMergeCand (step S6102 of FIG. 32: YES), the flow proceeds to step S6103. When the number of merge candidates numMergeCand is not smaller than the largest number of merge candidates maxNumMergeCand (step S6102 of FIG. 32: NO), the valid merge candidate deriving process ends.

Subsequently, merge candidates of which the inter-prediction mode is L0 prediction (Pred_L0), the reference index is 0, and the vector value is (0, 0) are used as the valid merge candidates. (0, 0) is set to the motion vectors mvL0Zero and mvL1Zero of the valid merge candidates (step S6104 of FIG. 32), 0 and −1 are set to the reference indice refIdxL0Zero and refIdxL1Zero of the valid merge candidates, respectively (step S6105 of FIG. 32), and 1 and 0 are set to the flags predFlagL0Zero and predFlagL1Zero of the valid merge candidates, respectively (step S6106 of FIG. 32).

Subsequently, the valid merge candidate is added to the position at which the merge index of the merge candidate list mergeCandList is indicated by the same value as numMergeCand (step S6110 of FIG. 32), and the number of merge candidates numMergeCand is incremented by 1 (step S6112 of FIG. 32). Then, the flow proceeds to step S6113.

The processes of steps S6102 to S6112 are repeatedly performed until the number of merge candidates numMergeCand reaches the largest number of merge candidates maxNumMergeCand (steps S6101 to S6113 of FIG. 32). With these processes, in the third practical example, invalid merge candidates are eliminated within a range where the merge index in the merge candidate list is indicated by the value of 0 to (maxNumMergeCand−1).

Next, an inter-prediction information deriving method according to a fourth practical example of the present embodiment will be described. FIG. 28 is also a diagram illustrating a detailed configuration of the inter-prediction information deriving unit 104 of the moving picture coding device illustrated in FIG. 1 according to the fourth practical example of the embodiment. FIG. 29 is also a diagram illustrating a detailed configuration of the inter-prediction information deriving unit 205 of the moving picture decoding device illustrated in FIG. 2 according to the fourth practical example of the embodiment. FIG. 30 is also a flowchart for describing the flow of a merge candidate deriving process and a merge candidate list constructing process which are the common functions of the merge candidate list constructing unit 120 of the inter-prediction information deriving unit 104 of the moving picture coding device and the merge candidate list constructing unit 220 of the inter-prediction information deriving unit 205 of the moving picture decoding device according to the fourth practical example of the embodiment of the present invention. In the fourth practical example, similarly to the second and third practical examples, the valid merge candidate supplementing unit 135 illustrated in FIG. 28 and the valid merge candidate supplementing unit 235 illustrated in FIG. 29 supplement valid merge candidates to eliminate invalid merge candidates within the range where the merge index in the merge candidate list is indicated by the value of 0 to (maxNumMergeCand−1) (step S105 of FIG. 30). By eliminating the invalid merge candidate within a range where the merge index has a value of 0 to (maxNumMergeCand−1), it is guaranteed that an invalid merge candidate is not selected on the decoder side and only a valid merge candidate is selected. However, in the fourth practical example, a merge candidate added last to the merge list is repeatedly added to the merge candidate list as a valid merge candidate. The merge candidate list constructing unit 120 of the inter-prediction information deriving unit 104 of the moving picture coding device of the second and third practical examples illustrated in FIG. 28 and the merge candidate list constructing unit 220 of the inter-prediction information deriving unit 205 of the moving picture decoding device illustrated in FIG. 29 have the same configuration as those of the fourth practical example. However, the process of step S105 of FIG. 30 performed by the valid merge candidate supplementing unit 135 and the valid merge candidate supplementing unit 235 is different from that of the second and third practical examples.

Figure 33:
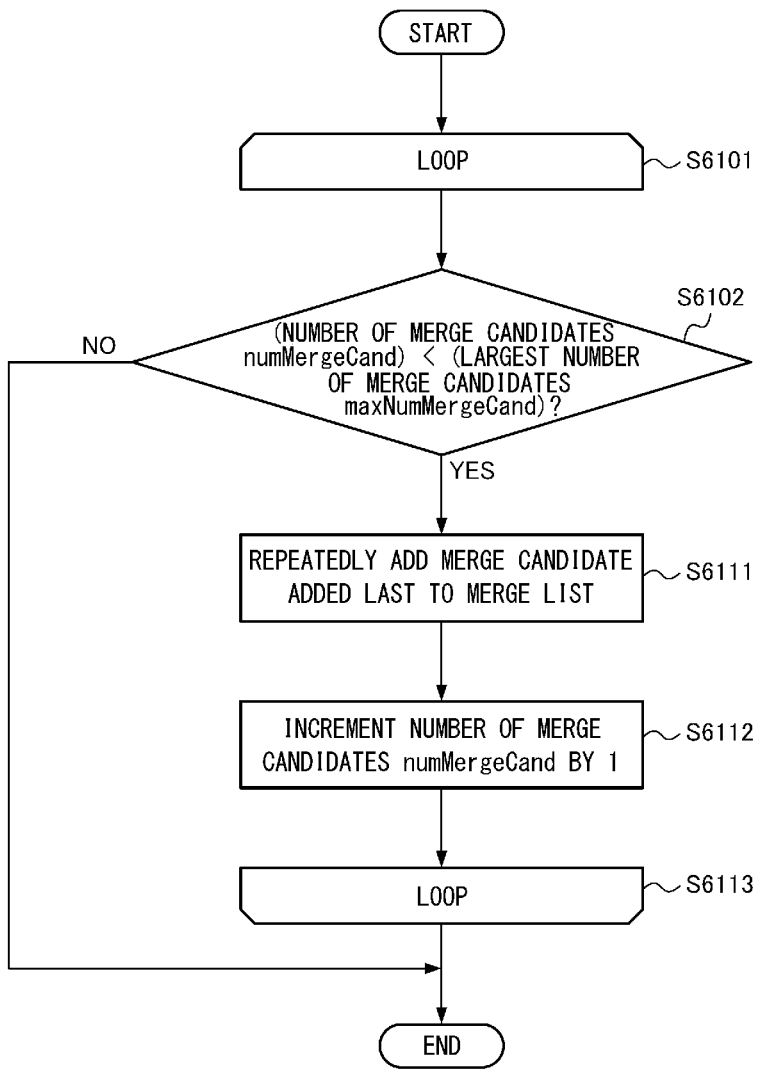
FIG. 33 is a flowchart for describing the flow of a process of supplementing valid merge candidates of a merge mode according to the fourth practical example.

A valid merge candidate deriving method which is the process of step S105 of FIG. 30 performed by the valid merge candidate supplementing unit 135 illustrated in FIG. 28 and the valid merge candidate supplementing unit 235 illustrated in FIG. 29 of the fourth practical example of the present embodiment will be described in detail with reference to the flowchart of FIG. 32. FIG. 33 is a flowchart for describing the flow of the valid merge candidate deriving process of step S105 of FIG. 30 according to the fourth practical example of the present embodiment.

In the valid merge candidate deriving process of FIG. 33 of the fourth practical example, similarly to the valid merge candidate deriving process of FIGS. 31 and 32 of the second and third practical examples, respectively, a plurality of merge candidates having the same value of inter-prediction information is added to the merge candidate list in order to add a valid merge candidate to the merge candidate list with a simple process until an invalid merge candidate is eliminated within a range where the merge index in the merge candidate list is indicated by a value of 0 to (maxNumMergeCand−1). However, in the fourth practical example, a merge candidate added last to the merge list is repeatedly added to the merge candidate list as a valid merge candidate (steps S6101 to S6113 of FIG. 33).

First, when the number of merge candidates numMergeCand is smaller than the largest number of merge candidates maxNumMergeCand (step S6102 of FIG. 33: YES), the flow proceeds to step S6111. When the number of merge candidates numMergeCand is not smaller than the largest number of merge candidates maxNumMergeCand (step S6102 of FIG. 33: NO), the valid merge candidate deriving process ends.

Subsequently, the merge candidate added last to the merge list is repeatedly added to the merge candidate list as a valid merge candidate (step S6111 of FIG. 33). Specifically, a merge candidate of which the inter-prediction mode, the reference index, and the vector value are the same as those of the merge candidate added at the position corresponding to the index value (numMergeIdx−1) of the merge candidate list is added at the position at which the merge index of the merge candidate list mergeCandList is indicated by the same value as numMergeCand as the valid merge candidate. Subsequently, the number of merge candidates numMergeCand is incremented by 1 (step S6112 of FIG. 33), and the flow proceeds to step S6113.

The processes of steps S6102 to S6112 are repeatedly performed until the number of merge candidates numMergeCand reaches the largest number of merge candidates maxNumMergeCand (steps S6101 to S6113 of FIG. 33). With these processes, in the fourth practical example, invalid merge candidates are eliminated within a range where the merge index in the merge candidate list is indicated by the value of 0 to (maxNumMergeCand−1).

Next, an inter-prediction information deriving method according to a fifth practical example of the present embodiment will be described. FIG. 28 is also a diagram illustrating a detailed configuration of the inter-prediction information deriving unit 104 of the moving picture coding device illustrated in FIG. 1 according to the fourth practical example of the embodiment. FIG. 29 is also a diagram illustrating a detailed configuration of the inter-prediction information deriving unit 205 of the moving picture decoding device illustrated in FIG. 2 according to the fourth practical example of the embodiment. FIG. 30 is also a flowchart for describing the flow of a merge candidate deriving process and a merge candidate list constructing process which are the common functions of the merge candidate list constructing unit 120 of the inter-prediction information deriving unit 104 of the moving picture coding device and the merge candidate list constructing unit 220 of the inter-prediction information deriving unit 205 of the moving picture decoding device according to the fourth practical example of the embodiment of the present invention. In the fifth practical example, a combination of the additional merge candidate deriving process of FIG. 26 of the fourth practical example and the valid merge candidate deriving process of FIG. 33 is performed.

Figure 34:
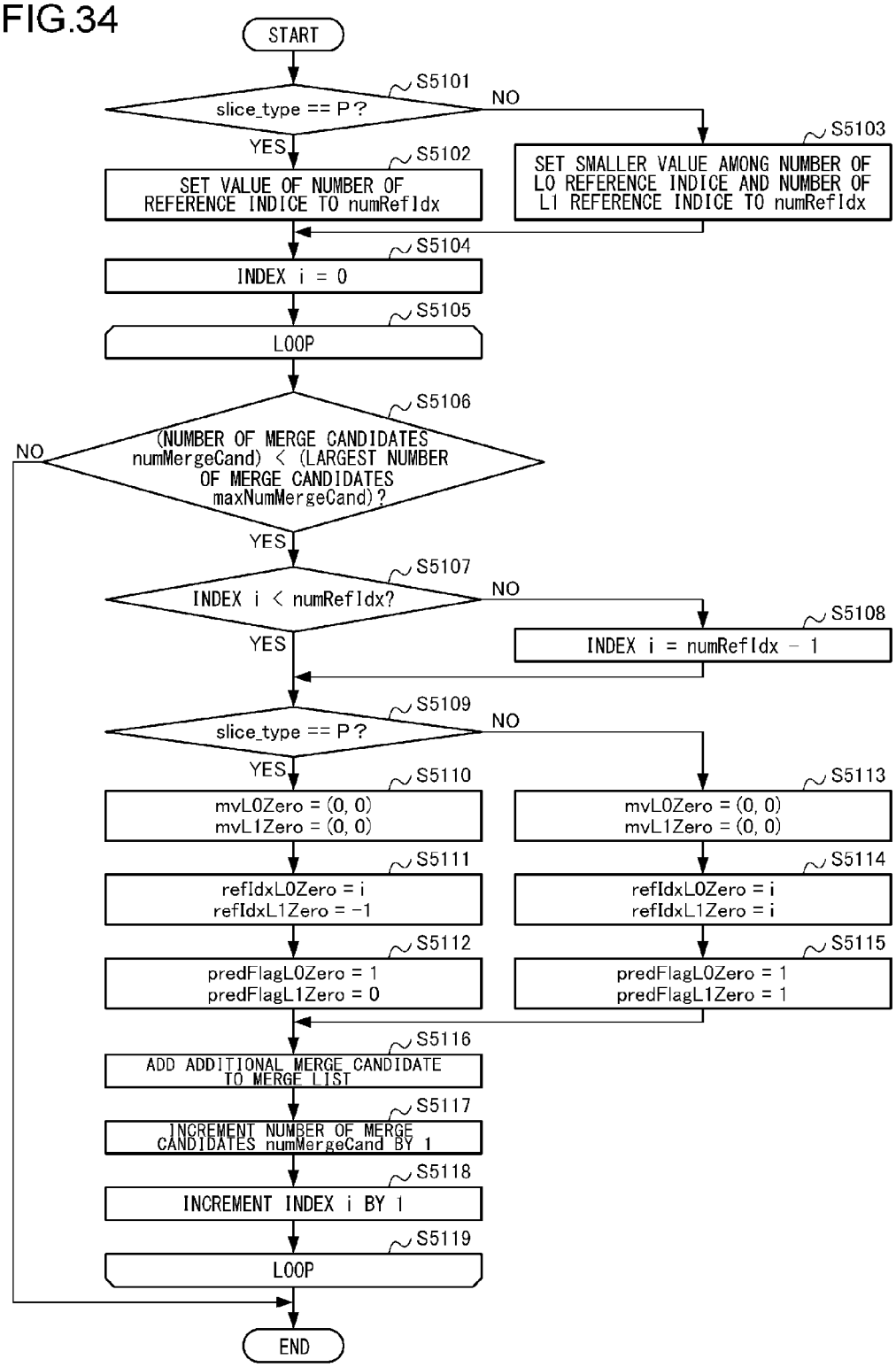
FIG. 34 is a flowchart for describing the flow of a process of deriving additional merge candidates of a merge mode and a process of supplementing valid merge candidates according to the fifth practical example.

An additional merge candidate and valid merge candidate deriving method of step S110 which is a combination of steps S104 and S105 of FIG. 30, performed by an additional merge candidate and valid merge candidate deriving block 121 which a combination of the processes performed by the additional merge candidate deriving unit 134 and the valid merge candidate supplementing unit 135 of FIG. 28 of the fifth practical example and an additional merge candidate and valid merge candidate deriving block 221 which is a combination of the processes performed by the additional merge candidate deriving unit 234 and the valid merge candidate supplementing unit 235 of FIG. 29 will be described in detail. FIG. 34 is a flowchart for describing the flow of the additional merge candidate and valid merge candidate deriving process of step S110 of FIG. 30 according to the fifth practical example of the present embodiment.

In the additional merge candidate and valid merge candidate deriving process of FIG. 34, a plurality of merge candidates having different values of inter-prediction information is derived and added to the merge candidate list in order to broaden the choices for merge candidates to improve the coding efficiency. After that, a plurality of merge candidates having the same value of inter-prediction information is added to the merge candidate list in order to add a valid merge candidate to the merge candidate list until an invalid merge candidate is eliminated within a range where the merge index in the list is indicated by a value of 0 to (maxNumMergeCand−1) (steps S5101 to S5119 of FIG. 34).

First, when the slice type is P-slice (step S5101 of FIG. 34: YES), the value of the number of L0 reference indice is set to a variable numRefIdx indicating the number of reference indice (step S5102 of FIG. 34). On the other hand, when the slice type is no P-slice (step S5101 of FIG. 34: NO), that is, when the slice type is B-slice, the smaller value among the number of L0 reference indice and the number of L1 reference indice is set to the variable numRefIdx indicating the number of reference indice (step S5103 of FIG. 34). Subsequently, 0 is set to the reference index i (step S5104 of FIG. 34).

Subsequently, an additional merge candidate of which the value of the motion vector of the prediction mode corresponding to the slice type is (0, 0) is derived while changing the reference index i and added to the merge candidate list (steps S5105 to S5119 of FIG. 34).

First, when the number of merge candidates numMergeCand is smaller than the largest number of merge candidates maxNumMergeCand (step S5106 of FIG. 34: YES), the flow proceeds to step S5107. When the number of merge candidates numMergeCand is not smaller than the largest number of merge candidates maxNumMergeCand (step S5106 of FIG. 34: NO), the additional merge candidate deriving process ends.

Subsequently, when the reference index i is smaller than the variable numRefIdx (step S5107 of FIG. 34: YES), the flow proceeds to step S5109 and an additional merge candidate adding process is performed. When the reference index i is not smaller than the variable numRefIdx (step S5107 of FIG. 34: NO), (numRefIdx−1) is set to the reference index i (step S5108 of FIG. 34), the flow proceeds to step S5109, and a valid merge candidate adding process is performed.

Subsequently, when the slice type is P-slice (step S5109 of FIG. 34: YES), (0, 0) is set to the motion vectors mvL0Zero and mvL1Zero of the additional merge candidates (step S5110 of FIG. 34), the value of the reference index i and −1 are set to the reference indice refIdxL0Zero and refIdxL1Zero of the additional merge candidates, respectively (step S5111 of FIG. 34), and 1 and 0 are set to the flags predFlagL0Zero and predFlagL1Zero of the additional merge candidates, respectively (step S5112 of FIG. 34). Then, the flow proceeds to step S5116.

On the other hand, when the slice type is not P-slice (step S5109 of FIG. 34: NO) (that is, when the slice type is B-slice), (0, 0) is set to the motion vectors mvL0Zero and mvL1Zero (step S5113 of FIG. 34), the value of the reference index i is set to the reference indice refIdxL0Zero and refIdxL1Zero of the additional merge candidates (step S5114 of FIG. 34), and 1 is set to the flags predFlagL0Zero and predFlagL1Zero of the additional merge candidates (step S5115 of FIG. 34). Then, the flow proceeds to step S5116.

Subsequently, the additional merge candidate is added to the position at which the merge index of the merge candidate list mergeCandList is indicated by the same value as numMergeCand (step S5116 of FIG. 34), and the number of merge candidates numMergeCand is incremented by 1 (step S5117 of FIG. 34). Subsequently, the index i is incremented by 1 (step S5118 of FIG. 34), and the flow proceeds to step S5119.

The processes of steps S5106 to S5118 are repeatedly performed for respective reference indice i (steps S5105 to S5119 of FIG. 34). With these processes, in the fifth practical example, invalid merge candidates are eliminated within a range where the merge index in the merge candidate list is indicated by the value of 0 to (maxNumMergeCand−1).

Next, an inter-prediction information deriving method according to a sixth practical example of the present embodiment will be described. FIG. 28 is also a diagram illustrating a detailed configuration of the inter-prediction information deriving unit 104 of the moving picture coding device illustrated in FIG. 1 according to the sixth practical example of the embodiment. FIG. 29 is also a diagram illustrating a detailed configuration of the inter-prediction information deriving unit 205 of the moving picture decoding device illustrated in FIG. 2 according to the sixth practical example of the embodiment. FIG. 30 is also a flowchart for describing the flow of a merge candidate deriving process and a merge candidate list constructing process which are the common functions of the merge candidate list constructing unit 120 of the inter-prediction information deriving unit 104 of the moving picture coding device and the merge candidate list constructing unit 220 of the inter-prediction information deriving unit 205 of the moving picture decoding device according to the sixth practical example of the embodiment of the present invention. Although an implementation method of the sixth practical example is different from that of the second practical example, the same inter-prediction information can be obtained on the decoder side. In the sixth practical example, inter-prediction information within the range of all indice in the merge candidate list or where the index is indicated by the value of 0 to (maxMergeCand−1) is initialized to a predetermined value, and the process of deriving and adding respective merge candidates is performed. When the slice type is P-slice, the merge candidate list constructing unit 130 of FIG. 28 and the merge candidate list constructing unit 230 of FIG. 29 initialize all elements in the merge candidate list by setting the inter-prediction mode to L0 prediction (Pred_L0), the reference index to 0, and the vector value to (0, 0). When the slice type is not P-slice (that is, the slice type is B-slice), all elements in the merge candidate list are initialized by setting the inter-prediction mode to bi-prediction (Pred_BI), both reference indice to 0, and both vector values to (0, 0). Further, 0 is set to the number of merge candidates numMergeCand.

Figure 35:
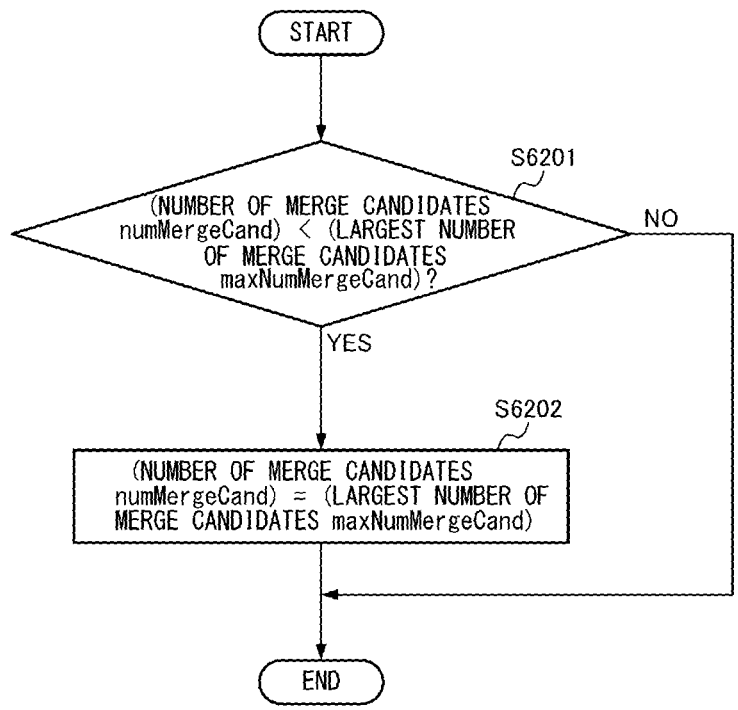
FIG. 35 is a flowchart for describing the flow of a process of making initialized inter-prediction information of a merge mode valid as a merge candidate according to the sixth and seventh practical examples.
Figure 36:
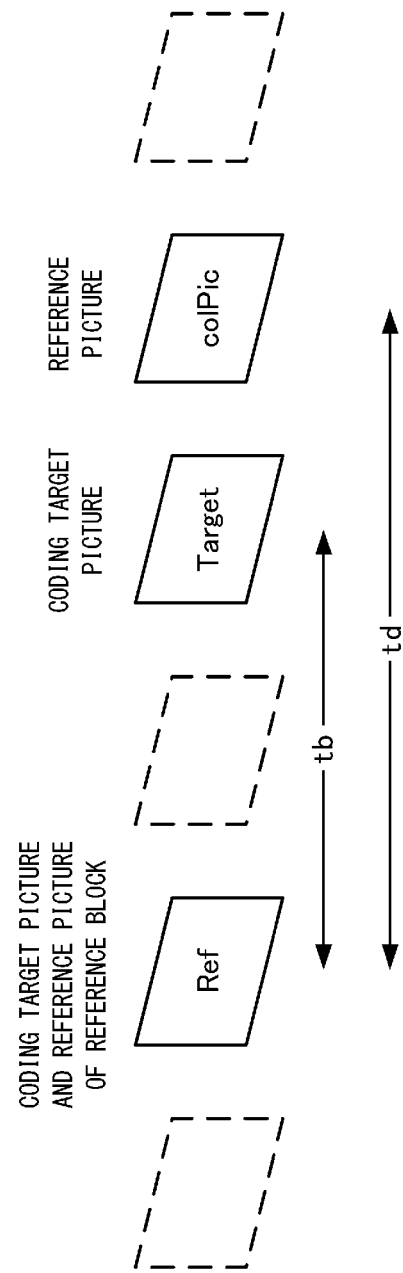
FIG. 36 is a diagram for describing a temporal direct mode of the conventional MPEG-4 AVC/H.264 standard.

Further, the valid merge candidate supplementing unit 135 of FIG. 28 and the valid merge candidate supplementing unit 235 of FIG. 29 according to the sixth practical example make the initialized inter-prediction information valid so that the merge candidates are used as valid merge candidate. A valid merge candidate deriving method which is the process of step S105 of FIG. 30 performed by the valid merge candidate supplementing unit 135 illustrated in FIG. 28 and the valid merge candidate supplementing unit 235 illustrated in FIG. 29 of the sixth practical example of the present embodiment will be described in detail with reference to the flowchart of FIG. 35. FIG. 35 is a flowchart for describing the flow of the process of making the initialized inter-prediction information valid as valid merge candidates of step S105 of FIG. 30 according to the sixth practical example of the present embodiment. When the number of merge candidates numMergeCand is smaller than the largest number of merge candidates maxNumMergeCand (step S6201 of FIG. 35), the value of the largest number of merge candidates maxNumMergeCand is set to the number of merge candidates numMergeCand (step S6201 of FIG. 35). With this process, the merge candidate list constructing unit 130 of FIG. 28 and the merge candidate list constructing unit 230 of FIG. 29 make the initialized inter-prediction information valid so that the merge candidates are used as valid merge candidates.

Next, an inter-prediction information deriving method according to a seventh practical example of the present embodiment will be described. FIG. 28 is also a diagram illustrating a detailed configuration of the inter-prediction information deriving unit 104 of the moving picture coding device illustrated in FIG. 1 according to the seventh practical example of the embodiment. FIG. 29 is also a diagram illustrating a detailed configuration of the inter-prediction information deriving unit 205 of the moving picture decoding device illustrated in FIG. 2 according to the seventh practical example of the embodiment. FIG. 30 is also a flowchart for describing the flow of a merge candidate deriving process and a merge candidate list constructing process which are the common functions of the merge candidate list constructing unit 120 of the inter-prediction information deriving unit 104 of the moving picture coding device and the merge candidate list constructing unit 220 of the inter-prediction information deriving unit 205 of the moving picture decoding device according to the seventh practical example of the embodiment of the present invention. Although an implementation method of the seventh practical example is different from that of the third practical example, the same inter-prediction information can be obtained on the decoder side. In the seventh practical example, similarly to the sixth practical example, inter-prediction information within the range of all indice in the merge candidate list or where the index is indicated by the value of 0 to (maxMergeCand−1) is initialized to a predetermined value, and the process of deriving and adding respective merge candidates is performed. However, in the seventh practical example, the merge candidate list constructing unit 130 of FIG. 28 and the merge candidate list constructing unit 230 of FIG. 29 initialize all elements in the merge candidate list by setting the inter-prediction mode to L0 prediction (Pred_L0), the reference index to 0, and the vector value to (0, 0) regardless of the slice type. The other processes are the same as those of the sixth practical example.

Hereinabove, the present embodiment has been described. When a merge index indicating an invalid merge candidate is coded on the coder side, an invalid merge candidate is selected on the decoder side. In this case, inter-prediction is performed using the invalid inter-prediction information and unexpected prediction signals may be obtained. Moreover, the inter-prediction mode may have a value that does not conform to the standards and the reference index may indicate a reference picture that is not present whereby an error may occur and decoding may end abnormally.

According to the first practical example of the present embodiment, even when a merge index indicating an invalid merge candidate is coded on the coder side, inter-prediction using the inter-prediction information of the invalid merge candidate will not be performed on the decoder side. Since the moving picture coding device according to the rules of the present embodiment can obtain the same inter-prediction information and the same prediction signal, it is possible to obtain the same decoded picture.

According to the second to seventh practical examples of the present embodiment, the merge index indicating an invalid merge candidate will not be selected and coded on the coder side, and it is guaranteed that inter-prediction using the inter-prediction information of the invalid merge candidate is not performed on the decoder side. Since the moving picture decoding device can obtain the same inter-prediction information and the same prediction signal, it is possible to obtain the same decoded picture.

According to the second to fifth practical examples of the present embodiment, the valid merge candidate supplementing unit 135 of the moving picture coding device and the valid merge candidate supplementing unit 235 of the moving picture decoding device add valid merge candidates until an invalid merge candidate is eliminated within the range where the merge index in the merge candidate list is indicated by the value of 0 to (maxNumMergeCand−1). However, valid merge candidates may be added up to a predetermined range of (maxNumMergeCand−1) or more as long as the invalid merge candidate is not present at least in the range of 0 to (maxNumMergeCand−1).

According to the sixth and seventh practical examples of the present embodiment, the merge candidate list constructing unit 120 of the inter-prediction information deriving unit 104 of the moving picture coding device and the merge candidate list constructing unit 220 of the inter-prediction information deriving unit 205 of the moving picture decoding device initialize the inter-prediction information in the range where the merge index in the merge candidate list is indicated by the value of 0 to (maxNumMergeCand−1) to the predetermined value. However, the inter-prediction information at least in the range of 0 to (maxNumMergeCand−1) may be initialized, and the inter-prediction information up to a predetermined range of (maxNumMergeCand−1) or more may be initialized.

In the embodiment described above, the spatial merge candidate, the temporal merge candidate, and the additional merge candidate are derived. However, an embodiment in which the respective merge candidate deriving processes are omitted is also included in the present invention. Moreover, an embodiment in which the respective merge candidate deriving processes are modified or a new merge candidate deriving process is added is also included in the present invention.

When the additional merge candidate deriving process of FIG. 26 described in the present embodiment is performed, if the slice type is B-slice, the method of the third and seventh practical examples in which a valid merge candidate of L0 prediction having a different value of inter-prediction information from the additional merge candidate is supplemented is more suitable than the method of the second and sixth practical examples in which a valid merge candidate having the same value of inter-prediction information as the additional merge candidate is supplemented. When the additional merge candidate deriving process of FIG. 26 described in the present embodiment is not performed, if the slice type is B-slice, the method of the second and sixth practical examples in which a valid merge candidate of bi-prediction having high prediction efficiency is supplemented is more suitable than the method of the third and seventh practical examples in which a valid merge candidate of L0 prediction is supplemented.

When the value of the largest number of merge candidates maxNumMergeCand is 0, the inter-prediction information having the default value is not defined, and the skip mode and the merge mode are inhibited, although the flags of the skip mode and merge mode are transmitted, coding efficiency decreases because the skip mode or the merge mode cannot be selected. Further, when the skip mode or the skip mode which is inhibited on the coder side is selected and a coded bitstream is decoded, an error occurs on the decoder side, and the decoding process may end abnormally.

However, in the present embodiment, regardless of the value of the largest number of merge candidates maxNumMergeCand, the merge mode including the skip mode can always be selected when the value of the largest number of merge candidates maxNumMergeCand is 0. In this case, in the skip mode or the movable range, the inter-prediction information having the default value is output. As an example of the default value of the inter-prediction information, when the slice type is B-slice, the default value is defined such that the prediction mode is bi-prediction (Pred_BI), the value of the reference picture index is 0, and the value of the motion vector is (0, 0). Thus, even when the value of the largest number of merge candidates maxNumMergeCand is 0, it is guaranteed that coding is not performed on the coder side with the skip mode or the merge mode as an invalid value and that inter-prediction using the inter-prediction information having the predetermined default value is performed on the decoder side. Thus, since the moving picture decoding device can obtain the same inter-prediction information and the same prediction signal, it is possible to obtain the same decoded picture. Further, even when the value of the largest number of merge candidates maxNumMergeCand is 0, since the skip mode or the merge mode can be selected, coding efficiency is improved as compared to when the skip mode or the merge mode is inhibited.

When the value of the largest number of merge candidates maxNumMergeCand is 0, the inter-prediction information of the merge mode including the skip mode uses the default value, it is not necessary to perform the merge candidate list constructing process unlike the case where the value of the largest number of merge candidates maxNumMergeCand is larger than or equal to 1. Thus, it is possible to realize a coding device which does not perform the merge candidate list constructing process and has a small processing amount. Moreover, since the process on the decoder side involves setting the default value to the inter-prediction information of the merge mode including the skip mode only, it is possible to minimize the processing amount on the decoder side and to cope with a decoding device capable of suppressing a decrease in the coding efficiency.

The bitstream of the moving picture output by the moving picture coding device according to the embodiment has a specific data format that can be decoded according to a coding method used in the embodiment, and the moving picture decoding device corresponding to the moving picture coding device can decode the bitstream having the specific data format.

When a wired or wireless network is used to exchange the bitstream between the moving picture coding device and the moving picture decoding device, the bitstream may be converted to have a data format appropriate for a transmission form of a communication path and then transmitted. In this case, a moving picture transmitter that converts the bitstream output by the moving picture coding device into coding data having the data format appropriate for a transmission form of a transmission path and then transmits the coding data to the network and a moving picture receiver that receives the coding data from the network, reconstructs the bitstream, and supplies the reconstructed bitstream to the moving picture decoding device are provided.

The moving picture transmitter includes a memory that buffers the bitstream output by the moving picture coding device, a packet processing unit that packetizes the bitstream, and a transmitting unit that transmits the packetized coding data via the network. The moving picture receiver includes a receiving unit that receives the packetized coding data via the network, a memory that buffers the received coding data, and a packet processing unit that performs packet processing on the coding data to construct the bitstream, and provides the constructed bitstream to the moving picture decoding device.

The process related to coding and decoding described above may be implemented as transmitting, accumulating, and receivers using hardware, and may be implemented by firmware stored in a read only memory (ROM), a flash memory, or the like or software of a computer or the like. A firmware program and a software program may be recorded in a computer readable recording medium and provided, may be provided from a server via a wired or wireless network, or may be provided as data broadcasting of digital terrestrial or satellite broadcasting.

The embodiment of the present invention has been described above. The embodiment is an example, and a person skilled in the art may understand that various modifications or changes on a combination of respective constituent components and processing processes can be made and such modifications or changes fall within the scope of the invention.

[Item 1]

A moving picture coding device that codes moving pictures using motion-compensated prediction in units of blocks obtained by partitioning each picture of the moving pictures, comprising:

a prediction information coding unit that codes information indicating a designated number of inter-prediction information candidates;

a prediction information deriving unit that derives the inter-prediction information candidates from inter-prediction information of a prediction block neighboring to a coding target prediction block or a prediction block present at the same position as or near the coding target prediction block in a coded picture at a temporally different position from the coding target prediction block;

a candidate list constructing unit that constructs an inter-prediction information candidate list from the derived inter-prediction information candidates;

a candidate supplementing unit that derives inter-prediction information candidates of which the prediction mode, the reference index, and the motion vector have predetermined values until the number of inter-prediction information candidates included in the inter-prediction information candidate list reaches the designated number of inter-prediction information candidates when the number of inter-prediction information candidates included in the constructed inter-prediction information candidate list is smaller than the designated number of inter-prediction information candidates and adds the derived inter-prediction information candidates to the constructed inter-prediction information candidate list; and a motion-compensated prediction unit that selects one inter-prediction information candidate from the inter-prediction information candidates included in the inter-prediction information candidate list and performs inter-prediction on the coding target prediction block using the selected inter-prediction information candidate.

[Item 2]

A moving picture coding device that codes moving pictures using motion-compensated prediction in units of blocks obtained by partitioning each picture of the moving pictures, comprising:

a prediction information coding unit that codes information indicating a designated number of inter-prediction information candidates;

a prediction information deriving unit that derives the inter-prediction information candidates from inter-prediction information of a prediction block neighboring to a coding target prediction block or a prediction block present at the same position as or near the coding target prediction block in a coded picture at a temporally different position from the coding target prediction block;

a candidate list constructing unit that constructs an inter-prediction information candidate list from the derived inter-prediction information candidates;

a candidate adding unit that derives inter-prediction information candidates of which the prediction mode, the reference index, and the motion vector have predetermined values when the number of inter-prediction information candidates included in the constructed inter-prediction information candidate list is smaller than the designated number of inter-prediction information candidates and adds the derived inter-prediction information candidates to the constructed inter-prediction information candidate list and that derives one or a plurality of inter-prediction information candidates of which at least one of the prediction mode, the reference index, and the motion vector is changed from that of the inter-prediction information candidates having the predetermined value when the number of inter-prediction information candidates included in the added inter-prediction information candidate list is smaller than the designated number of inter-prediction information candidates and additionally adds the derived inter-prediction information candidates to the added inter-prediction information candidate list;

a candidate supplementing unit that derives inter-prediction information candidates of which the prediction mode, the reference index, and the motion vector have predetermined values until the number of inter-prediction information candidates included in the additionally added inter-prediction information candidate list reaches the designated number of inter-prediction information candidates when the number of inter-prediction information candidates included in the additionally added inter-prediction information candidate list is smaller than the designated number of inter-prediction information candidates and additionally adds the derived inter-prediction information candidates to the additionally added inter-prediction information candidate list; and a motion-compensated prediction unit that selects one inter-prediction information candidate from the inter-prediction information candidates included in the inter-prediction information candidate list and performs inter-prediction on the coding target prediction block using the selected inter-prediction information candidate.

[Item 3]

A moving picture coding device that codes a bitstream obtained by coding moving pictures using motion-compensated prediction in units of blocks obtained by partitioning each picture of the moving pictures, comprising:

a prediction information coding unit that codes information indicating a designated number of inter-prediction information candidates;

a prediction information deriving unit that derives the inter-prediction information candidates from inter-prediction information of a prediction block neighboring to a coding target prediction block or a prediction block present at the same position as or near the coding target prediction block in a coded picture at a temporally different position from the coding target prediction block;

a candidate list constructing unit that constructs an inter-prediction information candidate list from the derived inter-prediction information candidates;

a candidate supplementing unit that derives inter-prediction information candidates of which the prediction mode, the reference index, and the motion vector have predetermined values when the number of inter-prediction information candidates included in the constructed inter-prediction information candidate list is smaller than the designated number of inter-prediction information candidates and adds the derived inter-prediction information candidates to the constructed inter-prediction information candidate list, that derives one or a plurality of inter-prediction information candidates of which the prediction mode and the motion vector have the same value as and the reference index is changed from that of the inter-prediction information candidates having the predetermined value when the number of inter-prediction information candidates included in the added inter-prediction information candidate list is smaller than the designated number of inter-prediction information candidates and additionally adds the derived inter-prediction information candidates to the added inter-prediction information candidate list, and that derives inter-prediction information candidates of which the prediction mode, the reference index, and the motion vector have predetermined values until the number of inter-prediction information candidates included in the additionally added inter-prediction information candidate list reaches the designated number of inter-prediction information candidates when the number of inter-prediction information candidates included in the additionally added inter-prediction information candidate list is smaller than the designated number of inter-prediction information candidates and additionally adds the derived inter-prediction information candidates to the additionally added inter-prediction information candidate list; and a motion-compensated prediction unit that selects one inter-prediction information candidate from the inter-prediction information candidates included in the inter-prediction information candidate list and performs inter-prediction on the coding target prediction block using the selected inter-prediction information candidate.

[Item 4]

The moving picture coding device according to any one of items 1 to 3, wherein the candidate supplementing unit adds an inter-prediction information candidate of a prediction mode corresponding to a slice type.

[Item 5]

The moving picture coding device according to any one of items 1 to 3, wherein the candidate supplementing unit adds an inter-prediction information candidate of which the prediction mode is bi-prediction for B-slices of the picture and is L0 prediction for P-slices of the picture.

[Item 6]

The moving picture coding device according to any one of items 1 to 3, wherein
the candidate supplementing unit adds an inter-prediction information candidate of which the value of the reference index is 0.

[Item 7]

The moving picture coding device according to any one of items 1 to 3, wherein
the candidate supplementing unit adds an inter-prediction information candidate of which the value of the motion vector is (0, 0).

[Item 8]

A moving picture coding device that codes moving pictures using motion-compensated prediction in units of blocks obtained by partitioning each picture of the moving pictures, comprising:
a prediction information deriving unit that stores and initializes a designated number of inter-prediction information candidates having predetermined prediction mode, reference index, and motion vector in advance in an inter-prediction information candidate list in which the designated number of inter-prediction information candidates are stored, and then, derives inter-prediction information candidates from inter-prediction information of a prediction block neighboring to a coding target prediction block or a prediction block present at the same position as or near the coding target prediction block in a coded picture at a temporally different position from the coding target prediction block; and
a motion-compensated prediction unit that selects one inter-prediction information candidate from the inter-prediction information candidates included in the inter-prediction information candidate list and performs inter-prediction on the coding target prediction block using the selected inter-prediction information candidate.

[Item 9]

A moving picture coding device that codes moving pictures using motion-compensated prediction in units of blocks obtained by partitioning each picture of the moving pictures, comprising:
a prediction information coding unit that codes information indicating a designated number of inter-prediction information candidates;
a prediction information deriving unit that derives inter-prediction information candidates based on the number of candidates designated as the number of inter-prediction information candidates from inter-prediction information of a prediction block neighboring to a coding target prediction block or a prediction block present at the same position as or near the coding target prediction block in a coded picture at a temporally different position from the coding target prediction block;
a candidate list constructing unit that constructs an inter-prediction information candidate list from the derived inter-prediction information candidates; and
a motion-compensated prediction unit that selects one inter-prediction information candidate from inter-prediction information candidates included in the inter-prediction information candidate list when the designated number of candidates is larger than or equal to 1 and performs inter-prediction on the coding target prediction block using the selected inter-prediction information candidate and that performs inter-prediction on the coding target prediction block using inter-prediction information having a predetermined value when the designated number of candidates is 0.

[Item 10]

A moving picture coding device that codes moving pictures using motion-compensated prediction in units of blocks obtained by partitioning each picture of the moving pictures, comprising:
a prediction information deriving unit that derives inter-prediction information candidates from inter-prediction information of a prediction block neighboring to a coding target prediction block or a prediction block present at the same position as or near the coding target prediction block in a coded picture at a temporally different position from the coding target prediction block;
a candidate supplementing unit that supplements inter-prediction information candidates having the same prediction mode, reference index, and motion vector until the number of inter-prediction information candidates reaches the designated number of candidates when the number of inter-prediction information candidates is smaller than the designated number of candidates; and
a motion-compensated prediction unit that selects one inter-prediction information candidate from the inter-prediction information candidates and performs inter-prediction on the coding target prediction block using the selected inter-prediction information candidate.

[Item 11]

A moving picture coding method of coding moving pictures using motion-compensated prediction in units of blocks obtained by partitioning each picture of the moving pictures, comprising:
a prediction information coding step of coding information indicating a designated number of inter-prediction information candidates;
a prediction information deriving step of deriving the inter-prediction information candidates from inter-prediction information of a prediction block neighboring to a coding target prediction block or a prediction block present at the same position as or near the coding target prediction block in a coded picture at a temporally different position from the coding target prediction block;
a candidate list constructing step of constructing an inter-prediction information candidate list from the derived inter-prediction information candidates;
a candidate supplementing step of deriving inter-prediction information candidates of which the prediction mode, the reference index, and the motion vector have predetermined values until the number of inter-prediction information candidates included in the inter-prediction information candidate list reaches the designated number of inter-prediction information candidates when the number of inter-prediction information candidates included in the constructed inter-prediction information candidate list is smaller than the designated number of inter-prediction information candidates and adding the derived inter-prediction information candidates to the constructed inter-prediction information candidate list; and
a motion-compensated prediction step of selecting one inter-prediction information candidate from the inter-prediction information candidates included in the inter-prediction information candidate list and performing inter-prediction on the coding target prediction block using the selected inter-prediction information candidate.

[Item 12]

A moving picture coding method of coding moving pictures using motion-compensated prediction in units of blocks obtained by partitioning each picture of the moving pictures, comprising:

a prediction information number coding step of coding information indicating a designated number of inter-prediction information candidates;

a prediction information deriving step of deriving the inter-prediction information candidates from inter-prediction information of a prediction block neighboring to a coding target prediction block or a prediction block present at the same position as or near the coding target prediction block in a coded picture at a temporally different position from the coding target prediction block;

a candidate list constructing step of constructing an inter-prediction information candidate list from the derived inter-prediction information candidates;

a candidate adding step of deriving inter-prediction information candidates of which the prediction mode, the reference index, and the motion vector have predetermined values when the number of inter-prediction information candidates included in the constructed inter-prediction information candidate list is smaller than the designated number of inter-prediction information candidates and adding the derived inter-prediction information candidates to the constructed inter-prediction information candidate list, and deriving one or a plurality of inter-prediction information candidates of which at least one of the prediction mode, the reference index, and the motion vector is changed from that of the inter-prediction information candidates having the predetermined value when the number of inter-prediction information candidates included in the added inter-prediction information candidate list is smaller than the designated number of inter-prediction information candidates and additionally adding the derived inter-prediction information candidates to the added inter-prediction information candidate list;

a candidate supplementing step of deriving inter-prediction information candidates of which the prediction mode, the reference index, and the motion vector have predetermined values until the number of inter-prediction information candidates included in the additionally added inter-prediction information candidate list reaches the designated number of inter-prediction information candidates when the number of inter-prediction information candidates included in the additionally added inter-prediction information candidate list is smaller than the designated number of inter-prediction information candidates and additionally adding the derived inter-prediction information candidates to the additionally added inter-prediction information candidate list; and a motion-compensated prediction step of selecting one inter-prediction information candidate from the inter-prediction information candidates included in the inter-prediction information candidate list and performing inter-prediction on the coding target prediction block using the selected inter-prediction information candidate.

[Item 13]

A moving picture coding method of coding a bitstream obtained by coding moving pictures using motion-compensated prediction in units of blocks obtained by partitioning each picture of the moving pictures, comprising:

a prediction information number coding step of coding information indicating a designated number of inter-prediction information candidates;

a prediction information deriving step of deriving the inter-prediction information candidates from inter-prediction information of a prediction block neighboring to a coding target prediction block or a prediction block present at the same position as or near the coding target prediction block in a coded picture at a temporally different position from the coding target prediction block;

a candidate list constructing step of constructing an inter-prediction information candidate list from the derived inter-prediction information candidates;

a candidate supplementing step of deriving inter-prediction information candidates of which the prediction mode, the reference index, and the motion vector have predetermined values when the number of inter-prediction information candidates included in the constructed inter-prediction information candidate list is smaller than the designated number of inter-prediction information candidates and adding the derived inter-prediction information candidates to the constructed inter-prediction information candidate list, deriving one or a plurality of inter-prediction information candidates of which the prediction mode and the motion vector have the same value as and the reference index is changed from that of the inter-prediction information candidates having the predetermined value when the number of inter-prediction information candidates included in the added inter-prediction information candidate list is smaller than the designated number of inter-prediction information candidates and additionally adds the derived inter-prediction information candidates to the added inter-prediction information candidate list, and deriving inter-prediction information candidates of which the prediction mode, the reference index, and the motion vector have predetermined values until the number of inter-prediction information candidates included in the additionally added inter-prediction information candidate list reaches the designated number of inter-prediction information candidates when the number of inter-prediction information candidates included in the additionally added inter-prediction information candidate list is smaller than the designated number of inter-prediction information candidates and additionally adding the derived inter-prediction information candidates to the additionally added inter-prediction information candidate list; and a motion-compensated prediction step of selecting one inter-prediction information candidate from the inter-prediction information candidates included in the inter-prediction information candidate list and performing inter-prediction on the coding target prediction block using the selected inter-prediction information candidate.

[Item 14]

A moving picture coding method of coding moving pictures using motion-compensated prediction in units of blocks obtained by partitioning each picture of the moving pictures, comprising:

a prediction information deriving step of storing and initializing a designated number of inter-prediction information candidates having predetermined prediction mode, reference index, and motion vector in advance in an inter-prediction information candidate list in which the designated number of inter-prediction information candidates are stored, and then, deriving inter-prediction information candidates from inter-prediction information of a prediction block neighboring to a coding target prediction block or a prediction block present at the same position as or near the coding target prediction block in a coded picture at a temporally different position from the coding target prediction block; and a motion-compensated prediction step of selecting one inter-prediction information candidate from the inter-prediction information candidates included in the inter-prediction information candidate list and performing inter-prediction on the coding target prediction block using the selected inter-prediction information candidate.

[Item 15]

A moving picture coding method of coding moving pictures using motion-compensated prediction in units of blocks obtained by partitioning each picture of the moving pictures, comprising:

a prediction information number coding step of coding information indicating a designated number of inter-prediction information candidates;

a prediction information deriving step of deriving inter-prediction information candidates based on the number of candidates designated as the number of inter-prediction information candidates from inter-prediction information of a prediction block neighboring to a coding target prediction block or a prediction block present at the same position as or near the coding target prediction block in a coded picture at a temporally different position from the coding target prediction block;

a candidate list constructing step of constructing an inter-prediction information candidate list from the derived inter-prediction information candidates; and a motion-compensated prediction step of selecting one inter-prediction information candidate from inter-prediction information candidates included in the inter-prediction information candidate list when the designated number of candidates is larger than or equal to 1 and performing inter-prediction of the coding target prediction block using the selected inter-prediction information candidate and performing inter-prediction on the coding target prediction block using inter-prediction information having a predetermined value when the designated number of candidates is 0.

[Item 16]

A moving picture coding program of coding moving pictures using motion-compensated prediction in units of blocks obtained by partitioning each picture of the moving pictures, causing a computer to execute:

a prediction information coding step of coding information indicating a designated number of inter-prediction information candidates;

a prediction information deriving step of deriving the inter-prediction information candidates from inter-prediction information of a prediction block neighboring to a coding target prediction block or a prediction block present at the same position as or near the coding target prediction block in a coded picture at a temporally different position from the coding target prediction block;

a candidate list constructing step of constructing an inter-prediction information candidate list from the derived inter-prediction information candidates;

a candidate supplementing step of deriving inter-prediction information candidates of which the prediction mode, the reference index, and the motion vector have predetermined values until the number of inter-prediction information candidates included in the inter-prediction information candidate list reaches the designated number of inter-prediction information candidates when the number of inter-prediction information candidates included in the constructed inter-prediction information candidate list is smaller than the designated number of inter-prediction information candidates and adding the derived inter-prediction information candidates to the constructed inter-prediction information candidate list; and a motion-compensated prediction step of selecting one inter-prediction information candidate from the inter-prediction information candidates included in the inter-prediction information candidate list and performing inter-prediction on the coding target prediction block using the selected inter-prediction information candidate.

[Item 17]

A moving picture coding program of coding moving pictures using motion-compensated prediction in units of blocks obtained by partitioning each picture of the moving pictures, causing a computer to execute:

a prediction information number coding step of coding information indicating a designated number of inter-prediction information candidates;

a prediction information deriving step of deriving the inter-prediction information candidates from inter-prediction information of a prediction block neighboring to a coding target prediction block or a prediction block present at the same position as or near the coding target prediction block in a coded picture at a temporally different position from the coding target prediction block;

a candidate list constructing step of constructing an inter-prediction information candidate list from the derived inter-prediction information candidates;

a candidate adding step of deriving inter-prediction information candidates of which the prediction mode, the reference index, and the motion vector have predetermined values when the number of inter-prediction information candidates included in the constructed inter-prediction information candidate list is smaller than the designated number of inter-prediction information candidates and adding the derived inter-prediction information candidates to the constructed inter-prediction information candidate list, and deriving one or a plurality of inter-prediction information candidates of which at least one of the prediction mode, the reference index, and the motion vector is changed from that of the inter-prediction information candidates having the predetermined value when the number of inter-prediction information candidates included in the added inter-prediction information candidate list is smaller than the designated number of inter-prediction information candidates and additionally adding the derived inter-prediction information candidates to the added inter-prediction information candidate list;

a candidate supplementing step of deriving inter-prediction information candidates of which the prediction mode, the reference index, and the motion vector have predetermined values until the number of inter-prediction information candidates included in the additionally added inter-prediction information candidate list reaches the designated number of inter-prediction information candidates when the number of inter-prediction information candidates included in the additionally added inter-prediction information candidate list is smaller than the designated number of inter-prediction information candidates and additionally adding the derived inter-prediction information candidates to the additionally added inter-prediction information candidate list; and a motion-compensated prediction step of selecting one inter-prediction information candidate from the inter-prediction information candidates included in the inter-prediction information candidate list and performing inter-prediction on the coding target prediction block using the selected inter-prediction information candidate.

[Item 18]

A moving picture coding program of coding a bitstream obtained by coding moving pictures using motion-compensated prediction in units of blocks obtained by partitioning each picture of the moving pictures, causing a computer to execute:

a prediction information number coding step of coding information indicating a designated number of inter-prediction information candidates;

a prediction information deriving step of deriving the inter-prediction information candidates from inter-prediction information of a prediction block neighboring to a coding target prediction block or a prediction block present at the same position as or near the coding target prediction block in a coded picture at a temporally different position from the coding target prediction block;

a candidate list constructing step of constructing an inter-prediction information candidate list from the derived inter-prediction information candidates;

a candidate adding step of deriving inter-prediction information candidates of which the prediction mode, the reference index, and the motion vector have predetermined values when the number of inter-prediction information candidates included in the constructed inter-prediction information candidate list is smaller than the designated number of inter-prediction information candidates and adding the derived inter-prediction information candidates to the constructed inter-prediction information candidate list, deriving one or a plurality of inter-prediction information candidates of which the prediction mode and the motion vector have the same value as and the reference index is changed from that of the inter-prediction information candidates having the predetermined value when the number of inter-prediction information candidates included in the added inter-prediction information candidate list is smaller than the designated number of inter-prediction information candidates and additionally adds the derived inter-prediction information candidates to the added inter-prediction information candidate list, and deriving inter-prediction information candidates of which the prediction mode, the reference index, and the motion vector have predetermined values until the number of inter-prediction information candidates included in the additionally added inter-prediction information candidate list reaches the designated number of inter-prediction information candidates when the number of inter-prediction information candidates included in the additionally added inter-prediction information candidate list is smaller than the designated number of inter-prediction information candidates and additionally adding the derived inter-prediction information candidates to the additionally added inter-prediction information candidate list; and a motion-compensated prediction step of selecting one inter-prediction information candidate from the inter-prediction information candidates included in the inter-prediction information candidate list and performing inter-prediction on the coding target prediction block using the selected inter-prediction information candidate.

[Item 19]

A moving picture coding program of coding moving pictures using motion-compensated prediction in units of blocks obtained by partitioning each picture of the moving pictures, causing a computer to execute:

a prediction information deriving step of storing and initializing a designated number of inter-prediction information candidates having predetermined prediction mode, reference index, and motion vector in advance in an inter-prediction information candidate list in which the designated number of inter-prediction information candidates are stored, and then, deriving inter-prediction information candidates from inter-prediction information of a prediction block neighboring to a coding target prediction block or a prediction block present at the same position as or near the coding target prediction block in a coded picture at a temporally different position from the coding target prediction block; and a motion-compensated prediction step of selecting one inter-prediction information candidate from the inter-prediction information candidates included in the inter-prediction information candidate list and performing inter-prediction on the coding target prediction block using the selected inter-prediction information candidate.

[Item 20]

A moving picture coding program of coding moving pictures using motion-compensated prediction in units of blocks obtained by partitioning each picture of the moving pictures, causing a computer to execute:

a prediction information number coding step of coding information indicating a designated number of inter-prediction information candidates;

a prediction information deriving step of deriving inter-prediction information candidates based on the number of candidates designated as the number of inter-prediction information candidates from inter-prediction information of a prediction block neighboring to a coding target prediction block or a prediction block present at the same position as or near the coding target prediction block in a coded picture at a temporally different position from the coding target prediction block;

a candidate list constructing step of constructing an inter-prediction information candidate list from the derived inter-prediction information candidates; and a motion-compensated prediction step of selecting one inter-prediction information candidate from inter-prediction information candidates included in the inter-prediction information candidate list when the designated number of candidates is larger than or equal to 1 and performing inter-prediction on the coding target prediction block using the selected inter-prediction information candidate and performing inter-prediction on the coding target prediction block using inter-prediction information having a predetermined value when the designated number of candidates is 0.

[Item 21]

A transmitter comprising:

a packet processor that packetizes a bitstream coded according to a moving picture coding method of coding moving pictures using motion-compensated prediction in units of blocks obtained by partitioning each picture of the moving pictures to obtain the packetized bitstream; and a transmitting unit that transmits the packetized bitstream, the moving picture coding method comprising:

a prediction information number coding step of coding information indicating a designated number of inter-prediction information candidates;

a prediction information deriving step of deriving the inter-prediction information candidates from inter-prediction information of a prediction block neighboring to a coding target prediction block or a prediction block present at the same position as or near the coding target prediction block in a coded picture at a temporally different position from the coding target prediction block;

a candidate list constructing step of constructing an inter-prediction information candidate list from the derived inter-prediction information candidates;

a candidate adding step of deriving inter-prediction information candidates of which the prediction mode, the reference index, and the motion vector have predetermined values when the number of inter-prediction information candidates included in the constructed inter-prediction information candidate list is smaller than the designated number of inter-prediction information candidates and adding the derived inter-prediction information candidates to the constructed inter-prediction information candidate list, and deriving one or a plurality of inter-prediction information candidates of which at least one of the prediction mode, the reference index, and the motion vector is changed from that of the inter-prediction information candidates having the predetermined value when the number of inter-prediction information candidates included in the added inter-prediction information candidate list is smaller than the designated number of inter-prediction information candidates and additionally adding the derived inter-prediction information candidates to the added inter-prediction information candidate list;

a candidate supplementing step of deriving inter-prediction information candidates of which the prediction mode, the reference index, and the motion vector have predetermined values until the number of inter-prediction information candidates included in the additionally added inter-prediction information candidate list reaches the designated number of inter-prediction information candidates when the number of inter-prediction information candidates included in the additionally added inter-prediction information candidate list is smaller than the designated number of inter-prediction information candidates and additionally adding the derived inter-prediction information candidates to the additionally added inter-prediction information candidate list; and a motion-compensated prediction step of selecting one inter-prediction information candidate from the inter-prediction information candidates included in the inter-prediction information candidate list and performing inter-prediction on the coding target prediction block using the selected inter-prediction information candidate.

[Item 22]

A transmission method comprising:

a packet processing step of packetizing a bitstream coded according to a moving picture coding method of coding moving pictures using motion-compensated prediction in units of blocks obtained by partitioning each picture of the moving pictures to obtain the packetized bitstream; and a transmitting step of transmitting the packetized bitstream, the moving picture coding method comprising:

a prediction information number coding step of coding information indicating a designated number of inter-prediction information candidates;

a prediction information deriving step of deriving the inter-prediction information candidates from inter-prediction information of a prediction block neighboring to a coding target prediction block or a prediction block present at the same position as or near the coding target prediction block in a coded picture at a temporally different position from the coding target prediction block;

a candidate list constructing step of constructing an inter-prediction information candidate list from the derived inter-prediction information candidates;

a candidate adding step of deriving inter-prediction information candidates of which the prediction mode, the reference index, and the motion vector have predetermined values when the number of inter-prediction information candidates included in the constructed inter-prediction information candidate list is smaller than the designated number of inter-prediction information candidates and adding the derived inter-prediction information candidates to the constructed inter-prediction information candidate list, and deriving one or a plurality of inter-prediction information candidates of which at least one of the prediction mode, the reference index, and the motion vector is changed from that of the inter-prediction information candidates having the predetermined value when the number of inter-prediction information candidates included in the added inter-prediction information candidate list is smaller than the designated number of inter-prediction information candidates and additionally adding the derived inter-prediction information candidates to the added inter-prediction information candidate list;

a candidate supplementing step of deriving inter-prediction information candidates of which the prediction mode, the reference index, and the motion vector have predetermined values until the number of inter-prediction information candidates included in the additionally added inter-prediction information candidate list reaches the designated number of inter-prediction information candidates when the number of inter-prediction information candidates included in the additionally added inter-prediction information candidate list is smaller than the designated number of inter-prediction information candidates and additionally adding the derived inter-prediction information candidates to the additionally added inter-prediction information candidate list; and a motion-compensated prediction step of selecting one inter-prediction information candidate from the inter-prediction information candidates included in the inter-prediction information candidate list and performing inter-prediction on the coding target prediction block using the selected inter-prediction information candidate.

[Item 23]

A transmission program for causing a computer to execute:

a packet processing step of packetizing a bitstream coded according to a moving picture coding method of coding moving pictures using motion-compensated prediction in units of blocks obtained by partitioning each picture of the moving pictures to obtain the packetized bitstream; and a transmitting step of transmitting the packetized bitstream, the moving picture coding method comprising:

a prediction information number coding step of coding information indicating a designated number of inter-prediction information candidates;

a prediction information deriving step of deriving the inter-prediction information candidates from inter-prediction information of a prediction block neighboring to a coding target prediction block or a prediction block present at the same position as or near the coding target prediction block in a coded picture at a temporally different position from the coding target prediction block;

a candidate list constructing step of constructing an inter-prediction information candidate list from the derived inter-prediction information candidates;

a candidate adding step of deriving inter-prediction information candidates of which the prediction mode, the reference index, and the motion vector have predetermined values when the number of inter-prediction information candidates included in the constructed inter-prediction information candidate list is smaller than the designated number of inter-prediction information candidates and adding the derived inter-prediction information candidates to the constructed inter-prediction information candidate list, and deriving one or a plurality of inter-prediction information candidates of which at least one of the prediction mode, the reference index, and the motion vector is changed from that of the inter-prediction information candidates having the predetermined value when the number of inter-prediction information candidates included in the added inter-prediction information candidate list is smaller than the designated number of inter-prediction information candidates and additionally adding the derived inter-prediction information candidates to the added inter-prediction information candidate list;

a candidate supplementing step of deriving inter-prediction information candidates of which the prediction mode, the reference index, and the motion vector have predetermined values until the number of inter-prediction information candidates included in the additionally added inter-prediction information candidate list reaches the designated number of inter-prediction information candidates when the number of inter-prediction information candidates included in the additionally added inter-prediction information candidate list is smaller than the designated number of inter-prediction information candidates and additionally adding the derived inter-prediction information candidates to the additionally added inter-prediction information candidate list; and a motion-compensated prediction step of selecting one inter-prediction information candidate from the inter-prediction information candidates included in the inter-prediction information candidate list and performing inter-prediction on the coding target prediction block using the selected inter-prediction information candidate.

[Item 24]

A moving picture decoding device that decodes a bitstream obtained by coding moving pictures using motion-compensated prediction in units of blocks obtained by partitioning each picture of the moving pictures, comprising:

a prediction information decoding unit that decodes information indicating a previously designated number of inter-prediction information candidates;

a prediction information deriving unit that derives the inter-prediction information candidates from inter-prediction information of a prediction block neighboring to a decoding target prediction block or a prediction block present at the same position as or near the decoding target prediction block in a decoded picture at a temporally different position from the decoding target prediction block;

a candidate list constructing unit that constructs an inter-prediction information candidate list from the derived inter-prediction information candidates;

a candidate supplementing unit that derives inter-prediction information candidates of which the prediction mode, the reference index, and the motion vector have predetermined values until the number of inter-prediction information candidates included in the inter-prediction information candidate list reaches the designated number of inter-prediction information candidates when the number of inter-prediction information candidates included in the constructed inter-prediction information candidate list is smaller than the designated number of inter-prediction information candidates and adds the derived inter-prediction information candidates to the constructed inter-prediction information candidate list; and a motion-compensated prediction unit that selects one inter-prediction information candidate from the inter-prediction information candidates included in the inter-prediction information candidate list and performs inter-prediction on the decoding target prediction block using the selected inter-prediction information candidate.

[Item 25]

A moving picture decoding device that decodes a bitstream obtained by coding moving pictures using motion-compensated prediction in units of blocks obtained by partitioning each picture of the moving pictures, comprising:

a prediction information decoding unit that decodes information indicating a previously designated number of inter-prediction information candidates;

a prediction information deriving unit that derives the inter-prediction information candidates from inter-prediction information of a prediction block neighboring to a decoding target prediction block or a prediction block present at the same position as or near the decoding target prediction block in a decoded picture at a temporally different position from the decoding target prediction block;

a candidate list constructing unit that constructs an inter-prediction information candidate list from the derived inter-prediction information candidates;

a candidate adding unit that derives inter-prediction information candidates of which the prediction mode, the reference index, and the motion vector have predetermined values when the number of inter-prediction information candidates included in the constructed inter-prediction information candidate list is smaller than the designated number of inter-prediction information candidates and adds the derived inter-prediction information candidates to the constructed inter-prediction information candidate list and that derives one or a plurality of inter-prediction information candidates of which at least one of the prediction mode, the reference index, and the motion vector is changed from that of the inter-prediction information candidates having the predetermined value when the number of inter-prediction information candidates included in the added inter-prediction information candidate list is smaller than the designated number of inter-prediction information candidates and additionally adds the derived inter-prediction information candidates to the added inter-prediction information candidate list;

a candidate supplementing unit that derives inter-prediction information candidates of which the prediction mode, the reference index, and the motion vector have predetermined values until the number of inter-prediction information candidates included in the additionally added inter-prediction information candidate list reaches the designated number of inter-prediction information candidates when the number of inter-prediction information candidates included in the additionally added inter-prediction information candidate list is smaller than the designated number of inter-prediction information candidates and additionally adds the derived inter-prediction information candidates to the additionally added inter-prediction information candidate list; and a motion-compensated prediction unit that selects one inter-prediction information candidate from the inter-prediction information candidates included in the inter-prediction information candidate list and performs inter-prediction on the decoding target prediction block using the selected inter-prediction information candidate.

[Item 26]

A moving picture decoding device that decodes a bitstream obtained by coding moving pictures using motion-compensated prediction in units of blocks obtained by partitioning each picture of the moving pictures, comprising:

a prediction information decoding unit that decodes information indicating a previously designated number of inter-prediction information candidates;

a prediction information deriving unit that derives the inter-prediction information candidates from inter-prediction information of a prediction block neighboring to a decoding target prediction block or a prediction block present at the same position as or near the decoding target prediction block in a decoded picture at a temporally different position from the decoding target prediction block;

a candidate list constructing unit that constructs an inter-prediction information candidate list from the derived inter-prediction information candidates;

a candidate supplementing unit that derives inter-prediction information candidates of which the prediction mode, the reference index, and the motion vector have predetermined values when the number of inter-prediction information candidates included in the constructed inter-prediction information candidate list is smaller than the designated number of inter-prediction information candidates and adds the derived inter-prediction information candidates to the constructed inter-prediction information candidate list, that derives one or a plurality of inter-prediction information candidates of which the prediction mode and the motion vector have the same value as and the reference index is changed from that of the inter-prediction information candidates having the predetermined value when the number of inter-prediction information candidates included in the added inter-prediction information candidate list is smaller than the designated number of inter-prediction information candidates and additionally adds the derived inter-prediction information candidates to the added inter-prediction information candidate list, and that derives inter-prediction information candidates of which the prediction mode, the reference index, and the motion vector have predetermined values until the number of inter-prediction information candidates included in the additionally added inter-prediction information candidate list reaches the designated number of inter-prediction information candidates when the number of inter-prediction information candidates included in the additionally added inter-prediction information candidate list is smaller than the designated number of inter-prediction information candidates and additionally adds the derived inter-prediction information candidates to the additionally added inter-prediction information candidate list; and a motion-compensated prediction unit that selects one inter-prediction information candidate from the inter-prediction information candidates included in the inter-prediction information candidate list and performs inter-prediction on the decoding target prediction block using the selected inter-prediction information candidate.

[Item 27]

The moving picture coding device according to any one of items 24 to 26, wherein the candidate supplementing unit adds an inter-prediction information candidate of a prediction mode corresponding to a slice type.

[Item 28]

The moving picture coding device according to any one of items 24 to 26, wherein the candidate supplementing unit adds an inter-prediction information candidate of which the prediction mode is bi-prediction for B-slices of the picture and is L0 prediction for P-slices of the picture.

[Item 29]

The moving picture coding device according to any one of items 24 to 26, wherein the candidate supplementing unit adds an inter-prediction information candidate of which the value of the reference index is 0.

[Item 30]

The moving picture coding device according to any one of items 24 to 26, wherein the candidate supplementing unit adds an inter-prediction information candidate of which the value of the motion vector is (0, 0).

[Item 31]

A moving picture decoding device that decodes a bitstream obtained by coding moving pictures using motion-compensated prediction in units of blocks obtained by partitioning each picture of the moving pictures, comprising:

a prediction information decoding unit that a designated number of inter-prediction information candidates;

a prediction information deriving unit that stores and initializes a designated number of inter-prediction information candidates having predetermined prediction mode, reference index, and motion vector in advance in an inter-prediction information candidate list in which the designated number of inter-prediction information candidates are stored, and then, derives inter-prediction information candidates from inter-prediction information of a prediction block neighboring to a decoding target prediction block or a prediction block present at the same position as or near the decoding target prediction block in a decoded picture at a temporally different position from the decoding target prediction block; and a motion-compensated prediction unit that selects one inter-prediction information candidate from the inter-prediction information candidates included in the inter-prediction information candidate list and performs inter-prediction on the decoding target prediction block using the selected inter-prediction information candidate.

[Item 32]

A moving picture decoding device that decodes moving pictures using motion-compensated prediction in units of blocks obtained by partitioning each picture of the moving pictures, comprising:

a prediction information decoding unit that decodes information indicating a designated number of inter-prediction information candidates;

a prediction information deriving unit that derives inter-prediction information candidates based on the number of candidates designated as the number of inter-prediction information candidates from inter-prediction information of a prediction block neighboring to a decoding target prediction block or a prediction block present at the same position as or near the decoding target prediction block in a decoded picture at a temporally different position from the decoding target prediction block;

a candidate list constructing unit that constructs an inter-prediction information candidate list from the derived inter-prediction information candidates; and a motion-compensated prediction unit that selects one inter-prediction information candidate from inter-prediction information candidates included in the inter-prediction information candidate list when the designated number of candidates is larger than or equal to 1 and performs inter-prediction on the decoding target prediction block using the selected inter-prediction information candidate and that performs inter-prediction on the decoding target prediction block using inter-prediction information having a predetermined value when the designated number of candidates is 0.

[Item 33]

A moving picture decoding device that decodes a bitstream obtained by coding moving pictures using motion-compensated prediction in units of blocks obtained by partitioning each picture of the moving pictures, comprising:

a prediction information deriving unit that derives inter-prediction information candidates from inter-prediction information of a prediction block neighboring to a decoding target prediction block or a prediction block present at the same position as or near the decoding target prediction block in a decoded picture at a temporally different position from the decoding target prediction block;

a candidate supplementing unit that supplements inter-prediction information candidates having the same prediction mode, reference index, and motion vector until the number of inter-prediction information candidates reaches the designated number of candidates when the number of inter-prediction information candidates is smaller than the designated number of candidates; and a motion-compensated prediction unit that selects one inter-prediction information candidate from the inter-prediction information candidates and performs inter-prediction on the decoding target prediction block using the selected inter-prediction information candidate.

[Item 34]

A moving picture decoding method of decoding a bitstream obtained by coding moving pictures using motion-compensated prediction in units of blocks obtained by partitioning each picture of the moving pictures, comprising:

a prediction information decoding step of coding information indicating a previously designated number of inter-prediction information candidates;

a prediction information deriving step of deriving the inter-prediction information candidates from inter-prediction information of a prediction block neighboring to a decoding target prediction block or a prediction block present at the same position as or near the decoding target prediction block in a decoded picture at a temporally different position from the decoding target prediction block;

a candidate list constructing step of constructing an inter-prediction information candidate list from the derived inter-prediction information candidates;

a candidate supplementing step of deriving inter-prediction information candidates of which the prediction mode, the reference index, and the motion vector have predetermined values until the number of inter-prediction information candidates included in the inter-prediction information candidate list reaches the designated number of inter-prediction information candidates when the number of inter-prediction information candidates included in the constructed inter-prediction information candidate list is smaller than the designated number of inter-prediction information candidates and adding the derived inter-prediction information candidates to the constructed inter-prediction information candidate list; and a motion-compensated prediction step of selecting one inter-prediction information candidate from the inter-prediction information candidates included in the inter-prediction information candidate list and performing inter-prediction on the decoding target prediction block using the selected inter-prediction information candidate.

[Item 35]

A moving picture decoding method of decoding a bitstream obtained by coding moving pictures using motion-compensated prediction in units of blocks obtained by partitioning each picture of the moving pictures, comprising:

a prediction information number decoding step of decoding information indicating a previously designated number of inter-prediction information candidates;

a prediction information deriving step of deriving the inter-prediction information candidates from inter-prediction information of a prediction block neighboring to a decoding target prediction block or a prediction block present at the same position as or near the decoding target prediction block in a decoded picture at a temporally different position from the decoding target prediction block;

a candidate list constructing step of constructing an inter-prediction information candidate list from the derived inter-prediction information candidates;

a candidate adding step of deriving inter-prediction information candidates of which the prediction mode, the reference index, and the motion vector have predetermined values when the number of inter-prediction information candidates included in the constructed inter-prediction information candidate list is smaller than the designated number of inter-prediction information candidates and adding the derived inter-prediction information candidates to the constructed inter-prediction information candidate list, and deriving one or a plurality of inter-prediction information candidates of which at least one of the prediction mode, the reference index, and the motion vector is changed from that of the inter-prediction information candidates having the predetermined value when the number of inter-prediction information candidates included in the added inter-prediction information candidate list is smaller than the designated number of inter-prediction information candidates and additionally adding the derived inter-prediction information candidates to the added inter-prediction information candidate list;

a candidate supplementing step of deriving inter-prediction information candidates of which the prediction mode, the reference index, and the motion vector have predetermined values until the number of inter-prediction information candidates included in the additionally added inter-prediction information candidate list reaches the designated number of inter-prediction information candidates when the number of inter-prediction information candidates included in the additionally added inter-prediction information candidate list is smaller than the designated number of inter-prediction information candidates and additionally adding the derived inter-prediction information candidates to the additionally added inter-prediction information candidate list; and a motion-compensated prediction step of selecting one inter-prediction information candidate from the inter-prediction information candidates included in the inter-prediction information candidate list and performing inter-prediction on the decoding target prediction block using the selected inter-prediction information candidate.

[Item 36]

A moving picture decoding method of decoding a bitstream obtained by coding moving pictures using motion-compensated prediction in units of blocks obtained by partitioning each picture of the moving pictures, comprising:

a prediction information number decoding step of decoding information indicating a previously designated number of inter-prediction information candidates;

a prediction information deriving step of deriving the inter-prediction information candidates from inter-prediction information of a prediction block neighboring to a decoding target prediction block or a prediction block present at the same position as or near the decoding target prediction block in a decoded picture at a temporally different position from the decoding target prediction block;

a candidate list constructing step of constructing an inter-prediction information candidate list from the derived inter-prediction information candidates;

a candidate adding step of deriving inter-prediction information candidates of which the prediction mode, the reference index, and the motion vector have predetermined values when the number of inter-prediction information candidates included in the constructed inter-prediction information candidate list is smaller than the designated number of inter-prediction information candidates and adding the derived inter-prediction information candidates to the constructed inter-prediction information candidate list, deriving one or a plurality of inter-prediction information candidates of which the prediction mode and the motion vector have the same value as and the reference index is changed from that of the inter-prediction information candidates having the predetermined value when the number of inter-prediction information candidates included in the added inter-prediction information candidate list is smaller than the designated number of inter-prediction information candidates and additionally adds the derived inter-prediction information candidates to the added inter-prediction information candidate list, and deriving inter-prediction information candidates of which the prediction mode, the reference index, and the motion vector have predetermined values until the number of inter-prediction information candidates included in the additionally added inter-prediction information candidate list reaches the designated number of inter-prediction information candidates when the number of inter-prediction information candidates included in the additionally added inter-prediction information candidate list is smaller than the designated number of inter-prediction information candidates and additionally adding the derived inter-prediction information candidates to the additionally added inter-prediction information candidate list; and a motion-compensated prediction step of selecting one inter-prediction information candidate from the inter-prediction information candidates included in the inter-prediction information candidate list and performing inter-prediction on the decoding target prediction block using the selected inter-prediction information candidate.

[Item 37]

A moving picture decoding method of decoding a bitstream obtained by coding moving pictures using motion-compensated prediction in units of blocks obtained by partitioning each picture of the moving pictures, comprising:

a prediction information number decoding step of decoding a designated number of inter-prediction information candidates;

a prediction information deriving step of storing and initializing a designated number of inter-prediction information candidates having predetermined prediction mode, reference index, and motion vector in advance in an inter-prediction information candidate list in which the designated number of inter-prediction information candidates are stored, and then, deriving inter-prediction information candidates from inter-prediction information of a prediction block neighboring to a decoding target prediction block or a prediction block present at the same position as or near the decoding target prediction block in a decoded picture at a temporally different position from the decoding target prediction block; and a motion-compensated prediction step of selecting one inter-prediction information candidate from the inter-prediction information candidates included in the inter-prediction information candidate list and performing inter-prediction on the decoding target prediction block using the selected inter-prediction information candidate.

[Item 38]

A moving picture decoding method of decoding moving pictures using motion-compensated prediction in units of blocks obtained by partitioning each picture of the moving pictures, comprising:

a prediction information number decoding step of decoding information indicating a previously designated number of inter-prediction information candidates;

a prediction information deriving step of deriving inter-prediction information candidates based on the number of candidates designated as the number of inter-prediction information candidates from inter-prediction information of a prediction block neighboring to a decoding target prediction block or a prediction block present at the same position as or near the decoding target prediction block in a decoded picture at a temporally different position from the decoding target prediction block;

a candidate list constructing step of constructing an inter-prediction information candidate list from the derived inter-prediction information candidates; and a motion-compensated prediction step of selecting one inter-prediction information candidate from inter-prediction information candidates included in the inter-prediction information candidate list when the designated number of candidates is larger than or equal to 1 and performing inter-prediction of the decoding target prediction block using the selected inter-prediction information candidate and performing inter-prediction of the decoding target prediction block using inter-prediction information having a predetermined value when the designated number of candidates is 0.

[Item 39]

A moving picture decoding program of decoding a bitstream obtained by coding moving pictures using motion-compensated prediction in units of blocks obtained by partitioning each picture of the moving pictures, causing a computer to execute:

a prediction information decoding step of coding information indicating a previously designated number of inter-prediction information candidates;

a prediction information deriving step of deriving the inter-prediction information candidates from inter-prediction information of a prediction block neighboring to a decoding target prediction block or a prediction block present at the same position as or near the decoding target prediction block in a decoded picture at a temporally different position from the decoding target prediction block;

a candidate list constructing step of constructing an inter-prediction information candidate list from the derived inter-prediction information candidates;

a candidate supplementing step of deriving inter-prediction information candidates of which the prediction mode, the reference index, and the motion vector have predetermined values until the number of inter-prediction information candidates included in the inter-prediction information candidate list reaches the designated number of inter-prediction information candidates when the number of inter-prediction information candidates included in the constructed inter-prediction information candidate list is smaller than the designated number of inter-prediction information candidates and adding the derived inter-prediction information candidates to the constructed inter-prediction information candidate list; and a motion-compensated prediction step of selecting one inter-prediction information candidate from the inter-prediction information candidates included in the inter-prediction information candidate list and performing inter-prediction on the decoding target prediction block using the selected inter-prediction information candidate.

[Item 40]

A moving picture decoding program of decoding a bitstream obtained by coding moving pictures using motion-compensated prediction in units of blocks obtained by partitioning each picture of the moving pictures, causing a computer to execute:

a prediction information number decoding step of decoding information indicating a previously designated number of inter-prediction information candidates;

a prediction information deriving step of deriving the inter-prediction information candidates from inter-prediction information of a prediction block neighboring to a decoding target prediction block or a prediction block present at the same position as or near the decoding target prediction block in a decoded picture at a temporally different position from the decoding target prediction block;

a candidate list constructing step of constructing an inter-prediction information candidate list from the derived inter-prediction information candidates;

a candidate adding step of deriving inter-prediction information candidates of which the prediction mode, the reference index, and the motion vector have predetermined values when the number of inter-prediction information candidates included in the constructed inter-prediction information candidate list is smaller than the designated number of inter-prediction information candidates and adding the derived inter-prediction information candidates to the constructed inter-prediction information candidate list, and deriving one or a plurality of inter-prediction information candidates of which at least one of the prediction mode, the reference index, and the motion vector is changed from that of the inter-prediction information candidates having the predetermined value when the number of inter-prediction information candidates included in the added inter-prediction information candidate list is smaller than the designated number of inter-prediction information candidates and additionally adding the derived inter-prediction information candidates to the added inter-prediction information candidate list;

a candidate supplementing step of deriving inter-prediction information candidates of which the prediction mode, the reference index, and the motion vector have predetermined values until the number of inter-prediction information candidates included in the additionally added inter-prediction information candidate list reaches the designated number of inter-prediction information candidates when the number of inter-prediction information candidates included in the additionally added inter-prediction information candidate list is smaller than the designated number of inter-prediction information candidates and additionally adding the derived inter-prediction information candidates to the additionally added inter-prediction information candidate list; and a motion-compensated prediction step of selecting one inter-prediction information candidate from the inter-prediction information candidates included in the inter-prediction information candidate list and performing inter-prediction on the decoding target prediction block using the selected inter-prediction information candidate.

[Item 41]

A moving picture decoding program of decoding a bitstream obtained by coding moving pictures using motion-compensated prediction in units of blocks obtained by partitioning each picture of the moving pictures, causing a computer to execute:

a prediction information number decoding step of decoding information indicating a previously designated number of inter-prediction information candidates;

a prediction information deriving step of deriving the inter-prediction information candidates from inter-prediction information of a prediction block neighboring to a decoding target prediction block or a prediction block present at the same position as or near the decoding target prediction block in a decoded picture at a temporally different position from the decoding target prediction block;

a candidate list constructing step of constructing an inter-prediction information candidate list from the derived inter-prediction information candidates;

a candidate adding step of deriving inter-prediction information candidates of which the prediction mode, the reference index, and the motion vector have predetermined values when the number of inter-prediction information candidates included in the constructed inter-prediction information candidate list is smaller than the designated number of inter-prediction information candidates and adding the derived inter-prediction information candidates to the constructed inter-prediction information candidate list, deriving one or a plurality of inter-prediction information candidates of which the prediction mode and the motion vector have the same value as and the reference index is changed from that of the inter-prediction information candidates having the predetermined value when the number of inter-prediction information candidates included in the added inter-prediction information candidate list is smaller than the designated number of inter-prediction information candidates and additionally adds the derived inter-prediction information candidates to the added inter-prediction information candidate list, and deriving inter-prediction information candidates of which the prediction mode, the reference index, and the motion vector have predetermined values until the number of inter-prediction information candidates included in the additionally added inter-prediction information candidate list reaches the designated number of inter-prediction information candidates when the number of inter-prediction information candidates included in the additionally added inter-prediction information candidate list is smaller than the designated number of inter-prediction information candidates and additionally adding the derived inter-prediction information candidates to the additionally added inter-prediction information candidate list; and a motion-compensated prediction step of selecting one inter-prediction information candidate from the inter-prediction information candidates included in the inter-prediction information candidate list and performing inter-prediction on the decoding target prediction block using the selected inter-prediction information candidate.

[Item 42]

A moving picture decoding program of decoding a bitstream obtained by coding moving pictures using motion-compensated prediction in units of blocks obtained by partitioning each picture of the moving pictures, causing a computer to execute:

a prediction information number decoding step of decoding a designated number of inter-prediction information candidates;

a prediction information deriving step of storing and initializing a designated number of inter-prediction information candidates having predetermined prediction mode, reference index, and motion vector in advance in an inter-prediction information candidate list in which the designated number of inter-prediction information candidates are stored, and then, deriving inter-prediction information candidates from inter-prediction information of a prediction block neighboring to a decoding target prediction block or a prediction block present at the same position as or near the decoding target prediction block in a decoded picture at a temporally different position from the decoding target prediction block; and a motion-compensated prediction step of selecting one inter-prediction information candidate from the inter-prediction information candidates included in the inter-prediction information candidate list and performing inter-prediction on the decoding target prediction block using the selected inter-prediction information candidate.

[Item 43]

A moving picture decoding program of decoding moving pictures using motion-compensated prediction in units of blocks obtained by partitioning each picture of the moving pictures, causing a computer to execute:

a prediction information number decoding step of decoding information indicating a previously designated number of inter-prediction information candidates;

a prediction information deriving step of deriving inter-prediction information candidates based on the number of candidates designated as the number of inter-prediction information candidates from inter-prediction information of a prediction block neighboring to a decoding target prediction block or a prediction block present at the same position as or near the decoding target prediction block in a decoded picture at a temporally different position from the decoding target prediction block;

a candidate list constructing step of constructing an inter-prediction information candidate list from the derived inter-prediction information candidates; and a motion-compensated prediction step of selecting one inter-prediction information candidate from inter-prediction information candidates included in the inter-prediction information candidate list when the designated number of candidates is larger than or equal to 1 and performing inter-prediction on the decoding target prediction block using the selected inter-prediction information candidate and performing inter-prediction on the decoding target prediction block using inter-prediction information having a predetermined value when the designated number of candidates is 0.

[Item 44]

A receiver that receives and decodes a bitstream obtained by coding moving pictures, comprising:

a receiving unit that receives a bitstream obtained by packetizing a bitstream obtained by coding moving pictures using motion-compensated prediction in units of blocks obtained by partitioning each picture of the moving pictures;

a reconstructing unit that packetizing the received bitstream to reconstruct an original bitstream;

a prediction information decoding unit that decodes information indicating a previously designated number of inter-prediction information candidates from the reconstructed bitstream;

a prediction information deriving unit that derives the inter-prediction information candidates from inter-prediction information of a prediction block neighboring to a decoding target prediction block or a prediction block present at the same position as or near the decoding target prediction block in a decoded picture at a temporally different position from the decoding target prediction block;

a candidate list constructing unit that constructs an inter-prediction information candidate list from the derived inter-prediction information candidates;

a candidate adding unit that derives inter-prediction information candidates of which the prediction mode, the reference index, and the motion vector have predetermined values when the number of inter-prediction information candidates included in the constructed inter-prediction information candidate list is smaller than the designated number of inter-prediction information candidates and adds the derived inter-prediction information candidates to the constructed inter-prediction information candidate list and that derives one or a plurality of inter-prediction information candidates of which at least one of the prediction mode, the reference index, and the motion vector is changed from that of the inter-prediction information candidates having the predetermined value when the number of inter-prediction information candidates included in the added inter-prediction information candidate list is smaller than the designated number of inter-prediction information candidates and additionally adds the derived inter-prediction information candidates to the added inter-prediction information candidate list;

a candidate supplementing unit that derives inter-prediction information candidates of which the prediction mode, the reference index, and the motion vector have predetermined values until the number of inter-prediction information candidates included in the additionally added inter-prediction information candidate list reaches the designated number of inter-prediction information candidates when the number of inter-prediction information candidates included in the additionally added inter-prediction information candidate list is smaller than the designated number of inter-prediction information candidates and additionally adds the derived inter-prediction information candidates to the additionally added inter-prediction information candidate list; and a motion-compensated prediction unit that selects one inter-prediction information candidate from the inter-prediction information candidates included in the inter-prediction information candidate list and performs inter-prediction on the decoding target prediction block using the selected inter-prediction information candidate.

[Item 45]

A reception method of receiving and decoding a bitstream obtained by coding moving pictures, comprising:

a receiving step of receiving a bitstream obtained by packetizing a bitstream obtained by coding moving pictures using motion-compensated prediction in units of blocks obtained by partitioning each picture of the moving pictures;

a reconstructing step of packetizing the received bitstream to reconstruct an original bitstream;

a prediction information number decoding step of decoding information indicating a previously designated number of inter-prediction information candidates from the reconstructed bitstream;

a prediction information deriving step of deriving the inter-prediction information candidates from inter-prediction information of a prediction block neighboring to a decoding target prediction block or a prediction block present at the same position as or near the decoding target prediction block in a decoded picture at a temporally different position from the decoding target prediction block;

a candidate list constructing unit that constructs an inter-prediction information candidate list from the derived inter-prediction information candidates;

a candidate adding step of deriving inter-prediction information candidates of which the prediction mode, the reference index, and the motion vector have predetermined values when the number of inter-prediction information candidates included in the constructed inter-prediction information candidate list is smaller than the designated number of inter-prediction information candidates and adding the derived inter-prediction information candidates to the constructed inter-prediction information candidate list, and deriving one or a plurality of inter-prediction information candidates of which at least one of the prediction mode, the reference index, and the motion vector is changed from that of the inter-prediction information candidates having the predetermined value when the number of inter-prediction information candidates included in the added inter-prediction information candidate list is smaller than the designated number of inter-prediction information candidates and additionally adding the derived inter-prediction information candidates to the added inter-prediction information candidate list;

a candidate supplementing step of deriving inter-prediction information candidates of which the prediction mode, the reference index, and the motion vector have predetermined values until the number of inter-prediction information candidates included in the additionally added inter-prediction information candidate list reaches the designated number of inter-prediction information candidates when the number of inter-prediction information candidates included in the additionally added inter-prediction information candidate list is smaller than the designated number of inter-prediction information candidates and additionally adding the derived inter-prediction information candidates to the additionally added inter-prediction information candidate list; and a motion-compensated prediction step of selecting one inter-prediction information candidate from the inter-prediction information candidates included in the inter-prediction information candidate list and performing inter-prediction on the decoding target prediction block using the selected inter-prediction information candidate.

[Item 46]

A reception program of receiving and decoding a bitstream obtained by coding moving pictures, causing a computer to execute:

a receiving step of receiving a bitstream obtained by packetizing a bitstream obtained by coding moving pictures using motion-compensated prediction in units of blocks obtained by partitioning each picture of the moving pictures;

a reconstructing step of packetizing the received bitstream to reconstruct an original bitstream;

a prediction information number decoding step of decoding information indicating a previously designated number of inter-prediction information candidates from the reconstructed bitstream;

a prediction information deriving step of deriving the inter-prediction information candidates from inter-prediction information of a prediction block neighboring to a decoding target prediction block or a prediction block present at the same position as or near the decoding target prediction block in a decoded picture at a temporally different position from the decoding target prediction block;

a candidate list constructing unit that constructs an inter-prediction information candidate list from the derived inter-prediction information candidates;

a candidate adding step of deriving inter-prediction information candidates of which the prediction mode, the reference index, and the motion vector have predetermined values when the number of inter-prediction information candidates included in the constructed inter-prediction information candidate list is smaller than the designated number of inter-prediction information candidates and adding the derived inter-prediction information candidates to the constructed inter-prediction information candidate list, and deriving one or a plurality of inter-prediction information candidates of which at least one of the prediction mode, the reference index, and the motion vector is changed from that of the inter-prediction information candidates having the predetermined value when the number of inter-prediction information candidates included in the added inter-prediction information candidate list is smaller than the designated number of inter-prediction information candidates and additionally adding the derived inter-prediction information candidates to the added inter-prediction information candidate list;

a candidate supplementing step of deriving inter-prediction information candidates of which the prediction mode, the reference index, and the motion vector have predetermined values until the number of inter-prediction information candidates included in the additionally added inter-prediction information candidate list reaches the designated number of inter-prediction information candidates when the number of inter-prediction information candidates included in the additionally added inter-prediction information candidate list is smaller than the designated number of inter-prediction information candidates and additionally adding the derived inter-prediction information candidates to the additionally added inter-prediction information candidate list; and a motion-compensated prediction step of selecting one inter-prediction information candidate from the inter-prediction information candidates included in the inter-prediction information candidate list and performing inter-prediction on the decoding target prediction block using the selected inter-prediction information candidate.

What is claimed is:

1. A moving picture decoding device that decodes a bitstream obtained by coding moving pictures using inter-prediction based on inter-prediction information of a merge candidate in units of blocks obtained by partitioning each picture of the moving pictures, comprising:

a prediction information decoding unit that decodes information indicating a designated number of merge candidates;

a prediction information deriving unit that derives merge candidates from inter-prediction information of a prediction block neighboring to a decoding target prediction block or a prediction block present at the same position as or near the decoding target prediction block in a decoded picture at a temporally different position from the decoding target prediction block;

a candidate list constructing unit that constructs a merge candidate list from the derived merge candidates;

a first candidate supplementing unit that repeatedly performs a first process for adding to the merge candidate list a merge candidate of which the moving vector has a first value, the inter-prediction mode has a second value and the reference index has a third value;

a second candidate supplementing unit that repeatedly performs a second process for adding to the merge candidate list after the first process a merge candidate of which the motion vector has the first value, the inter-prediction mode has the second value and the reference index has a fourth value until the number of merge candidates included in the merge candidate list after the first process reaches the designated number of merge candidates when the number of merge candidates included in the merge candidate list after the first process is smaller than the designated number of merge candidates; and a merge candidate selecting unit that selects one merge candidate from the merge candidates included in the merge candidate list of which the number of merge candidates reaches the designated number of merge candidates, wherein:

the first value is a predefined value that does not differ each time the first process and the second process occur;

the second value is a predefined value that does not differ each time the first process and the second process occur and indicates that the inter-prediction mode is L0 prediction when a decoding target image is a P picture;

the third value is a variable that differs each time the first process occurs; and the fourth value is a predefined value that does not differ each time the second process occurs.

2. A moving picture decoding method of decoding a bitstream obtained by coding moving pictures using inter-prediction based on inter-prediction information of a merge candidate in units of blocks obtained by partitioning each picture of the moving pictures, comprising:

a prediction information decoding step of decoding information indicating a designated number of merge candidates;

a prediction information deriving step of deriving merge candidates from inter-prediction information of a prediction block neighboring to a decoding target prediction block or a prediction block present at the same position as or near the decoding target prediction block in a decoded picture at a temporally different position from the decoding target prediction block;

a candidate list constructing step of constructing a merge candidate list from the derived merge candidates;

a first candidate supplementing step of repeatedly performing a first process for adding to the merge candidate list a merge candidate of which the moving vector has a first value, the inter-prediction mode has a second value and the reference index has a third value;

a second candidate supplementing step of repeatedly performing a second process for adding to the merge candidate list after the first process a merge candidate of which the motion vector has the first value, the inter-prediction mode has the second value and the reference index has a fourth value until the number of merge candidates included in the merge candidate list after the first process reaches the designated number of merge candidates when the number of merge candidates included in the merge candidate list after the first process is smaller than the designated number of merge candidates; and a merge candidate selecting step of selecting one merge candidate from the merge candidates included in the merge candidate list of which the number of merge candidates reaches the designated number of merge candidates, wherein:

the first value is a predefined value that does not differ each time the first process and the second process occur;

the second value is a predefined value that does not differ each time the first process and the second process occur and indicates that the inter-prediction mode is L0 prediction when a decoding target image is a P picture;

the third value is a variable that differs each time the first process occurs; and the fourth value is a predefined value that does not differ each time the second process occurs.

3. A non-transitory computer-readable recording medium having embodied thereon a moving picture decoding program of decoding a bitstream obtained by coding moving pictures using inter-prediction based on inter-prediction information of a merge candidate in units of blocks obtained by partitioning each picture of the moving pictures, causing a computer to execute:

a prediction information decoding step of decoding information indicating a designated number of merge candidates;

a prediction information deriving step of deriving merge candidates from inter-prediction information of a prediction block neighboring to a decoding target prediction block or a prediction block present at the same position as or near the decoding target prediction block in a decoded picture at a temporally different position from the decoding target prediction block;

a candidate list constructing step of constructing a merge candidate list from the derived merge candidates;

a first candidate supplementing step of repeatedly performing a first process for adding to the merge candidate list a merge candidate of which the moving vector has a first value, the inter-prediction mode has a second value and the reference index has a third value;

a second candidate supplementing step of repeatedly performing a second process for adding to the merge candidate list after the first process a merge candidate of which the motion vector has the first value, the inter-prediction mode has the second value and the reference index has a fourth value until the number of merge candidates included in the merge candidate list after the first process reaches the designated number of merge candidates when the number of merge candidates included in the merge candidate list after the first process is smaller than the designated number of merge candidates; and a merge candidate selecting step of selecting one merge candidate from the merge candidates included in the merge candidate list of which the number of merge candidates reaches the designated number of merge candidates, wherein:

the first value is a predefined value that does not differ each time the first process and the second process occur;

the second value is a predefined value that does not differ each time the first process and the second process occur and indicates that the inter-prediction mode is L0 prediction when a decoding target image is a P picture;

the third value is a variable that differs each time the first process occurs; and the fourth value is a predefined value that does not differ each time the second process occurs.

* * * * *